US012683539B2

(12) United States Patent

Truthseeker

(10) Patent No.: US 12,683,539 B2

(45) Date of Patent: Jul. 14, 2026

(54) SOLAR MODULES INCLUDING MOUNTS FOR MOUNTING ON A SURFACE

(71) Applicant: Samuel Marcus-Flack Truthseeker, El Sobrante, CA (US)

(72) Inventor: Samuel Marcus-Flack Truthseeker, El Sobrante, CA (US)

( * ) Notice: Subject to any disclaimer, the term of this patent is extended or adjusted under 35 U.S.C. 154(b) by 0 days.

(21) Appl. No.: 18/304,904

(22) Filed: Apr. 21, 2023

(65) Prior Publication Data

US 2023/0387848 A1    Nov. 30, 2023

Related U.S. Application Data

(60) Provisional application No. 63/333,363, filed on Apr. 21, 2022.

(51) Int. Cl.
  *H02S 20/23*    (2014.01)
  *F16B 2/02*    (2006.01)

(52) U.S. Cl.
  CPC ................ *H02S 20/23* (2014.12); *F16B 2/02* (2013.01)

(58) Field of Classification Search
  CPC ....... H01L 31/00–078; Y02E 10/50–60; H02S 20/00–32
  See application file for complete search history.

(56) References Cited

U.S. PATENT DOCUMENTS

| | | | |
|---|---|---|---|
| 9,166,522 B1 * | 10/2015 | Zvanut .................... | H02S 20/23 |
| 10,361,653 B2 | 7/2019 | Truthseeker et al. | |
| 2009/0056792 A1 | 3/2009 | Salyer | |
| 2012/0061337 A1 | 3/2012 | Seery et al. | |
| 2012/0102853 A1 * | 5/2012 | Rizzo ...................... | F24S 25/61 |
| | | | 52/173.3 |
| 2012/0325306 A1 | 12/2012 | Auman et al. | |
| 2013/0000689 A1 | 1/2013 | Balyon | |
| 2013/0014041 A1 | 1/2013 | Jaeger | |
| 2013/0037082 A1 * | 2/2013 | Grant ...................... | H02S 30/20 |
| | | | 136/246 |
| 2014/0061396 A1 | 3/2014 | Magno, Jr. et al. | |
| 2014/0103591 A1 | 4/2014 | Petit et al. | |
| 2014/0230877 A1 | 8/2014 | Goldberg et al. | |
| 2015/0068590 A1 * | 3/2015 | West ...................... | H02S 20/23 |
| | | | 403/217 |
| 2016/0043692 A1 | 2/2016 | Oikawa et al. | |
| 2017/0149166 A1 | 5/2017 | Mann et al. | |
| 2017/0279404 A1 * | 9/2017 | Truthseeker ............ | F24S 25/70 |

FOREIGN PATENT DOCUMENTS

| WO | 2009150466 A2 | 12/2009 |
|---|---|---|
| WO | 2011046578 A1 | 4/2011 |

* cited by examiner

*Primary Examiner* — Bach T Dinh

(74) *Attorney, Agent, or Firm* — Armstrong Teasdale LLP

(57)    ABSTRACT

A solar module for installation on a structure includes a laminate for converting solar energy into electricity. The solar module also includes a mount connected to the laminate for mounting the solar module on a surface of the structure. The mount includes features to facilitate mounting the solar module on a surface or positioning the solar module in a solar array with other solar modules.

10 Claims, 48 Drawing Sheets

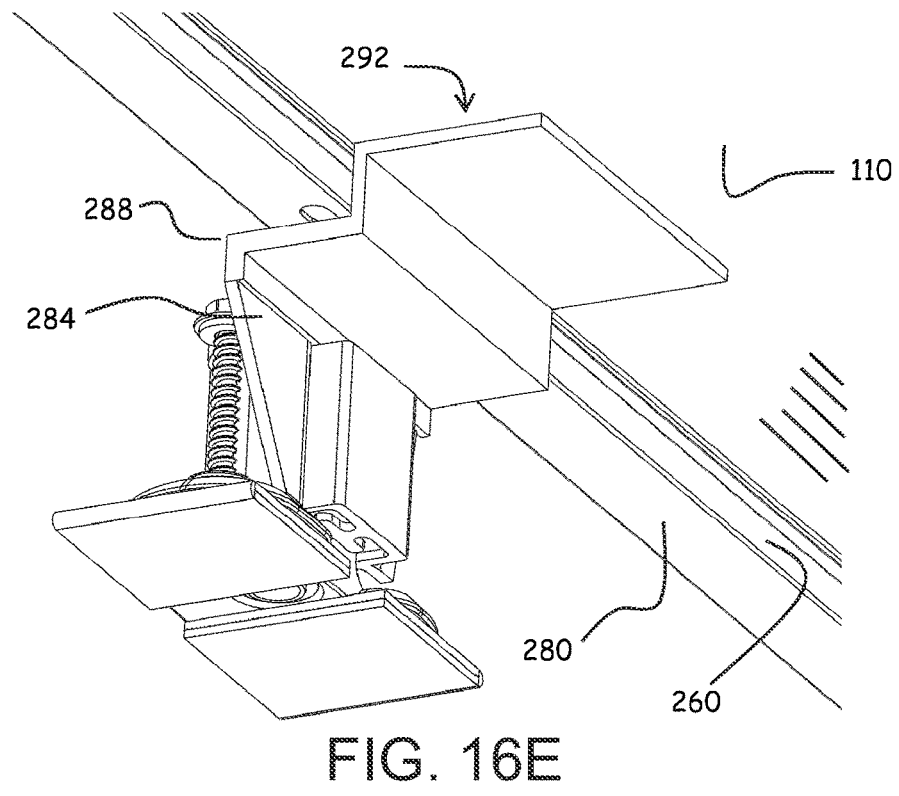
FIG. 16E
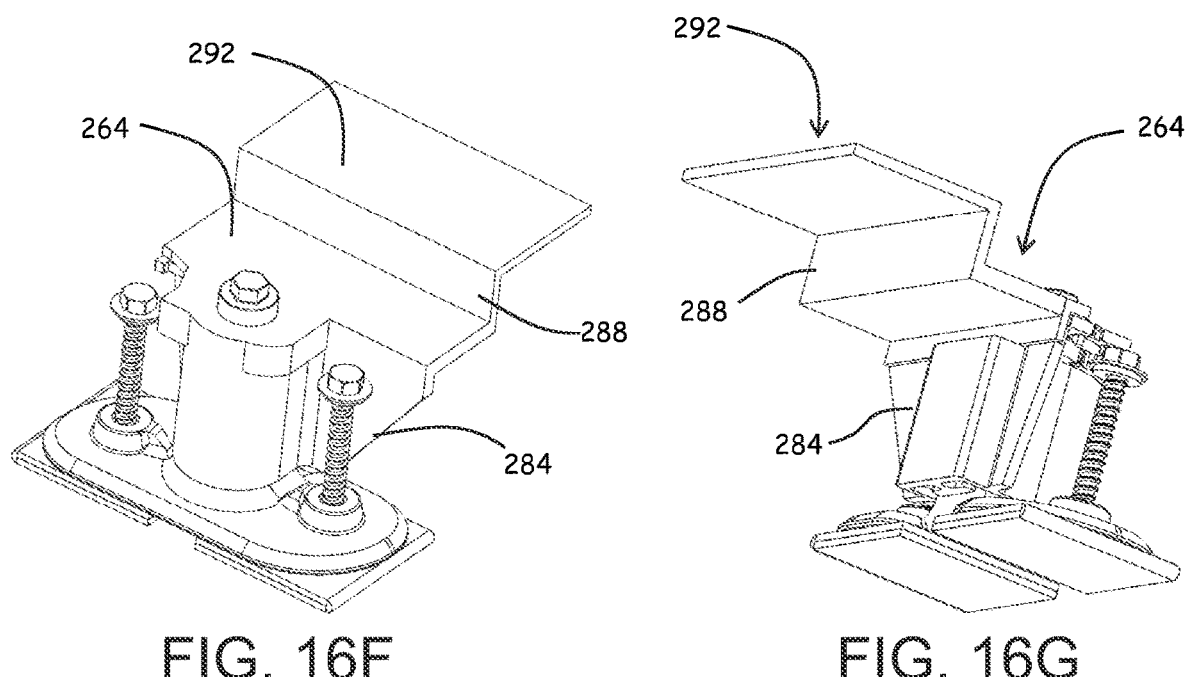
FIG. 16F                    FIG. 16G

SOLAR MODULES INCLUDING MOUNTS FOR MOUNTING ON A SURFACE

CROSS-REFERENCE TO RELATED APPLICATIONS

This application claims the benefit of priority to U.S. Provisional Patent Application No. 63/333,363, filed on Apr. 21, 2022, the entire contents and disclosure of which is incorporated by reference in its entirety.

FIELD

The field generally relates to solar modules and, more specifically, to a solar module including mounts for mounting on a surface.

BACKGROUND

Solar modules are devices that convert solar energy into other forms of useful energy (e.g., electricity or thermal energy). Such modules are typically positioned above an underlying structure surface by a rack. In addition, the solar modules are required to be positioned in a precise layout on the structure surface and secured to the structure surface. For example, at least some known solar modules and racks are installed using components such as flashing, L-Feet, lag bolts, rails, clamps, stanchions, grounding lugs, splices, and skirts.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a solar array includes a first solar module including a first mount for mounting the first solar module on a surface of a structure, and a second solar module including a second mount for mounting the second solar module on the surface of the structure. The second solar module is adjacent the first solar module and offset from the first solar module when the first solar module and the second solar module are mounted to the surface of the structure. The first mount and the second mount contact each other but do not overlap each other.

In another aspect, a preassembled solar module for installation on a structure includes a laminate for converting solar energy into electricity, and a mount connected to the laminate for the mounting the preassembled solar module on a surface of the structure. The mount includes openings to receive fasteners for securing the mount to the surface of the structure. The preassembled solar module also includes a spacer extending outward from the mount and arranged to contact another solar module at a gap distance from the preassembled solar module.

In another aspect, a solar array includes a first solar module including a first mount for mounting the first solar module on a surface of a structure, and a second solar module including a second mount for mounting the second solar module on the surface of the structure. The second solar module is adjacent the first solar module and offset from the first solar module when the first solar module and the second solar module are mounted to the surface of the structure. At least one of the first solar module or the second solar module includes a spacer arranged to contact the other of the first solar module or the second solar module and define a gap between the first and second solar modules.

In another aspect, a solar module for installation on a structure includes a laminate for converting solar energy into electricity, a first mount connected to the laminate for mounting the solar module on a surface of the structure, and a second mount connected to the laminate for mounting the solar module on the surface of the structure. The first mount and the second mount are on opposite sides of the laminate. The solar module also includes a support on an underside of the laminate. The support extends between and engages the first mount and the second mount.

In another aspect, a preassembled solar module for installation on a structure includes a laminate for converting solar energy into electricity, a mount connected to the laminate for the mounting the preassembled solar module on a surface of the structure, and a locking assembly including a first slider and a rotating lever. The rotating lever engages the first slider and rotates about an axis. The first slider moves linearly and displaces the rotating lever to release the laminate from the mount.

In another aspect, a solar module for installation on a structure includes a laminate for converting solar energy into electricity. The laminate includes an upper surface arranged to interact with solar energy, a lower surface opposite the upper surface, and sides extending between the upper surface and the lower surface. The solar module also includes a handle on the lower surface of the laminate. The handle is located at least 20 inches from each of the sides of the laminate.

In another aspect, a solar module for installation on a structure includes a laminate for converting solar energy into electricity, and a mount connected to the laminate for mounting the solar module on a surface of the structure. The laminate includes a base including openings sized to receive fasteners. The solar module also includes flashing disposed between the base and the surface. The fasteners extend through the openings in the base and the flashing and into the surface. The base is flexible and arranged to deflect and conform to a contour of the surface of the structure when the fasteners are secured into the surface.

In another aspect, a solar module for installation on a structure, the solar module includes a laminate for converting solar energy into electricity. The laminate includes an upper surface arranged to interact with solar energy, a lower surface opposite the upper surface, and edges extending between the upper surface and the lower surface. The solar module also includes mounts connected to the laminate for mounting the solar module on a surface of the structure, and edge protection extending between the mounts and covering the edges of the laminate. The edge protection is electrically insulative.

In another aspect, a solar module for installation on a structure includes a laminate for converting solar energy into electricity, and a mount for the mounting the solar module on a surface of the structure. The mount includes a support bracket sized to receive the laminate, and a base including openings sized to receive fasteners. The base and the support bracket are separate pieces. The base defines a height adjustment slot. The mount also includes a leveling device that extends through the height adjustment slot in the base and attaches the base to the support bracket. The leveling device is positionable within the height adjustment slot to adjust a mounting height of the laminate relative to the surface.

In another aspect, a method of assembling a solar module for installation on a structure includes positioning fasteners in openings in a base, and connecting the base to a support bracket to form a mount. The base or the support bracket defines a height adjustment slot sized to receive the leveling device. The method also includes adjusting a height of the support bracket relative to the base by positioning the leveling device within the height adjustment slot, and securing the support bracket at a level position.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 16E is a perspective view of a portion of the underside of the solar module of FIG. 16A illustrating a side mount that includes an adhesive attachment to the laminate;

FIG. 16F is a perspective view of the side mount of the solar module of FIGS. 16A and 16E;

FIG. 16G is a perspective view of an underside of the side mount of the solar module of FIGS. 16A and 16E;

Figure 17A:
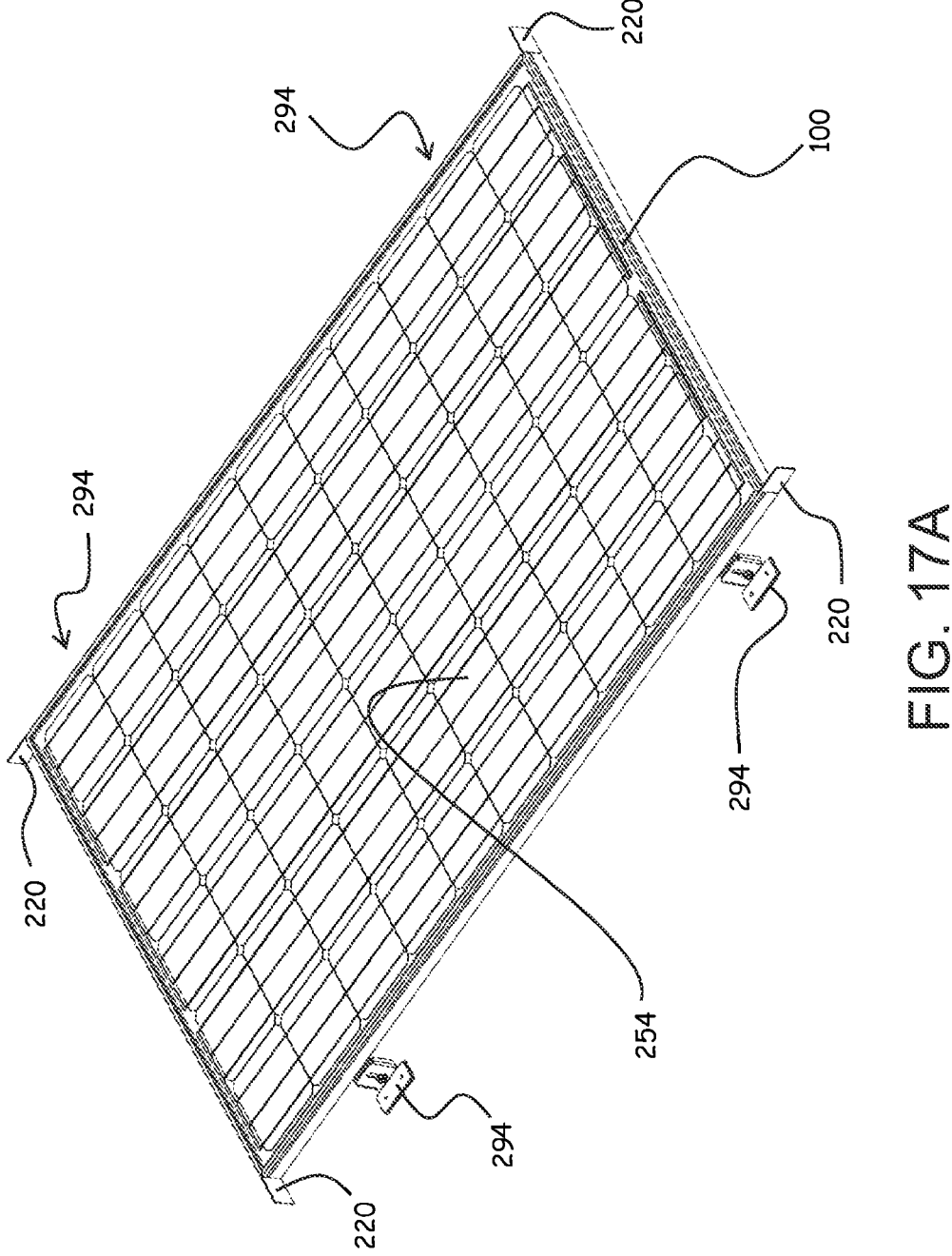
FIG. 17A is a perspective view of a solar module including an integrated racking system, mounts, and spacers.
Figures 17B, 17C:
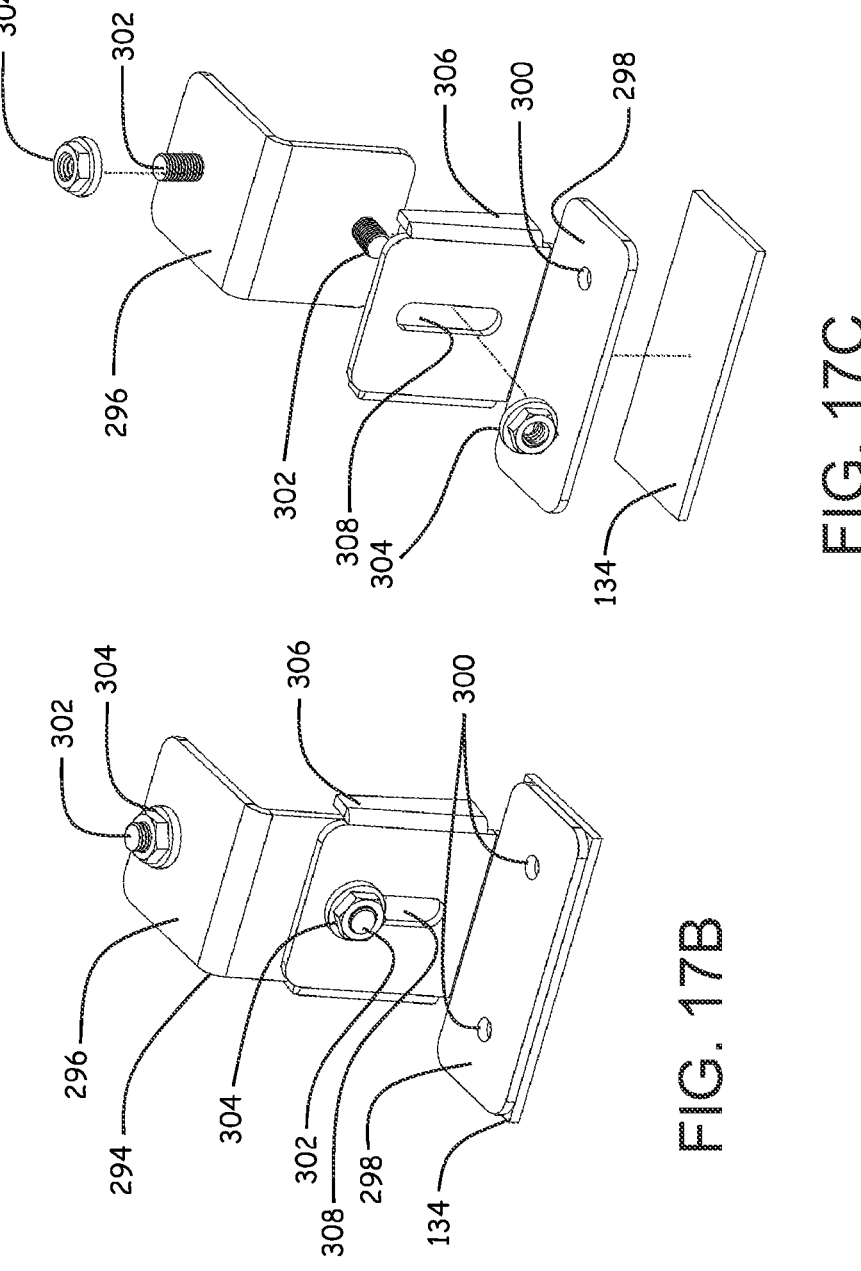
FIG. 17B is a perspective view of a mount of the solar module of FIG. 17A.
FIG. 17C is an exploded perspective view of the mount of FIG. 17B.
Figure 17D:
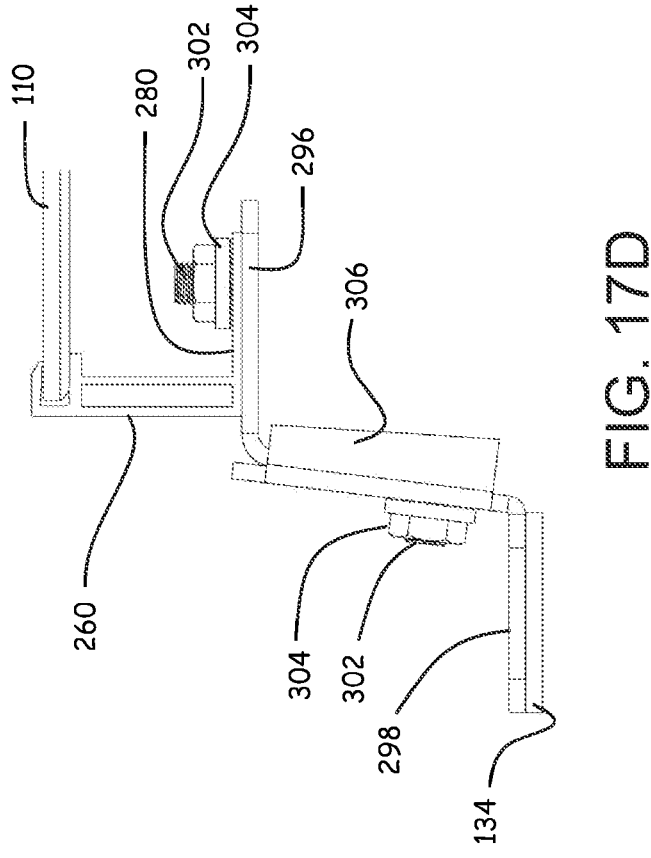
FIG. 17D is a side view of the mount of FIG. 17B.
Figures 17E, 17F:
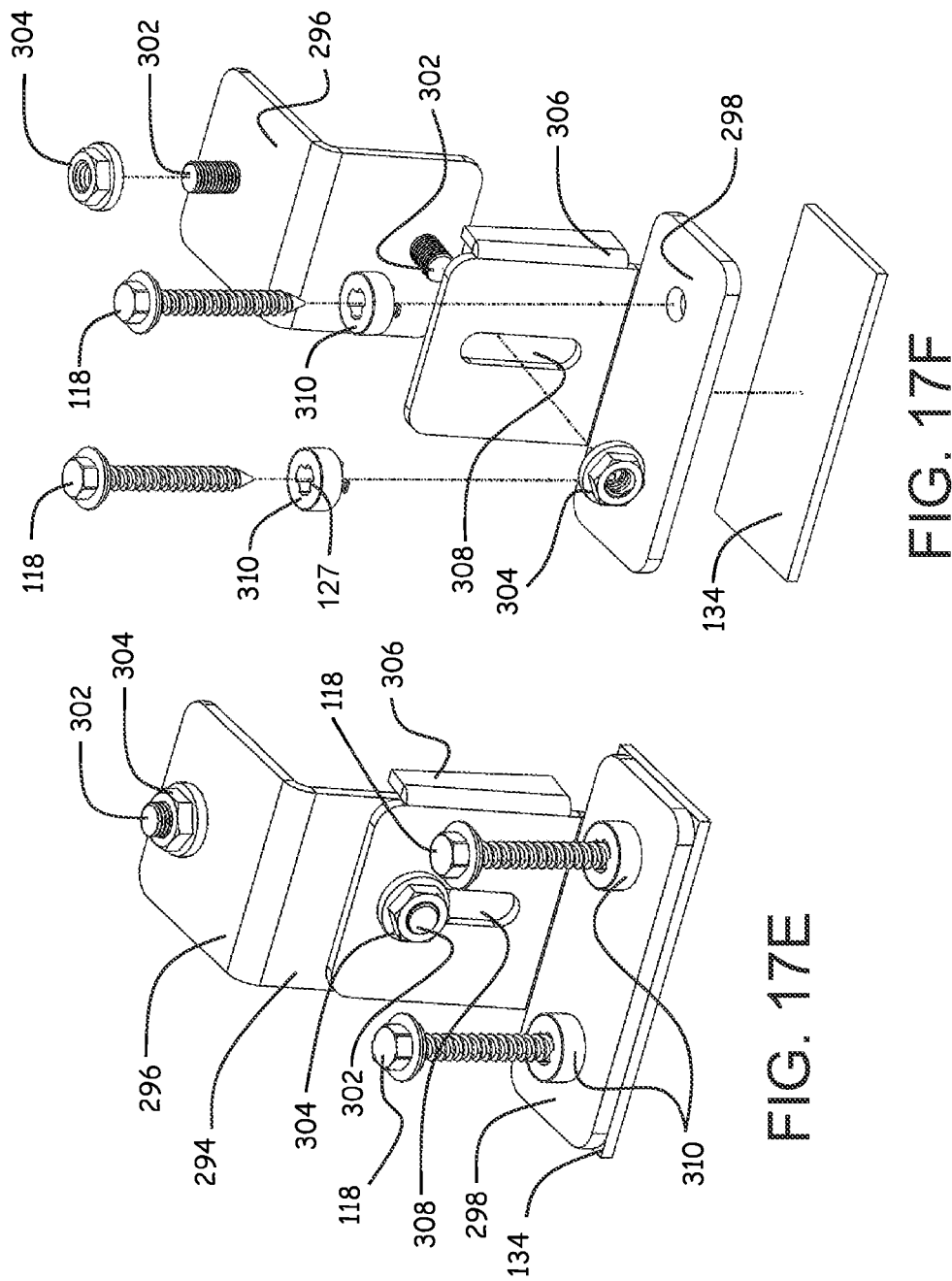
FIG. 17E is a perspective view of the mount of FIG. 17B, the mount in a premount configuration and including fasteners for securing the mount to a surface.
FIG. 17F is an exploded view of the mount and fasteners of FIG. 17E.
Figure 17G:
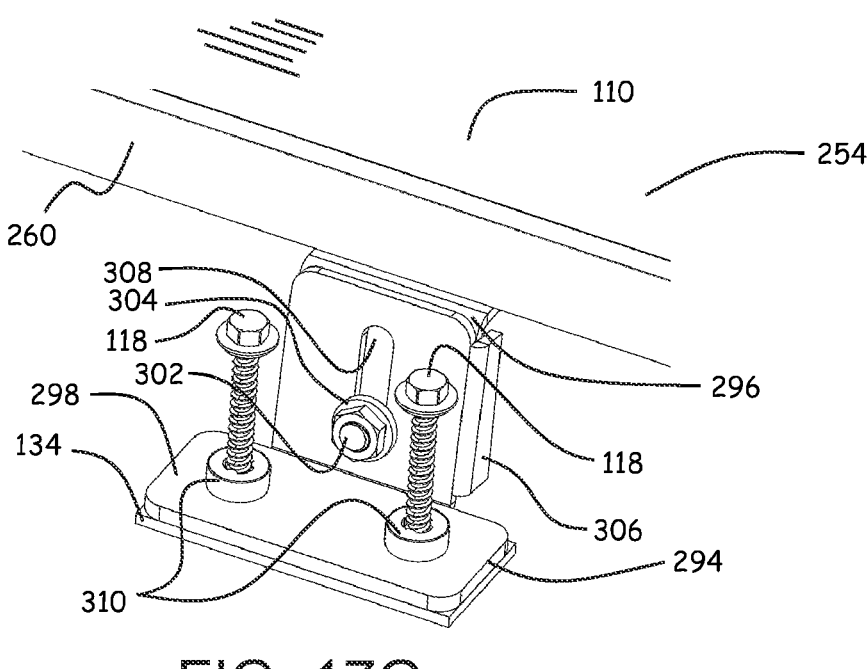
FIG. 17G is a perspective view of a portion of the solar module of FIG. 17A, with the mount in a first position.
Figure 17H:
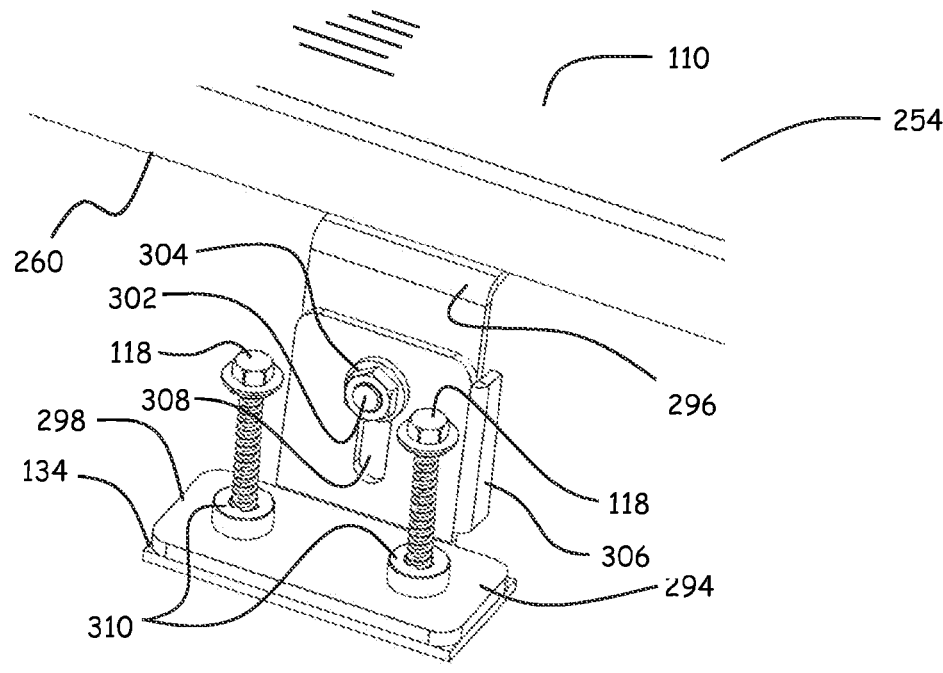
FIG. 17H is a perspective view of a portion of the solar module of FIG. 17A, with the mount in a second position.
Figure 17I:
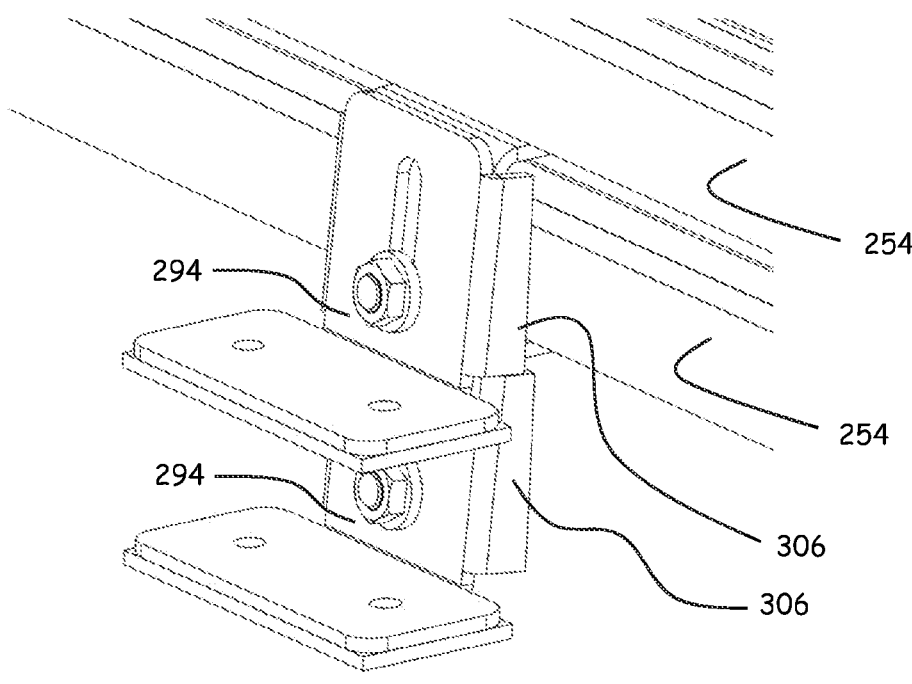
FIG. 17I is a perspective view of a portion of a solar array including solar modules in a stacked arrangement with mounts acting as support and alignment features.
Figure 17J:
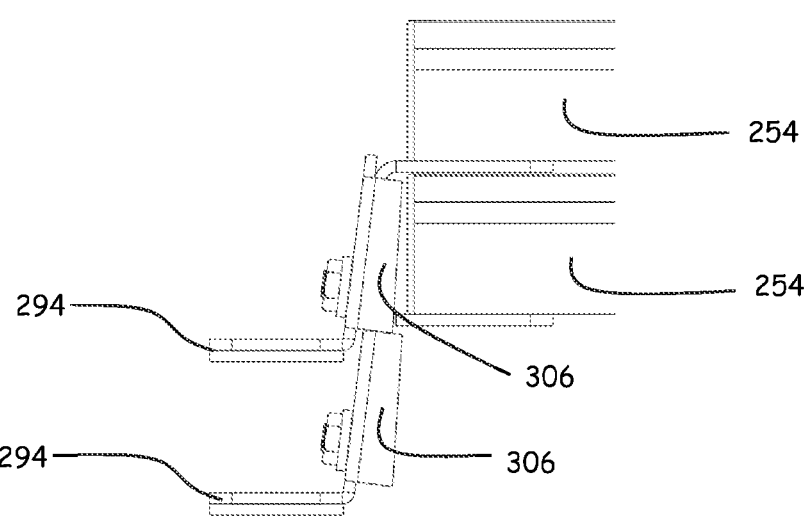
FIG. 17J is a side view of the solar modules of FIG. 17I in the stacked arrangement.
Figure 17K:
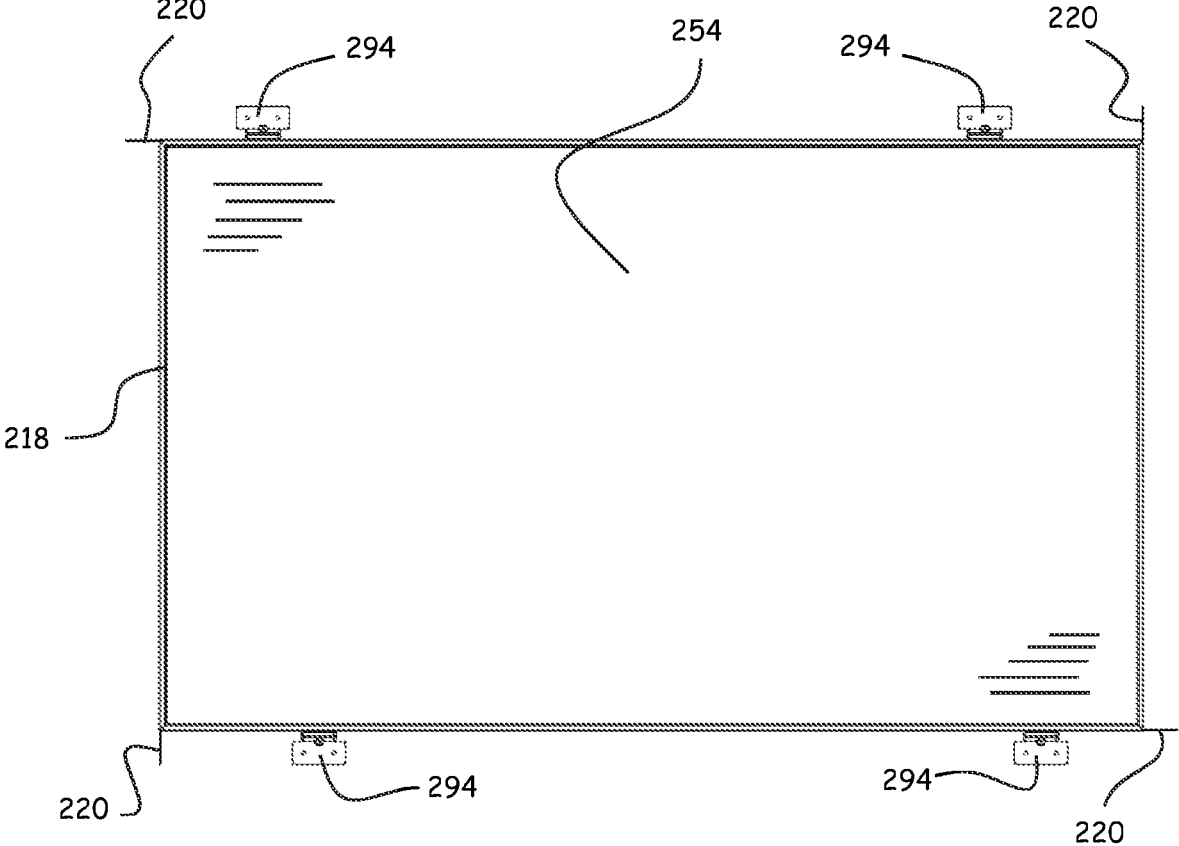
FIG. 17K is a top view of a solar module including an integrated racking system, spacers, and mounts, where the mounts are attached to the frame by fasteners.
Figure 17L:
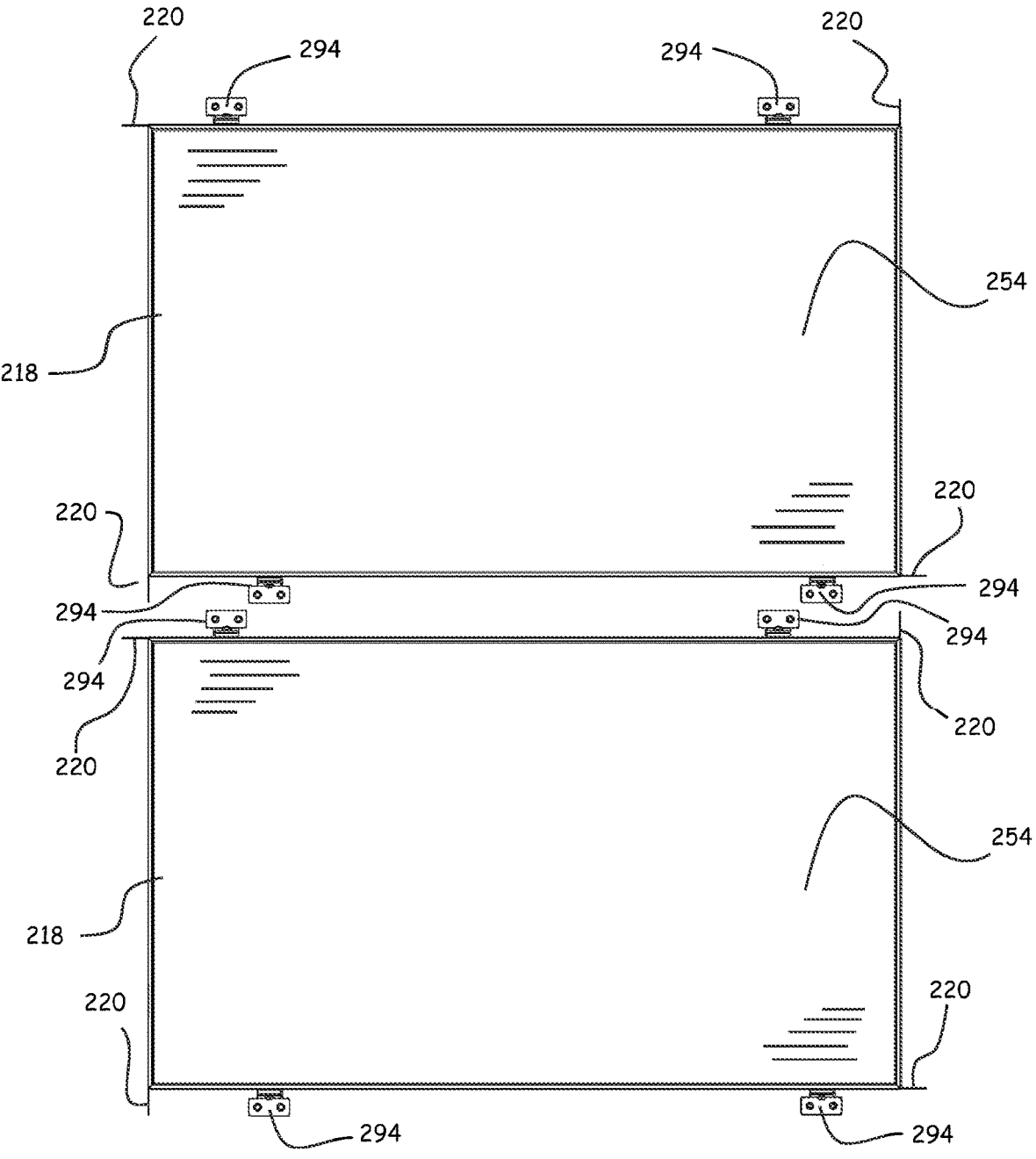
FIG. 17L is a top view of a solar array including a plurality of the solar modules of FIG. 17K, the solar modules are spaced apart to provide room for installation.
Figure 17M:
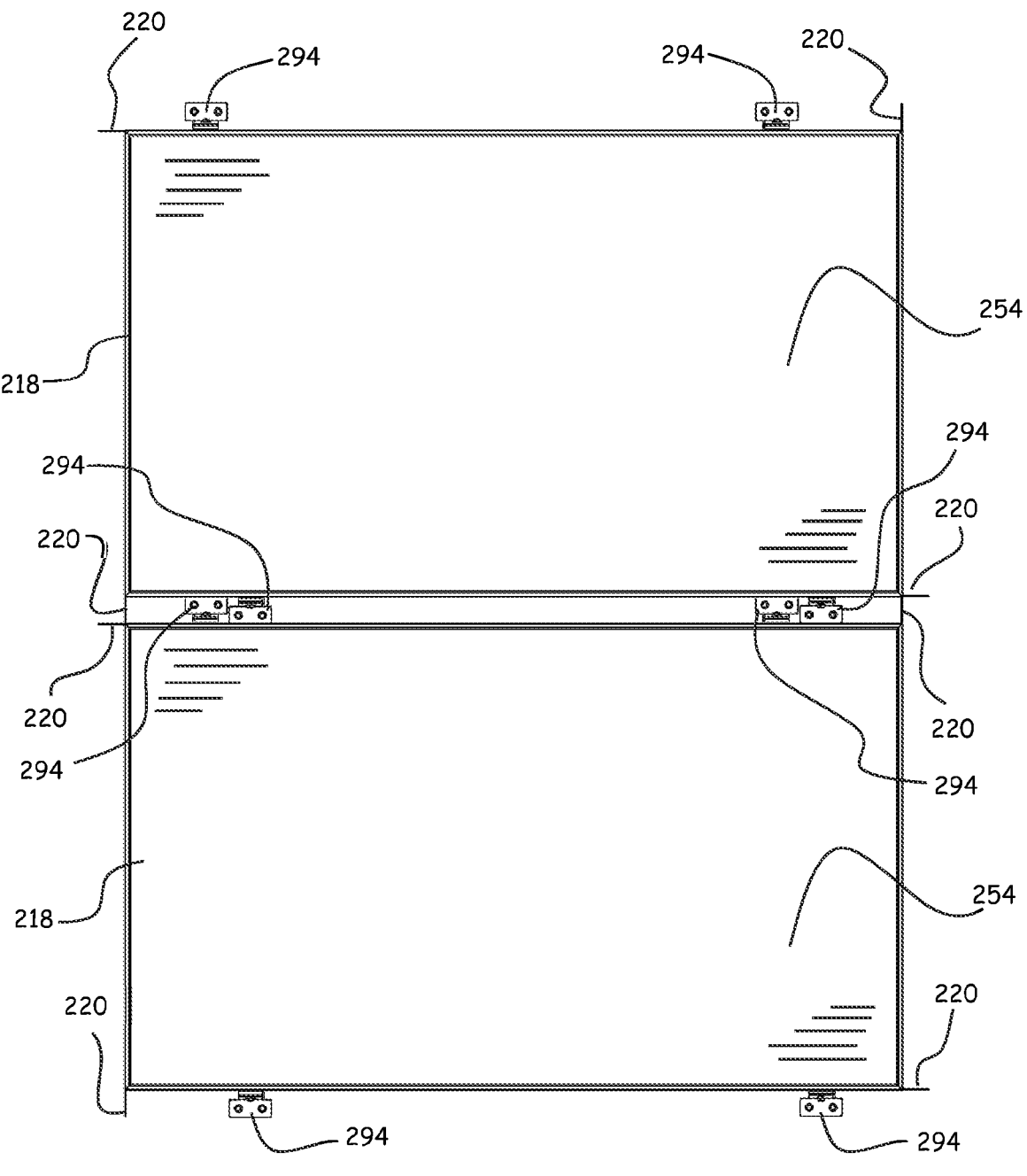
FIG. 17M is a top view of a solar array including a plurality of the solar modules of FIG. 17K, the solar modules secured on a surface and arranged to define gaps therebetween.
Figures 18A, 18B:
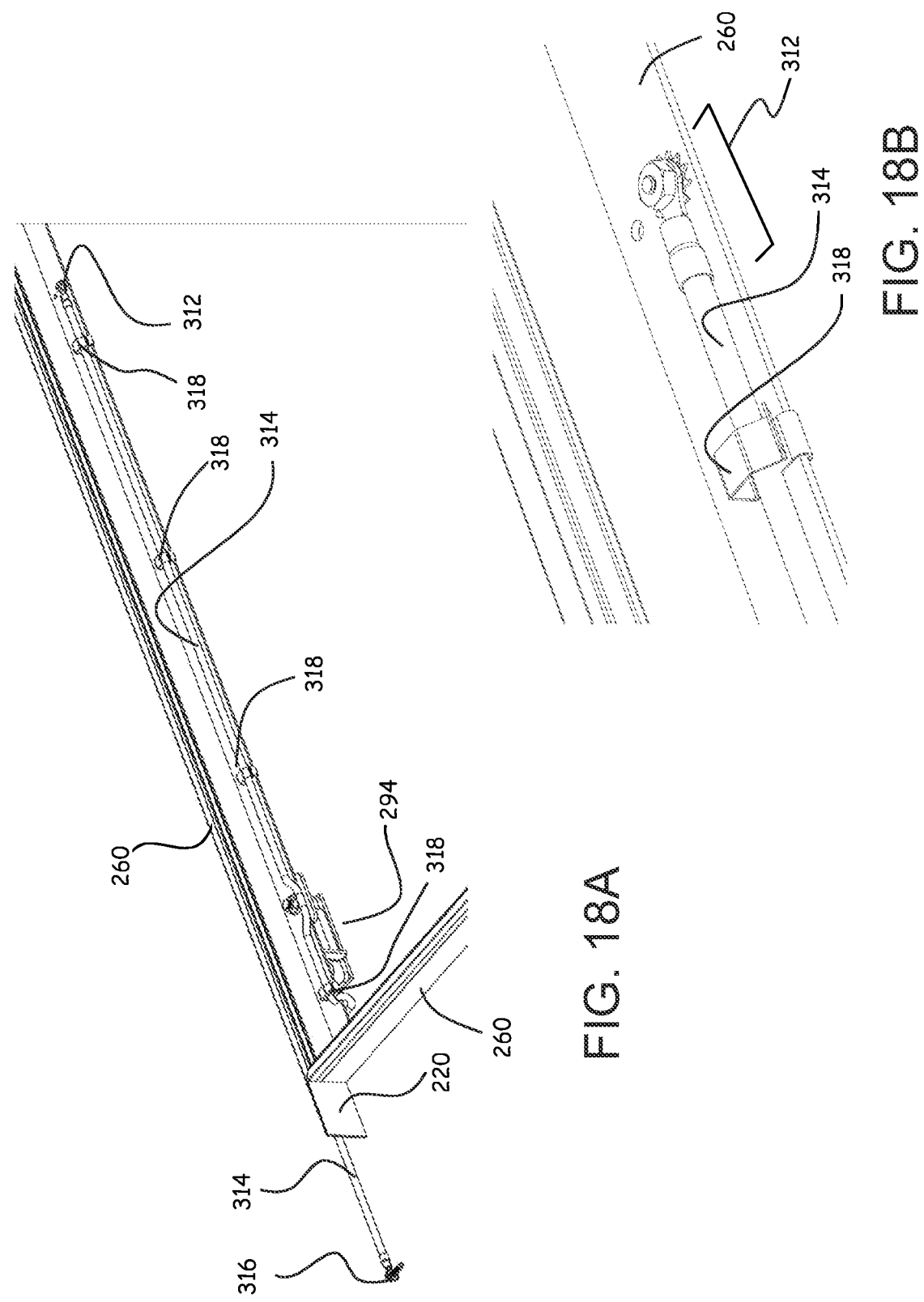
Figure 18C:
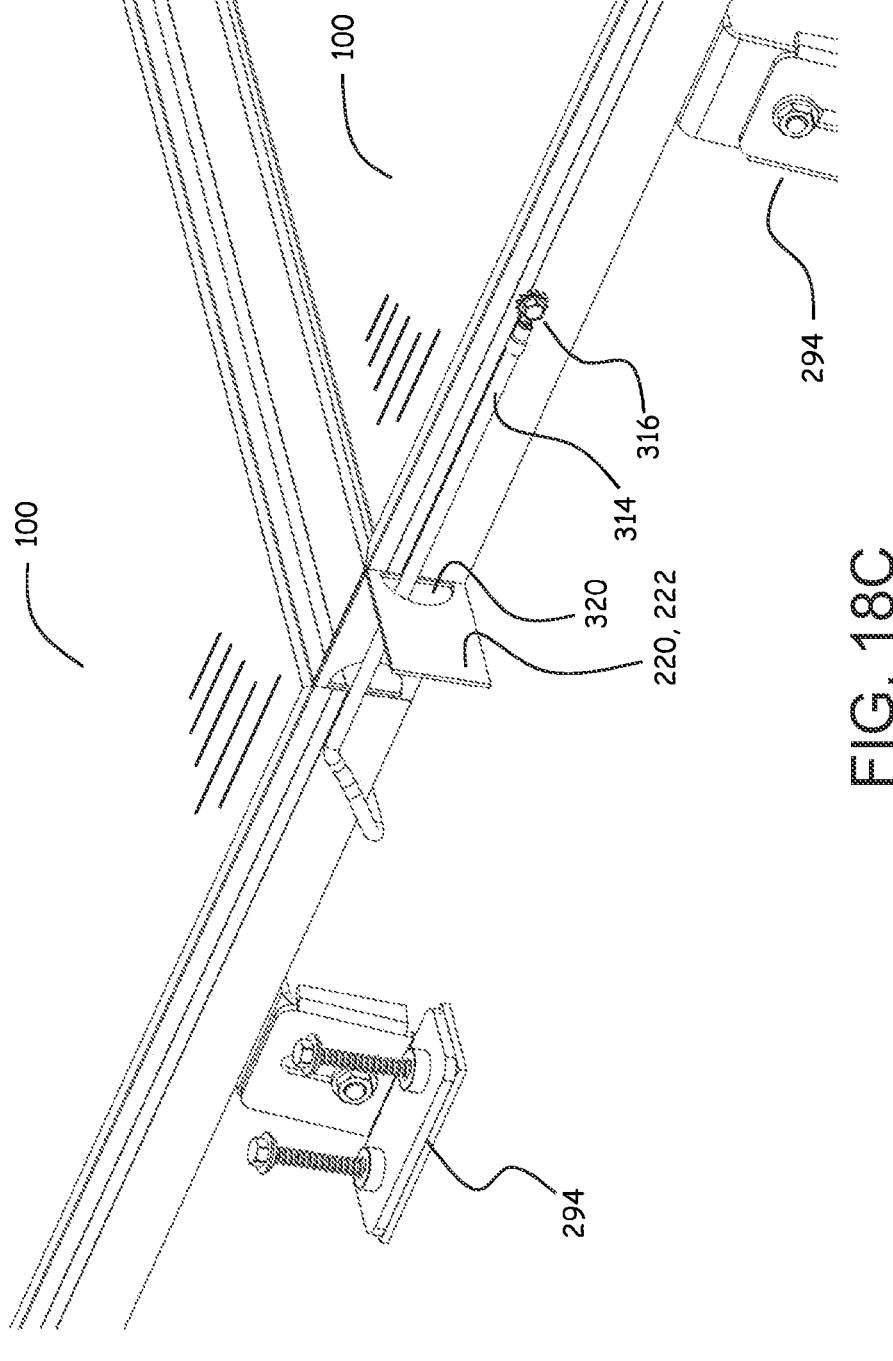
Figures 19A, 19B:
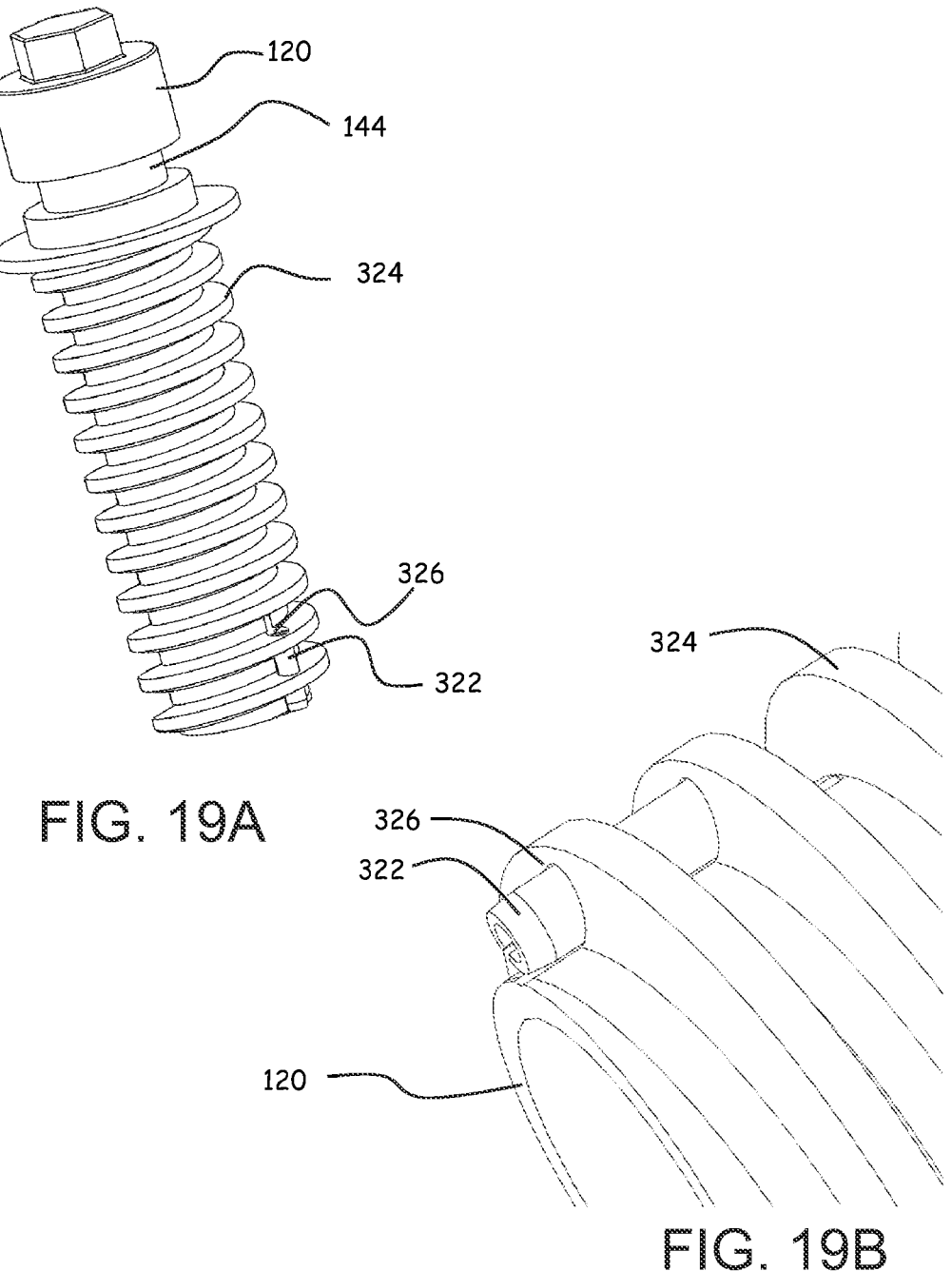
Figure 20A:
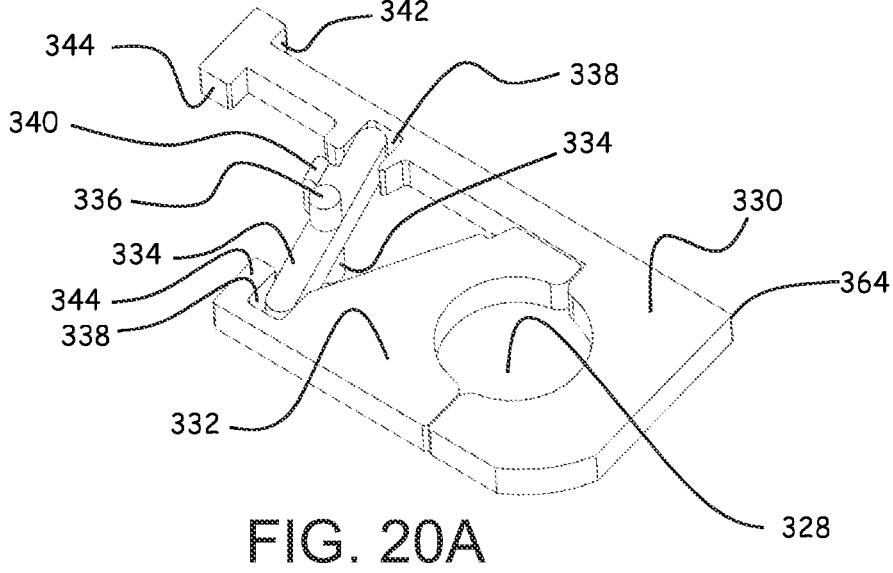
Figure 20B:
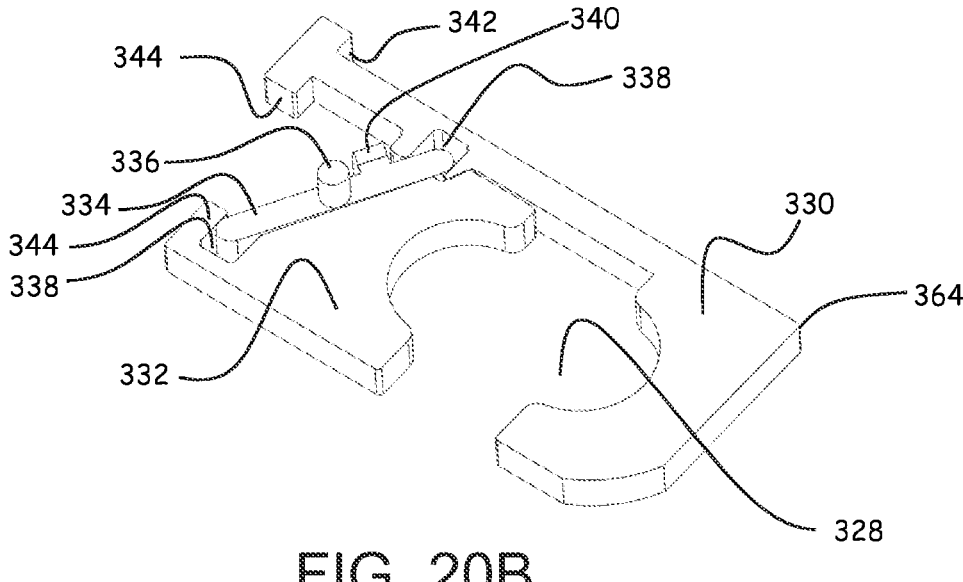
Figure 20C:
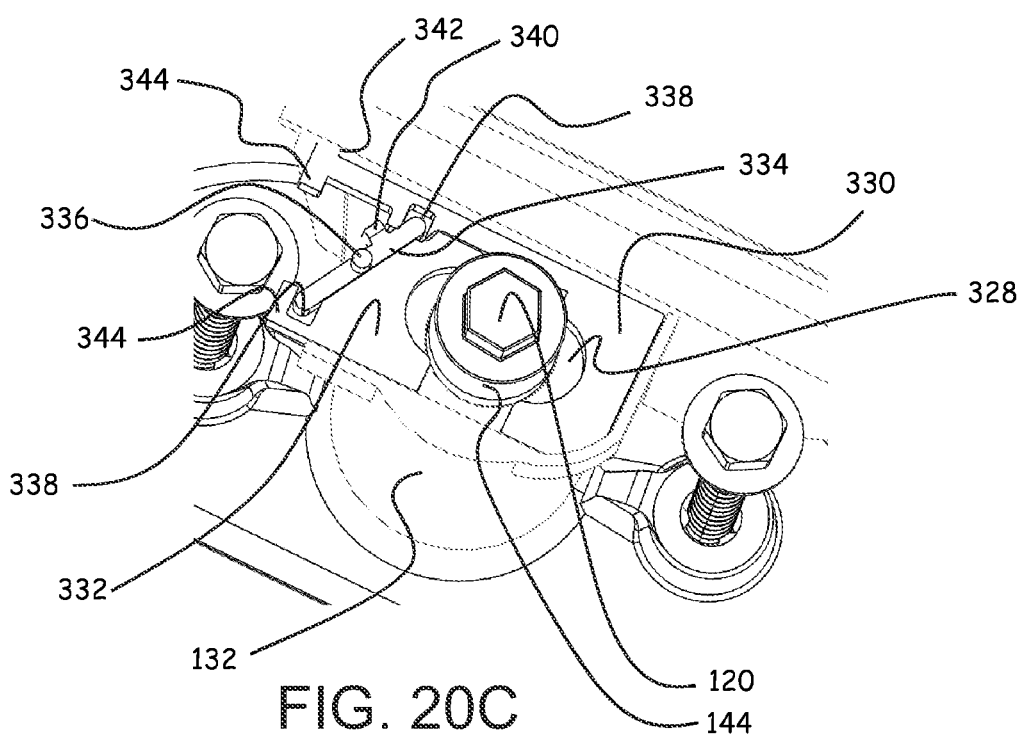
Figure 20D:
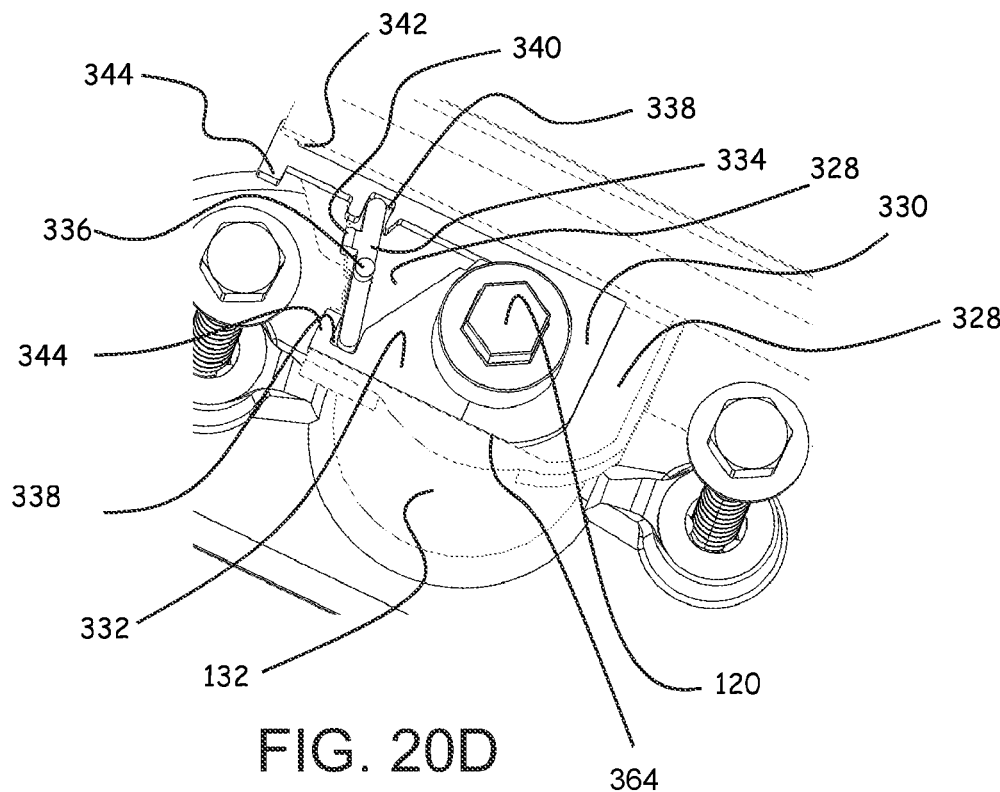
Figure 21A:
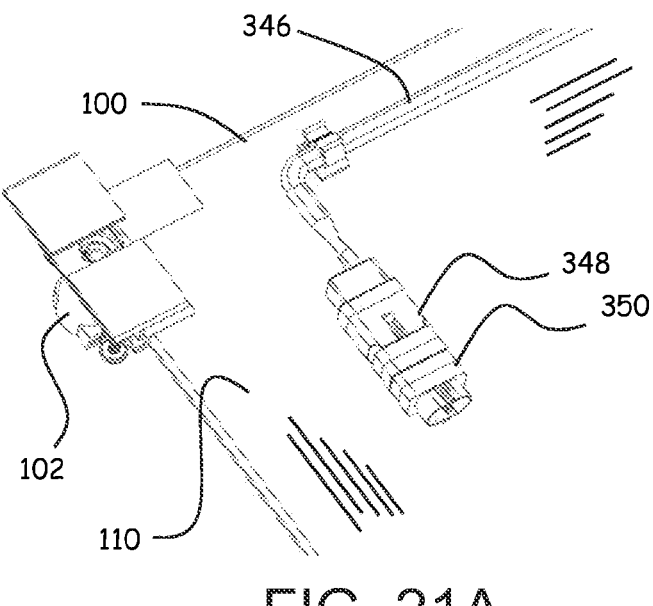
Figure 21B:
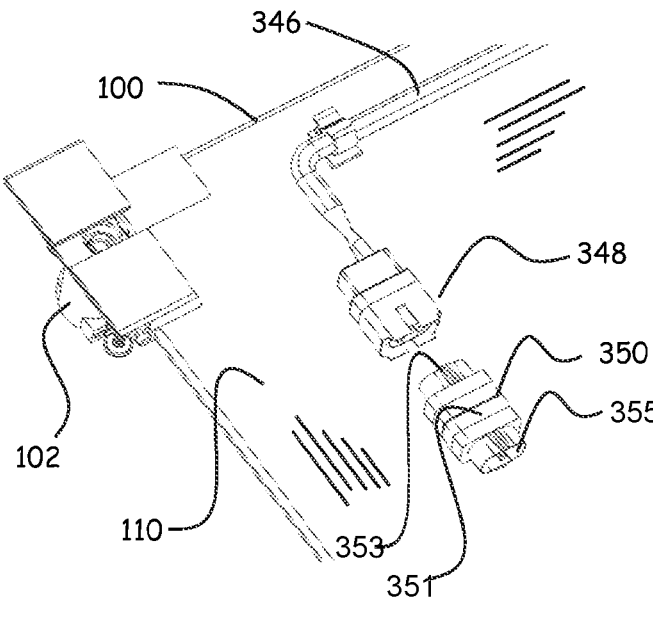
Figure 22:
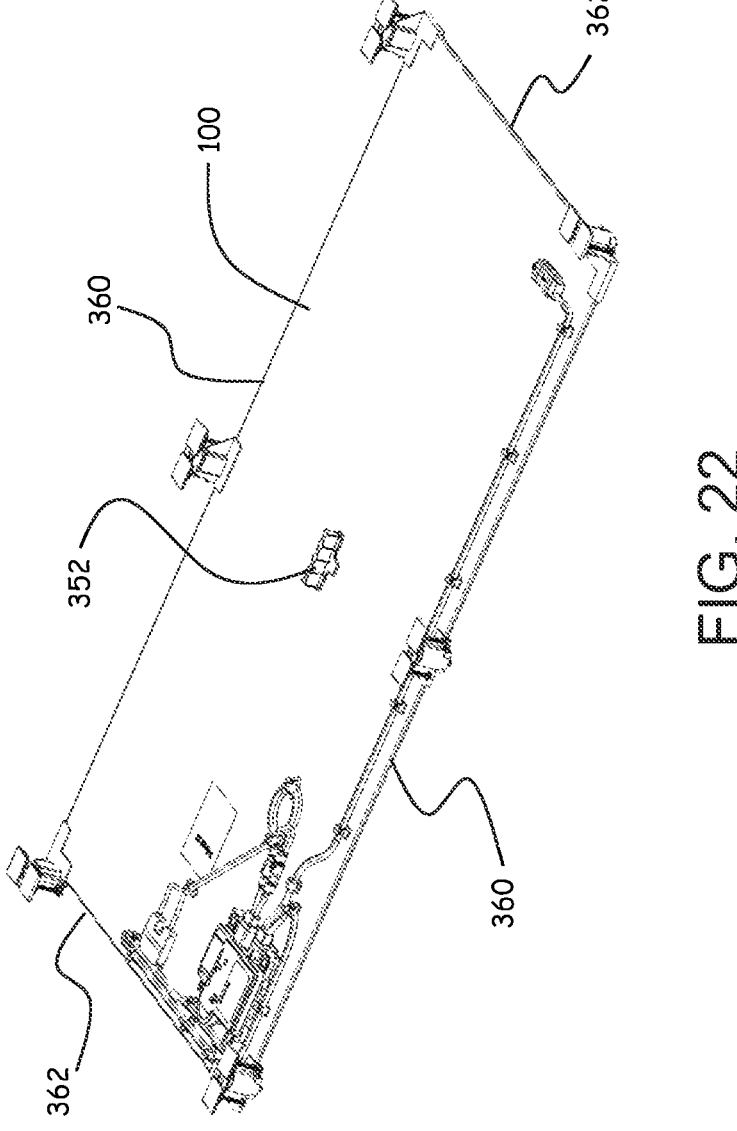
Figure 23A:
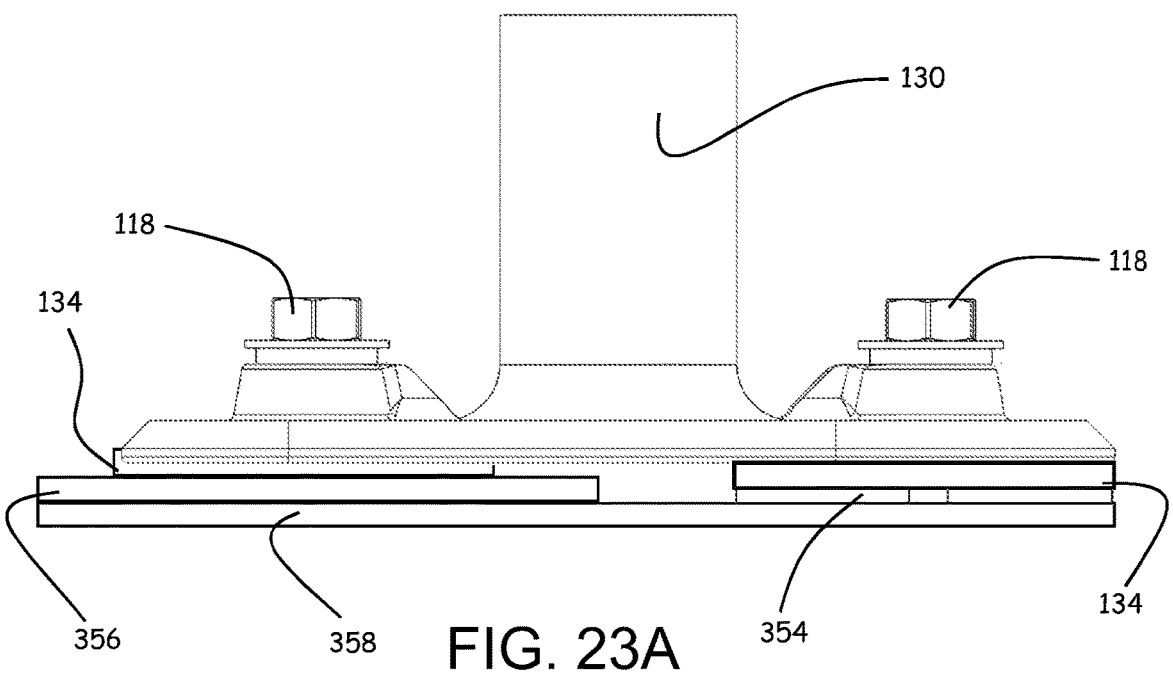
Figure 23B:
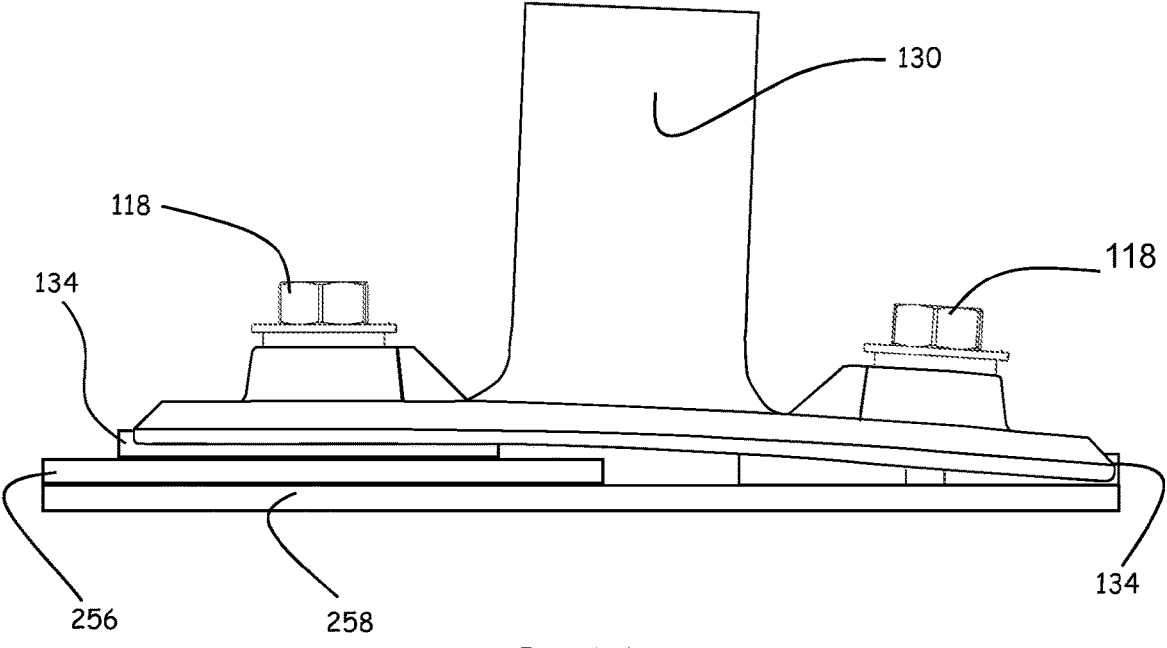

17N is an enlarged view of a portion of the solar array of FIGS. 17L and 17M, illustrating side mounts attached at offset locations on the solar modules and spacers between the solar modules;

FIG. 18A is a perspective view of a solar module including an integrated frame and racking system, with a laminate removed from the solar module to illustrate a wire management system;

FIG. 18B is an enlarged view of a ground wire of the solar module of FIG. 18A;

FIG. 18C is an enlarged view of a portion of a solar array including solar modules connected with the wire management system of FIGS. 18A and 18B;

FIG. 19A is a perspective view of a leveling fastener for use with a solar module and including a pin that acts as a retainment pin;

FIG. 19B is an enlarged view of the pin of the leveling fastener of FIG. 19A;

FIG. 20A is a perspective view of a release clip for use with a mount of a solar module;

FIG. 20B is a perspective view of the release clip of FIG. 20A in an opened position;

FIG. 20C is a perspective view of a portion of a solar module including the release clip of FIG. 20A, the release clip in an opened position;

FIG. 20D is a perspective view of a portion of a solar module including the release clip of FIG. 20A, the release clip in a closed position;

FIG. 21A is a perspective view of a portion of a solar module including a wire connector attached to an adaptor;

FIG. 21B is a perspective view of the solar module of FIG. 21A with the adaptor detached from the wire connector;

FIG. 22 is a perspective view of an underside of a solar module including an integrated racking system and a handle to facilitate transporting the solar module;

FIG. 23A is a side view of a mount for a solar module, the mount including a base arranged to accommodate different surfaces; and FIG. 23B is a side view of the mount of FIG. 23A installed on a surface having different elevations.

Like reference symbols in the various drawings indicate like elements.

DETAILED DESCRIPTION

Figure 1A:
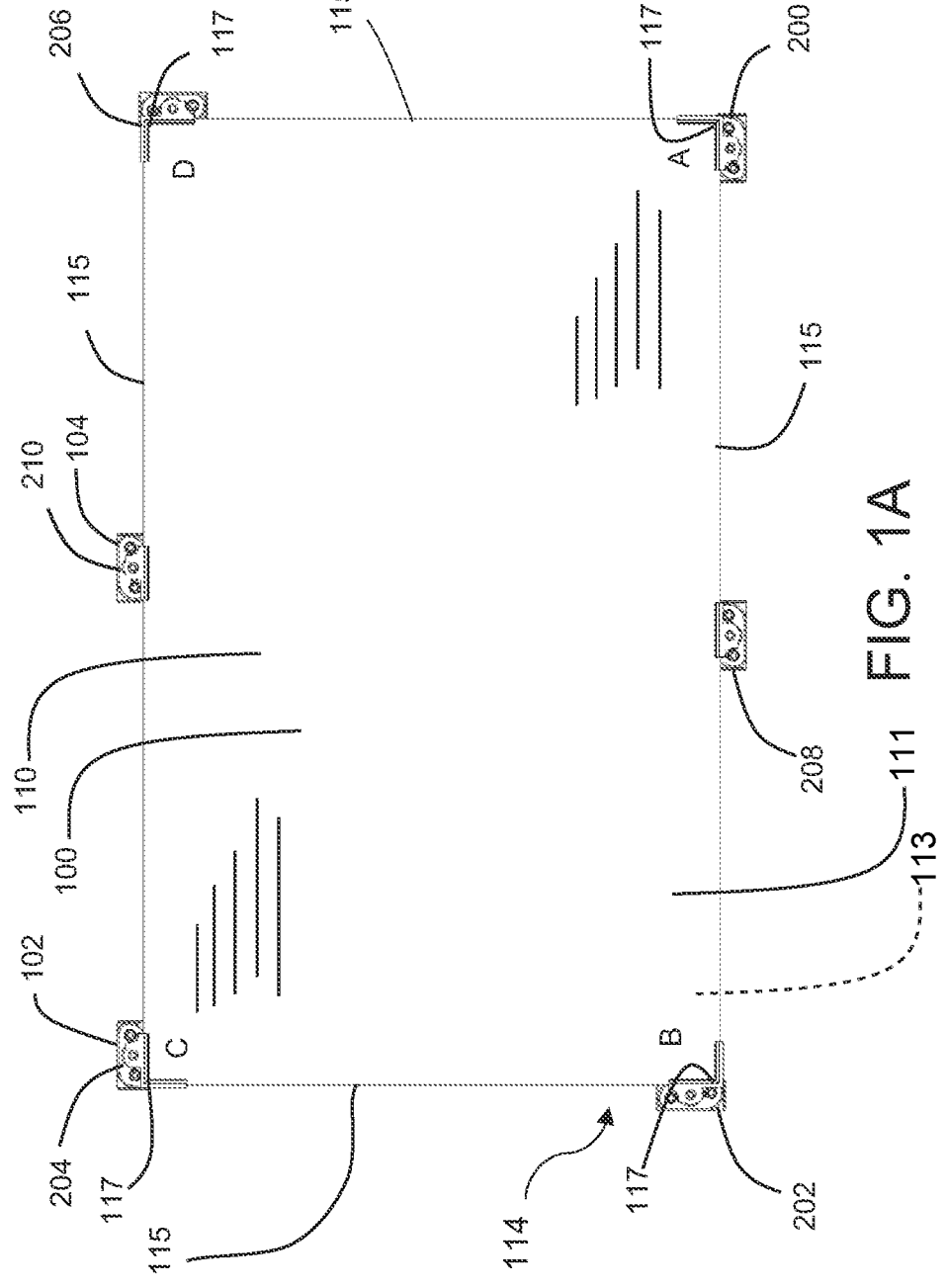
FIG. 1A is a top view of a solar module.
Figure 1B:
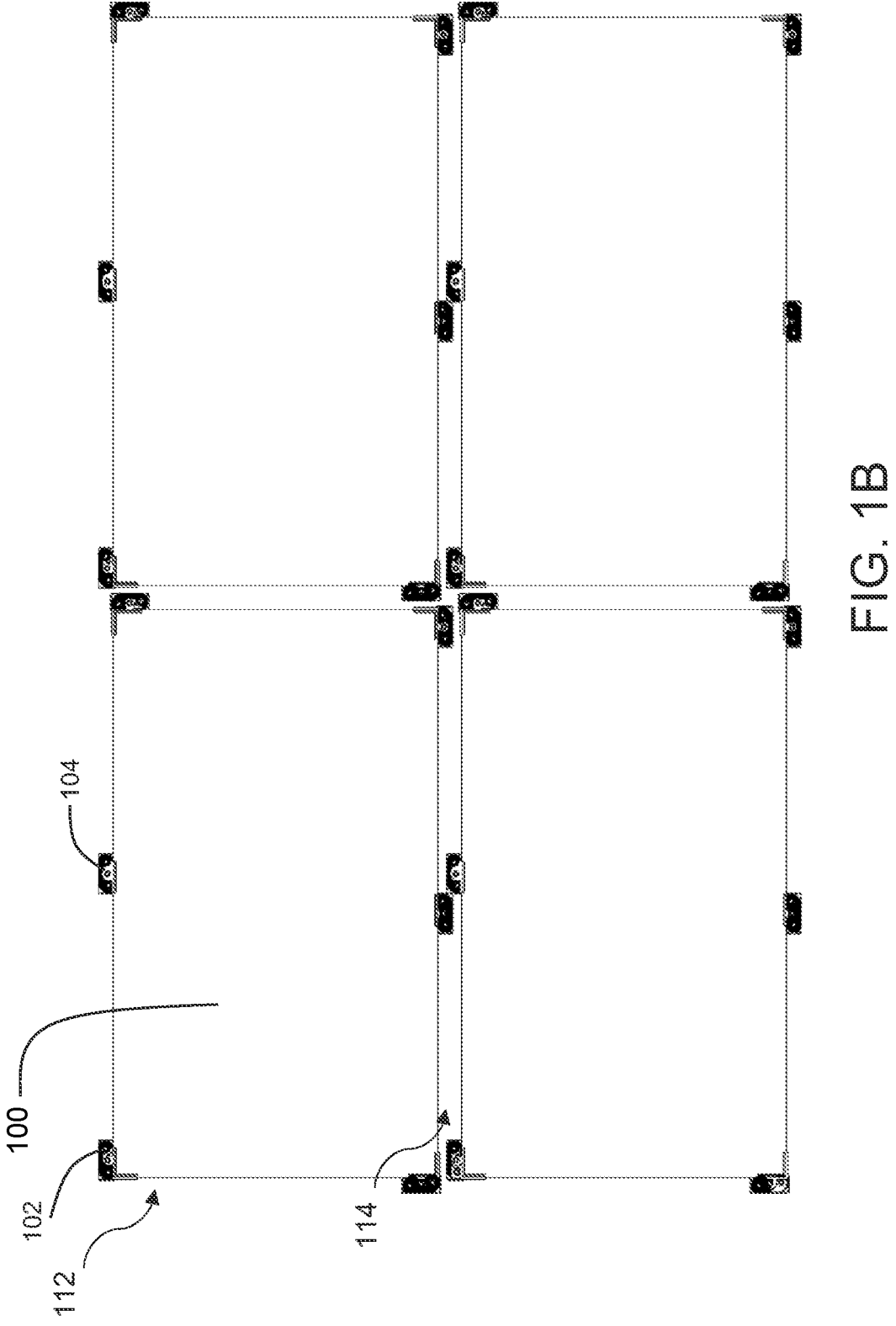
FIG. 1B is a top view of a solar array mounted on a surface of a structure.
Figure 1C:
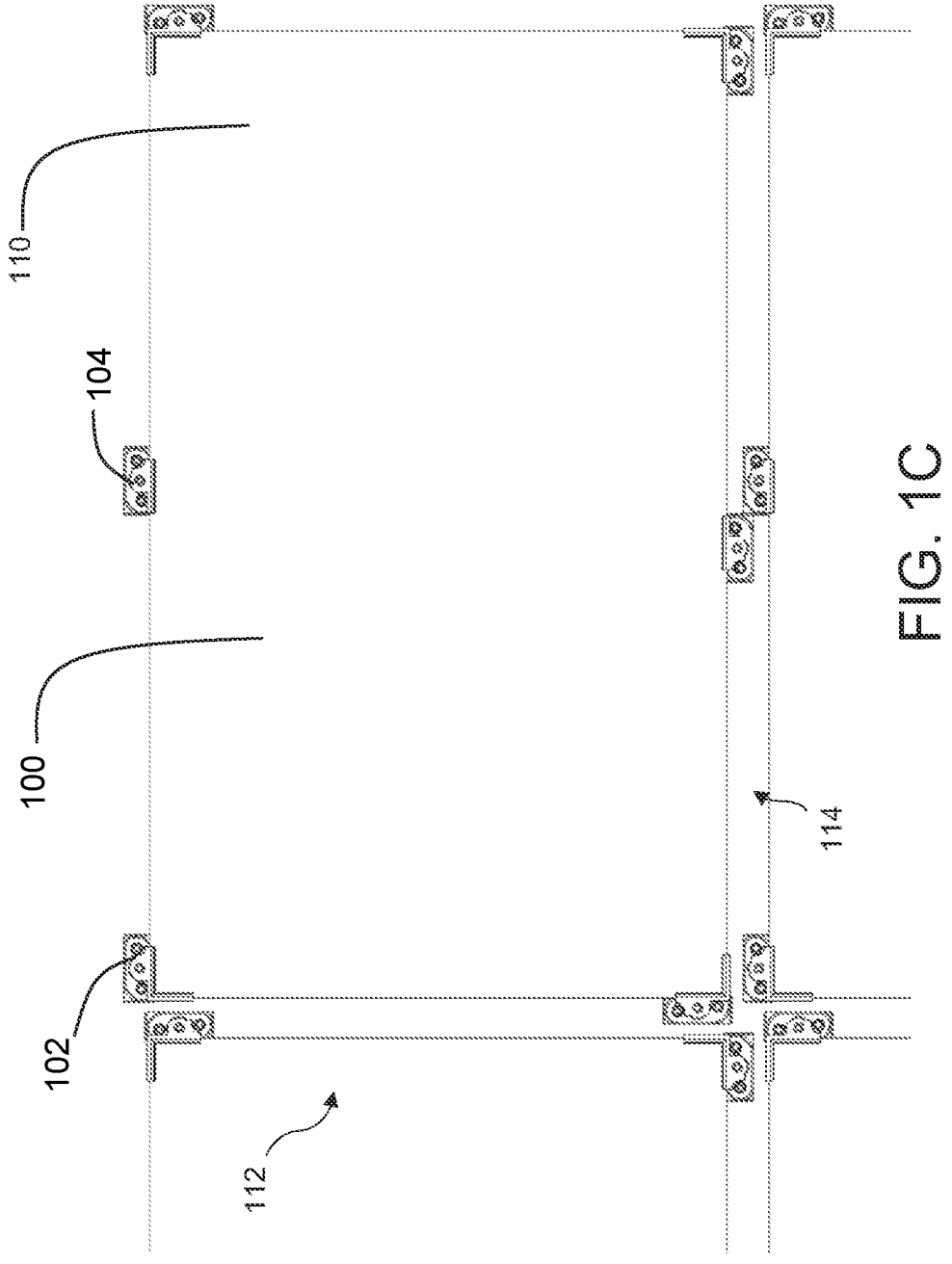
FIG. 1C is an enlarged view of a portion of the solar array mounted on the surface.

Referring initially to FIGS. 1A-1C, a solar array 112 of one embodiment includes solar modules 100 mounted on a surface 114 of a structure. The structure may be, for example, a building having a sloped roof or any other structure suitable for mounting solar modules. FIG. 1A is a top view of one solar module 100 of the solar array 112. FIG. 1B is a top view of the solar array 112. FIG. 1C is an enlarged top view of a portion of the solar array 112 including the solar module 100. The solar module 100 includes a solar laminate 110 and mounts or feet 102, 104 supporting the solar laminate. The solar module 100 may be frameless, as shown in FIGS. 1A-1C, or include a frame that extends along and supports the solar laminate 110. In some embodiments, the feet 102, 104 attach the solar module 100 to the surface 114 of the structure.

The solar laminate 110 includes a top surface 111, a bottom surface 113, and edges 115 extending between the top surface and the bottom surface. The edges 115 meet at corners 117. The solar laminate 110 has a width and a length. In this embodiment, the length of the solar laminate 110 is greater than the width of the solar laminate and the solar laminate is rectangular shaped. In other embodiments, the solar laminate 110 may have any suitable shape.

The solar laminate 110 also has a laminate structure that may include several layers. The layers may include, for example, glass layers, non-reflective layers, electrical connection layers, n-type silicon layers, p-type silicon layers, and/or backing layers. One or more layers may also include solar cells (not shown). In other embodiments, the solar laminate may have more or fewer, including one, layers, may have different layers, and/or may have different types of layers.

The solar laminate 110 of this embodiment includes photovoltaic material such as solar cells, and electrical interconnect conductors. The solar cells and electrical interconnect conductors may be positioned between materials including glass sheets, adhesives such as ethylene-vinyl acetate, and protectant films such as polyvinyl fluoride film. The laminate may also include external electrical terminals, wiring pigtails, and connectors to enable the module to be electrically connected to other modules and to power conversion devices. The laminate may also include electrical power conversion devices, such as micro-inverters or DC power maximizers, which may be attached to or embedded in the laminate.

As shown in FIG. 1A, the solar module 100 is frameless. In other words, the edges 115 of the solar module 100 are free of fully enclosing structures and have only discrete mounting structures or mounts, e.g., feet 102, 104, attached to the laminate 110. Being frameless has multiple advantages such as: i) reducing the weight and cost of the solar module 100; ii) increasing unobstructed surface area available for solar collection; iii) allowing water, snow, and other contaminants to be more easily shed from the module surface without a frame to obstruct flow at the edges. As a result, the frameless solar module 100 has increased energy generation in comparison to at least some solar modules including fully enclosing frames. In alternative embodiments, the solar module 100 may include any frame components that enable the solar module to function as described. Framed modules are ubiquitous in the market and, thus, components for the framed modules may be easier to procure than components for the frameless modules. Also, the frames of the framed modules provide integrated rigidity and support that may produce a stronger support structure than frameless modules.

The discrete mounting structures or mounts, e.g., feet 102, 104, attached to the laminate are suitably electrically insulating. For example, the mounting structures may be built from plastic or polymer materials. The non-conductive mounting structures may eliminate the requirement for ground bonding of the module and array. Accordingly, the electrically insulating mounting structures have at least two key benefits, which are: i) reduction in electrical potential gradients on the module which can give rise to potential induced performance degradation (PID); ii) reduction in labor and materials required to ground the solar array. In alternative embodiments, the solar modules may include some electrically conductive support components and/or module frames. In some embodiments, the mounts include different materials such as metal.

In reference to FIGS. 1A-1C, the solar laminate 110 is supported by multiple feet, or broadly mounts, 102, 104 which are mounted to the surface 114. The feet 102, 104 are positioned to sustain and distribute the load of the solar laminate 110. The load is due to the weight of the laminate and other up-forces and down-forces. For example, loads may be induced by temperature, wind, precipitation, and snow. Accordingly, the feet 102, 104 provide load distribution points which increase the loading capacity of the solar modules 100. In suitable embodiments, the solar modules 100 may include any number of feet 102, 104 distributed around the module periphery, or on the rear surface of the laminate, that enable the solar module to function as described. For example, in some embodiments, each solar module 100 may include four feet 102, 104, positioned either at the corners 117 or on the edges 115 of the laminate 110. In the illustrated embodiment, each solar module 100 includes at least six feet 102, 104. In particular, each solar module 100 includes feet 102, 104 at the corners 117 and on the edges 115 of the laminate 110. The feet 104 positioned along the edges 115 are located mid-span along the lengthwise sides or edges of the laminate 110. The side feet 104 further strengthen the module and better distribute the various loads. In further embodiments, the solar modules 100 may include eight or more feet 102, 104. For example, the solar modules 100 may include eight or ten feet 102, 104. The number of feet 102, 104 may be determined based on the size of the modules 100, the loads to be handled, and the strength and uniformity of the support structure surface 114. Feet 102, 104 attached to the rear surface of the laminate 110 may be used to increase the modules 100 resistance to snow load. In some embodiments, at least one of the solar modules 100 may include a number of feet 102, 104 that is different from the number of feet of a different solar module. In some embodiments, at least one solar module 100 of an array has a multi-point mounting scheme with mounts 102, 104 preinstalled on a framed or frameless module. The number of mounts 102, 104 in the multi-point mounting scheme may be in a range of 8 to 10.

The feet 102, 104 include corner feet 102 and side feet 104. A corner foot 102 is positioned at each of the corners 117 of the solar laminate 110. The side feet 104 are positioned along the edges 115 of the solar laminate 110. Specifically, the edge feet 104 are along the longest edges 115 midway between the corners. The corner feet 102 and the edge feet 104 protect the corners and edges of the solar laminates 110 during shipping and installation. In alternative embodiments, the solar module 100 may include any feet 102, 104 that enable the solar array 112 to operate as described. Additionally, each foot 102, 104 may be the same as or different from one or more other feet on the solar module 100. For example, in some embodiments, the solar module 100 includes four different corner feet 104.

Figures 4A, 4B:
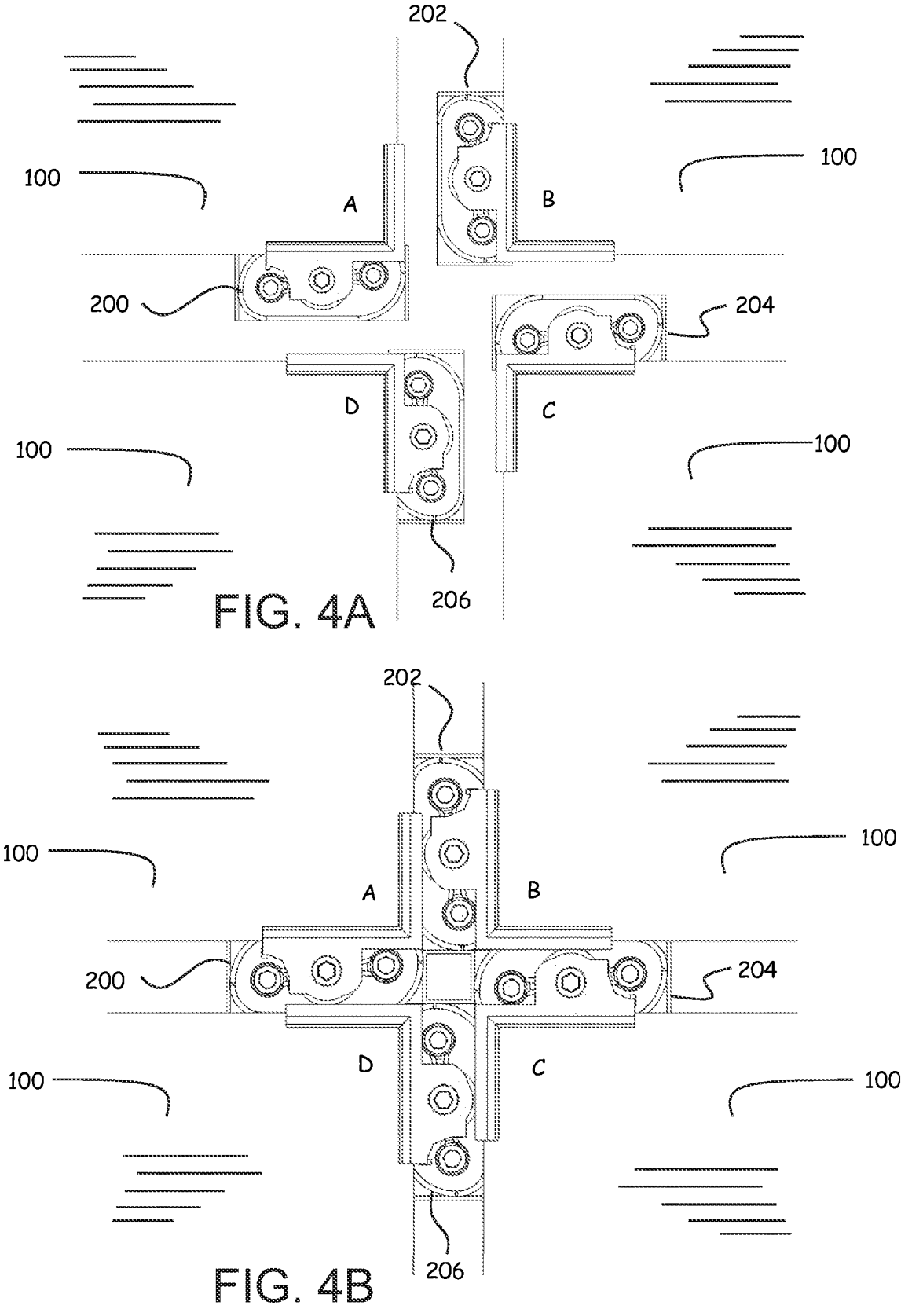
FIG. 4A is a top view of a portion of a solar array including solar modules in a premount configuration and corner mounts of the solar modules spaced apart from each other.
FIG. 4B is a top view of the solar array of FIG. 4A with the solar modules secured to the surface and the corner mounts of the solar module abutting each other.

The feet 102, 104 provide increased flexibility in positioning the modules 100 on the structure. As a result, the modules 100 may be positioned in different positions on the structure. For example, as shown in FIG. 1B, at least one of the modules 100 may be offset from adjacent modules 100. Moreover, the adjacent offset modules 100 may be engaged as shown in FIGS. 1B, 1C, and 4B. Specifically, the feet 102, 104 may contact the feet 102, 104 and/or the edge or frame of an offset adjacent solar module. Mounts 102, 104 on adjacent solar modules 100 contact each other but do not overlap each other. For example, the mounts 102 are oriented asymmetrically on corners or sides of the module 100 so the mounts do not interfere with each other when two modules are installed next to each other. For example, the corner mounts 104 are positioned asymmetrically about an axis bisecting the corner and the side mounts 102 are positioned asymmetrically about axes perpendicular to and bisecting the sides. The orientation of the mounts 102, 104 ensures that the mounts 102, 104 clear each other to allow for a tighter fit. In addition, the mounts 102, 104 are spaced apart an equal distance from adjacent mounts on each of the sides of the module 100 such that the mounts provide a uniform spacing on all sides for engaging adjacent modules. As a result, the solar modules are able to be positioned in a solar array in a denser arrangement and increase the square footage of energy producing surfaces in the array even for small or compact areas such as roofs. In addition, the solar arrays are simpler and quicker to assemble and maintain because the mounts 102, 104 on the solar modules 100 do not overlap. For example, installers do not have to spend time ensuring proper engagement or overlapping of the mounts 102, 104 and simply have to position the mounts 102, 104 to contact each other. Moreover, the installers may be able to access individual mounts 102, 104 for installation or replacement easier because adjacent mounts 102, 104 are not overlapping.

In addition, the solar modules 100 in the array are spaced apart from each other (i.e., there are gaps between adjacent solar modules) and have broken lines of sight along the edges (i.e., the solar modules do not contact each other, and the edges of adjacent solar modules are not positioned end-to-end). For example, the gaps between the modules 100 and the mounts 102, 104 that cover portions of the solar modules edges provide discontinuous lines of sight along the edges which can facilitate hiding misalignment of the solar modules mounted to a surface. In addition, the asymmetric positioning of the mounts 102, 104 on the modules hides the visual appearance of misalignment of the modules. As a result, the time required to install the solar modules may be reduced because the installers do not have to be concerned with providing perfect visual alignment of each solar module.

As shown in FIGS. 1A-1C, the example photovoltaic module 100 has integrated racking and consists of 6 mounts located at the corners and sides of the module 100. A mount 200 at corner A of the module 100 is oriented such that its base is along the edge A-B. A mount 202 at corner B of the module 100 is oriented such that its base is along the edge B-C. A mount 204 at corner C of the module 100 is oriented such that its base is along the edge C-D and a mount 206 at corner D of the module 100 is oriented such that its base is along the side D-A. Accordingly, the mounts 200, 202, 204, 206 are oriented asymmetrically.

Figure 4C:
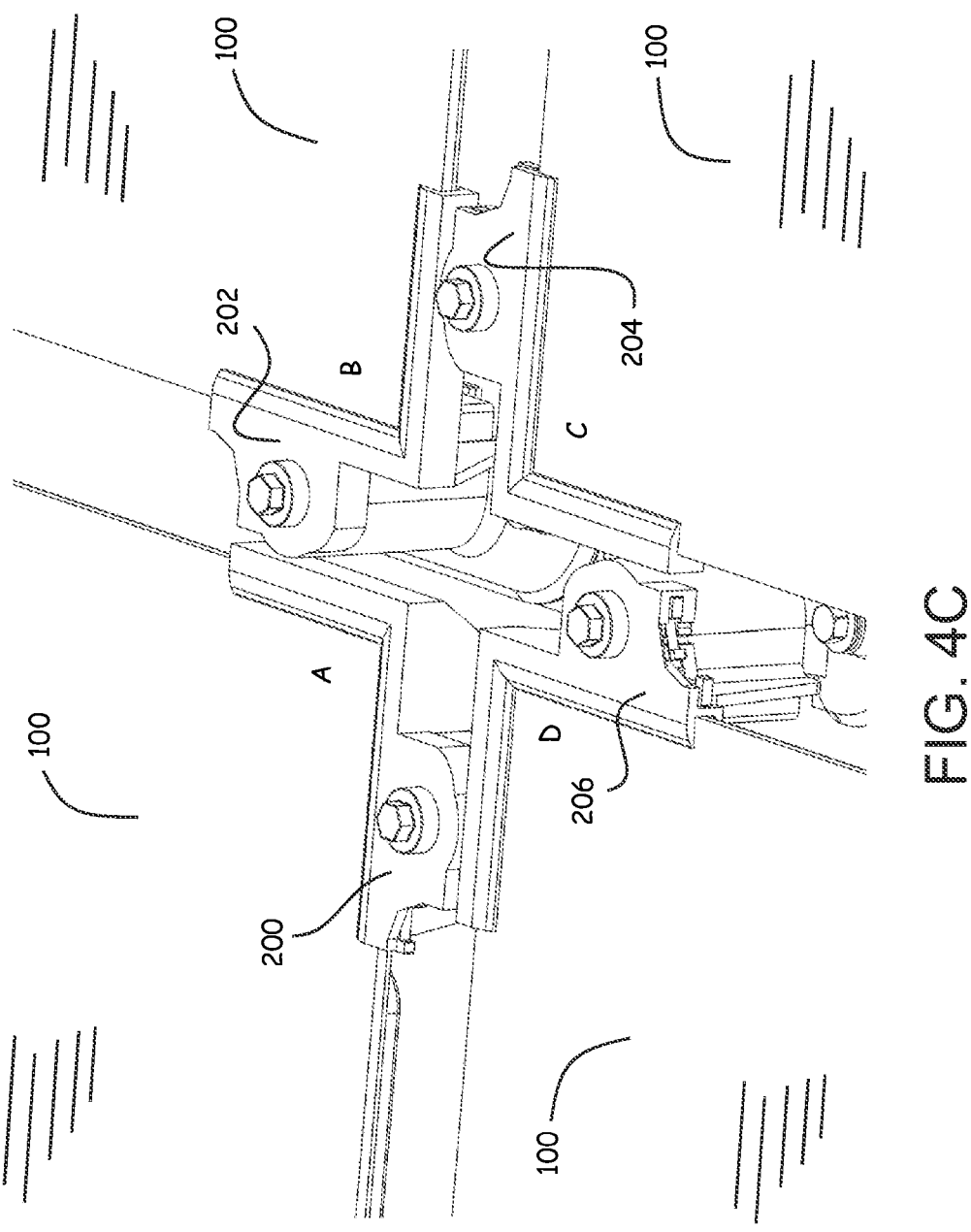
FIG. 4C is a perspective view of the solar array of FIGS. 4A and 4B with the solar modules secured to the surface and the corner mounts of the solar module abutting each other.
Figure 4D:
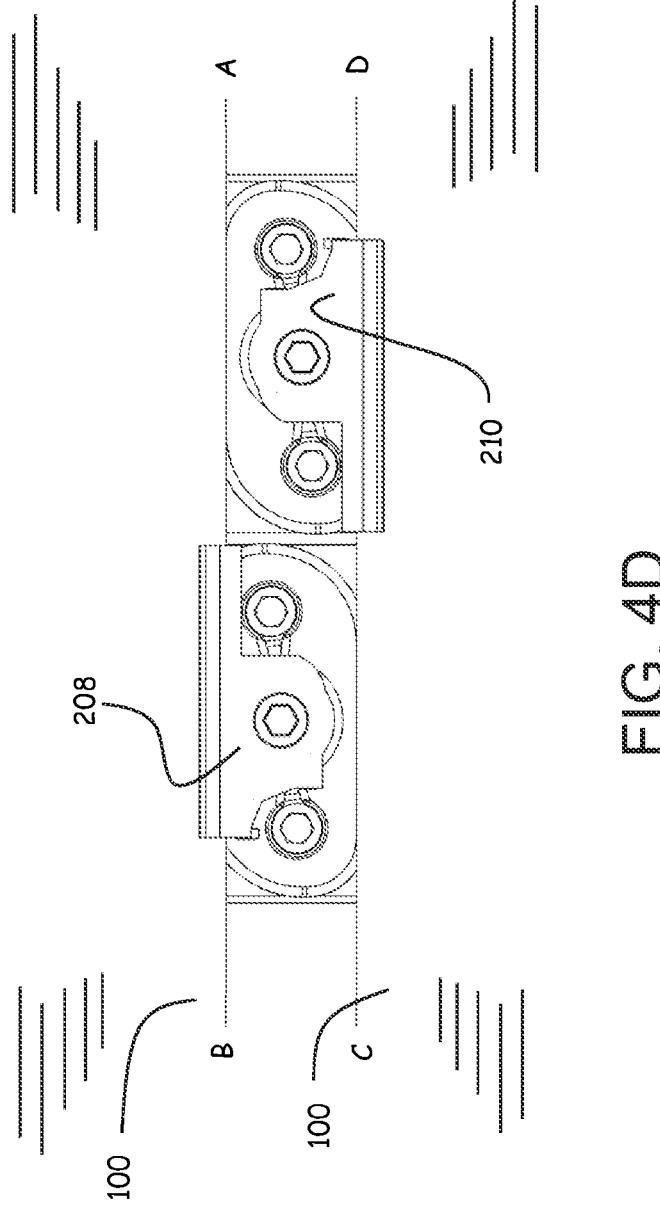
FIG. 4D is a top view of a portion of the solar array of FIGS. 4A-4C with the solar modules secured to the surface and side mounts of the solar module abutting each other.

As shown in FIG. 1A, the mounts 208, 210 are offset from midlines of the solar module. For example, the mount 208 at edge A-B is offset from the center of the length of the edge A-B and the mount 210 at edge C-D is offset from the center of the edge C-D such that the mount 208 at the edge A-B will not interfere with mount 210 at edge C-D when the modules 100 are placed next to each other. As a result, the mounts facilitate a tighter fit between panel as shown in FIG. 4D.

FIG. 4A shows four modules 100 near their final installation positions. The mounts 200, 202, 204, 206 are located along edges of the modules 100 and the bases of the mounts do not contact each other until the modules 100 are installed at their final location as shown in FIGS. 4B and 4C.

Figure 2:
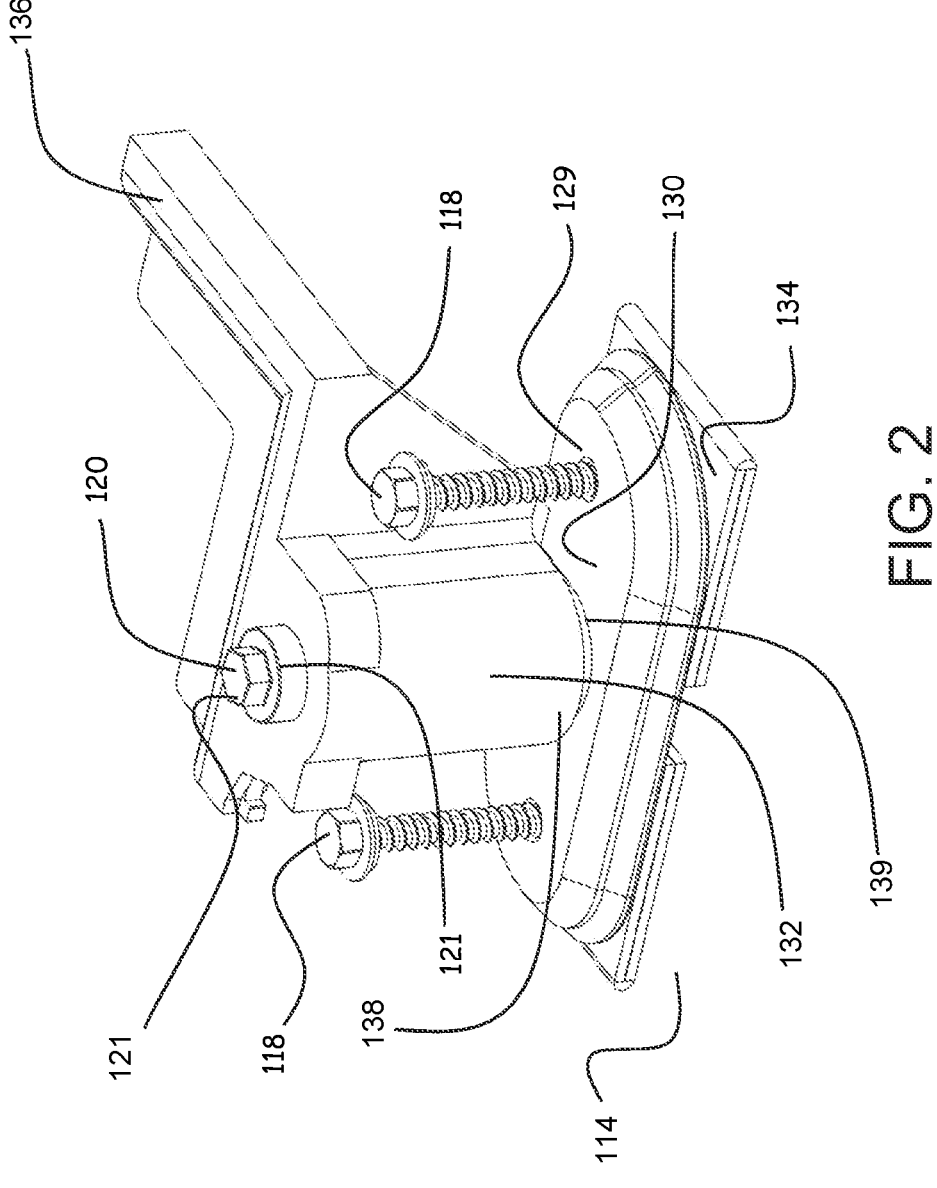
FIG. 2 is an enlarged view of a corner foot of the solar module shown in FIG. 1A.

FIG. 2 is an enlarged view of an example corner foot 102 of the solar module. Each foot 102, 104 is attached to the structure surface 114 (shown in FIGS. 1B and 1C). The structure surface 114 is, for example, a roof of a building. Furthermore, each foot 102, 104 is attached to and holds the solar laminate 110 in place. In some embodiments, the structure surface 114 is sloped and the feet 102, 104 secure the solar module 100 to the structure surface 114 to resist forces such as forces due to gravity, snow, precipitation and wind. The foot 102, 104 may contain a leveling device 120 to enable leveling of the modules 100 such that the array 112 may be visually planar even if the underlying surface 114 is uneven. Also, the foot 102, 104 may enable easy removal for post-installation service or replacement of the module 100. In addition, the foot 102, 104 may contain cable retention features to keep array wiring from resting on the surface 114.

Each foot 102, 104 suitably includes the leveling device 120, a base 130, a top or support bracket 132, 140, flashing 134, and fasteners 118. The base 130 includes a lower fastener holder 129 that is substantially planar or flat. The lower fastener holder 129 extends along the structure surface 114 and defines a mounting surface facing the structure surface. The base 130 is secured to the structure surface 114 by one or more fasteners 118 extending through openings in the lower fastener holder 129. The openings in the base may be threaded or unthreaded. The base 130 may be interchangeable with other bases and may connect to different support brackets such that the base 130 is a universal base. In alternative embodiments, the base 130 may be otherwise configured to enable the solar module 100 to function as described. The fasteners 118 may be screws, nails, threaded rods and nuts, and other fastening devices.

As shown in FIG. 2, the support bracket 132 of each foot 102, 104 acts as a support bracket and may include a receiver 136, and a sleeve or slide 138. The receiver 136 and the slide sleeve may be integrally formed, or joined together as a single piece, such that the sleeve 138 and the receiver 136 are not removable and cannot be separated without damaging the support bracket 132. Previous systems do not include a height adjustment mechanism as part of the solar module 100. For example, the solar modules 100 are typically produced separately and are not attached together until at the job site. Moreover, many manufacturers may believe that integrating components into the module or frame would disrupt supply chain, effect shipping density, and thus increase costs of the solar modules. In addition, manufacturers may be concerned that changing from conventional designs for modules would limit the use to specific applications and would not be compatible with racking systems. Embodiments of the disclosed solar modules solve these problems by, for example, providing preassembled solar modules with integrated features. The mounts 102, 104 on the solar modules 100 facilitate shipping and simplify installation without unduly increasing costs because of the disclosed features. In other embodiments, the receiver 136 and the sleeve 138 may be formed separately and removably attached.

The receiver 136 of the support bracket 132 is sized and shaped to receive the laminate 110. In this embodiment, the receiver 136 includes sidewalls forming a C-shaped channel for receiving the laminate 110. The corner feet 102 (shown in FIG. 2) include L-shaped receivers 136 for receiving the corners of the laminate 110. The side feet 104 (shown in FIGS. 1A-1C) include linear receivers 136 defining linear channels for receiving the edges 115 of the laminate 110. An adhesive pad may be positioned adjacent each receiver 136 to attach the laminate to the foot 102, 104. In alternative embodiments, the support brackets 132, 140 may have any receivers 136 that enable the feet 102, 104 to function as described.

The sleeve 138 of the support bracket 132, 140 may be configured to movably connect to the base 130. For example, the sleeve 138 slides along a guide 139 attached to the base 130 such that the sleeve is movable or slidable relative to the base 130. The leveling device 120 controls the position of the sleeve relative to the base 130. In this embodiment, the guide 139 is removably received within the sleeve 138, such that the guide and sleeve telescope as the module level is adjusted, thus protecting the leveling device 120 and the guide from the elements, as well as improving aesthetics. In other embodiments, the support bracket 132, 140 and the base 130 may be combined as a single part.

The sleeve 138 defines a bore extending along a height of the support bracket 132 and along an axis substantially perpendicular to the surface that the mount is mounted to. The bore of the sleeve 138 is sized to receive a fastener. The bore may include internal threads and be configured to threadingly engage a fastener.

The leveling device 120 comprises a leveling fastener 121 extending through the base 130 and the support bracket 132, 140. The leveling fastener 121 is adjustable relative to the base 130 to adjust the position of the support bracket 132 and the laminate 110 in relation to the foot 102, 104. For example, the leveling fastener 121 includes threads that engage threads of the bore of the sleeve 138, the base 130, a bearing plate, a lock groove, and/or a head. The leveling fastener 121 is adjusted by rotating the leveling fastener in a direction about a rotation axis. The leveling fastener 121 is connected to the support bracket 132, 140 such that the support bracket is positionable with the leveling fastener. For example, the leveling fastener 121 may engage threads of the bore of the sleeve 138 and/or the leveling fastener 121 may be affixed to the support bracket 132, 140 in any suitable manner. For example, a nut or clip is positioned on the leveling fastener 121 and configured to retain the position of the support bracket 132, 140 on the fastener. In further embodiments, the bore of the sleeve 138 includes protrusions. In alternative embodiments, the leveling device 120 may have any configuration that enables the solar module 100 to function as described.

Figures 3A, 3B:
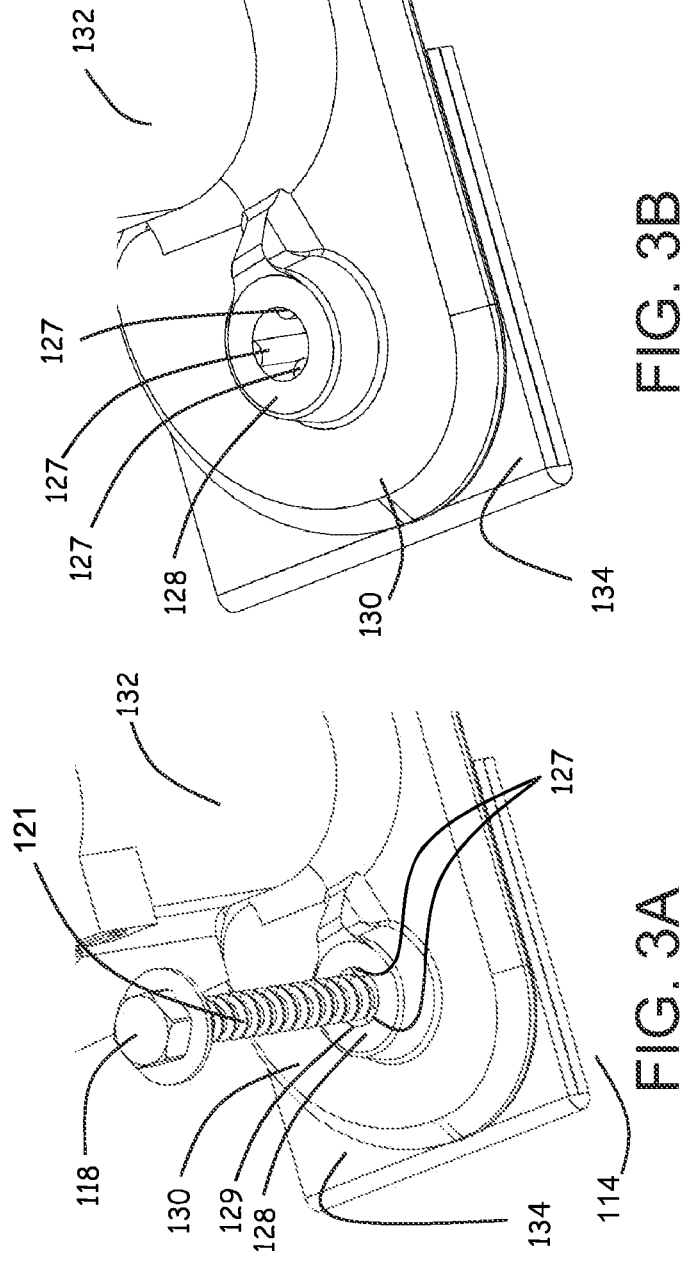
FIG. 3A is an enlarged view of an example of a foot for use with the solar module shown in FIG. 1A, the foot including entrapment features for entrapping fasteners in a premount configuration.
FIG. 3B is an enlarged view of the foot of FIG. 3A, with the fasteners omitted to illustrate the entrapment features.

The feet 102, 104 have preassembled, premount configurations in which the fasteners are retained in the mounts and ready for installation. FIGS. 2, 3A, and 3B show a fastener holder 129 that is a part of the universal base 130 for holding fasteners 118 prior to their final installation to the structure to which the base is to be secured. In the preassembled configuration, the fasteners 118 are at least partially retained in the base 130 of the foot 102, 104 prior to installation on the structure surface 114 such that the module 100 is a complete assembly ready for mounting on the structure surface 114 without additional parts.

Referring to FIGS. 3A and 3B, the feet 102, 104 may include retainment features such as protrusions (e.g., fastener guides 127) in a fastener hole that hold the fastener in a pre-installation position. In addition, the fastener guides 127 provide low resistance once the fastener goes into the surface 114 to allow the foot to be pulled down to the surface. Without this feature, the threads in the foot would combine with the threads of the surface to maintain the distance between the foot and the deck. In some embodiments, the fastener guides 127 are stripped by the fastener threads once the fastener is fully driven into the feet 102, 104 and the surface 114 to ensure compression forces are developed by the fastener between the mount and the structure to which it is attached. In other embodiments, the retainment features includes a designed mismatch of the threads or extra material in the threads such as mold lines that provide resistance to unintended rotation. In the example, the retainment features require more than 1 in-lb. of torque to rotate the fasteners in the openings.

FIG. 3A shows a fastener 118 secured within a fastener holder 129 of a raised platform 128 by a plurality of fastener guides 127. In the example, the fastener guides 127 include protrusions that protrude from within the fastener holder 129 into a threaded bore in the fastener holder such that they secure the fastener 118 when the fastener 118 is threaded into the holder 129. In addition, the fastener guides 127 are constructed in such a way as to be easily stripped during fastener installation into the support structure. The stripping of the threads facilitates closing a gap between the base and support structure that would be caused by the threads made by the fastener in the fastener holder 129 and the threads made by the fastener in the support structure if the fastener guides 127 were not stripped. In another embodiment, the fastener holder 129 is not within a raised platform on the base 130 and instead is flush with a planar upper surface of the base, as illustrated for example in FIG. 2.

The preassembled configuration of the feet 102, 104 includes at least the number of fasteners 118 required to adequately secure the foot 102, 104 to the structure surface 114. Therefore, the solar module 100 can be mounted to the structure surface 114 without the use of additional fasteners 118. In some embodiments, each foot 102, 104 includes more fasteners 118 than are nominally required to adequately secure the foot to the structure. As a result, the installer may omit or skip securing some fasteners 118 that are difficult to reach and the foot 102, 104 will still be adequately secured to the structure surface 114. Also, more fasteners 118 than are nominally required may be used in cases where the strength of the structure surface 114 is unknown or suspect.

The fasteners 118 may allow the feet 102, 104 to be securely attached to the sheath material of the structure surface 114 rather than directly to underlying structure, such as the rafters or trusses in the case of a roof, or other structural elements. As a result, the solar module 100 allows flexibility in positioning the module and the array on the structure surface 114 without compromise to structural integrity of the structure surface 114. Also, mounting the module 100 directly to sheath material simplifies installation by eliminating the time-consuming need to locate the structural elements underneath the surface 114. In contrast, prior art systems using a pre-positioned mounting foot separate from the module require careful and time consuming layout of the array prior to module installation, and do not have the simplicity of installation of the fully integrated module described. In addition, some prior art systems require an installer to locate structural elements such as through trial and error from the topside, or by drilling exploratory holes which must then be weatherproofed.

In reference to FIGS. 2 and 3A, the flashing 134 is disposed between the mounting surface and the structure surface 114. The flashing 134 may be any material that facilitates a watertight seal between the structure surface 114 and the base 130. In this embodiment, the flashing 134 is made of a compliant rubber, such as butyl, and is adhered to the mounting surface 114. In other embodiments, any sealant or gasket materials can be used, including polymers and room temperature vulcanization silicone. The flashing 134 provides a barrier that inhibits fluid flowing between the base 130 and the structure surface 114. In addition, the flashing 134 can conform to any irregularities or undulations of the structure surface 114 when compressed by the fastener 118. In addition, the flashing 134 is aligned with the openings such that the fasteners 118 extend through the flashing when the fasteners are secured to the structure surface 114. Accordingly, portions of the flashing 134 adhere to the fasteners 118 and fill gaps in the structure surface 114 around the fasteners. In some embodiments, the fasteners 118 extend through multiple layers of the structure and the flashing 134 fills gaps in the layers. As a result, the flashing 134 inhibits moisture penetrating into the structure around the fasteners 118. In alternative embodiments, the flashing 134 has any configuration that enables the solar module 100 to function as described.

In reference to FIG. 4B, the feet 102, 104 of adjacent solar modules 100 contact or abut each other but do not overlap when the solar modules are assembled in the solar array 112. Also, the feet 102, 104 are offset from the feet 102, 104 on adjacent modules 100. Accordingly, the feet 102, 104 facilitate aligning the solar modules 100 on the structure surface 114. In addition, the distance or gap between adjacent solar modules 100 is less than the cumulative width of two of the feet 102 or two of the feet 104. As a result, the solar modules 100 may be simpler to install and may be installed in a denser array than other modules.

Each of the solar modules 100 is preassembled for direct mounting to a structure. Specifically, each solar module 100 is preassembled as a single unit including all components, such as wire management devices, fasteners, and flashings required to install the solar module 100 to the structure 114. Other embodiments might also include module-mounted power conversion or monitoring devices. In particular, each solar module includes captive fasteners 118 to reduce the need for external fastening components. Any number, including just one module, of the solar modules 100 can be shipped in the preassembled and/or stacked configurations, and installed as a single unit or as an array including any number of modules. As a result, the solar modules 100 are simpler to ship and install.

The solar modules 100 may be shipped in a partially assembled manner. For example, the laminate 110 and at least some of the mounts 102, 104 may be shipped to an installation site separately and attached together at the installation site. The installers may attach the mounts 102, 104 to the laminate 110 before or after securing the mounts 102, 104 to the surface.

During installation and assembly of the solar array 112, an installer positions a first solar module 100 on the structure surface 114 in a desired position. In the preassembled configuration of the solar module 100 shown in FIG. 2, the fasteners 118 are captive or preinstalled in the foot and pre-aligned for installation. More specifically, the fasteners 118 are retained in the openings by retainment features or projections. As a result, the installer may use a tool, such as a manual or motorized screwdriver or socket wrench or hammer, and a top down tool engagement method to secure the fasteners 118 through the feet 102, 104. In a mounted configuration, the fasteners 118 extend through the feet 102, 104 and the structure surface 114 to secure the solar module 100 in position. During or after the installation, the installer may adjust one or more of the leveling fasteners 120 to level the solar module 100 in relation to the structure surface 114. The installer then positions a second solar module 100 on the structure surface 114 adjacent the first solar module 100. The installer may align the feet 102, 104 of the second solar module 100 and the feet 102, 104 of the first solar module 100 as shown in FIGS. 4A-4D, such that the foot of one solar module 100 abuts but does not overlap the lower planar portion of an adjacent module 100. The installer may then secure the feet 102, 104 of the second solar module 100 to the structure surface 114 with at least some of the fasteners 118. The installer may repeat the process for any number of solar modules 100 to assemble the solar modules in the solar array 112.

Figure 5A:
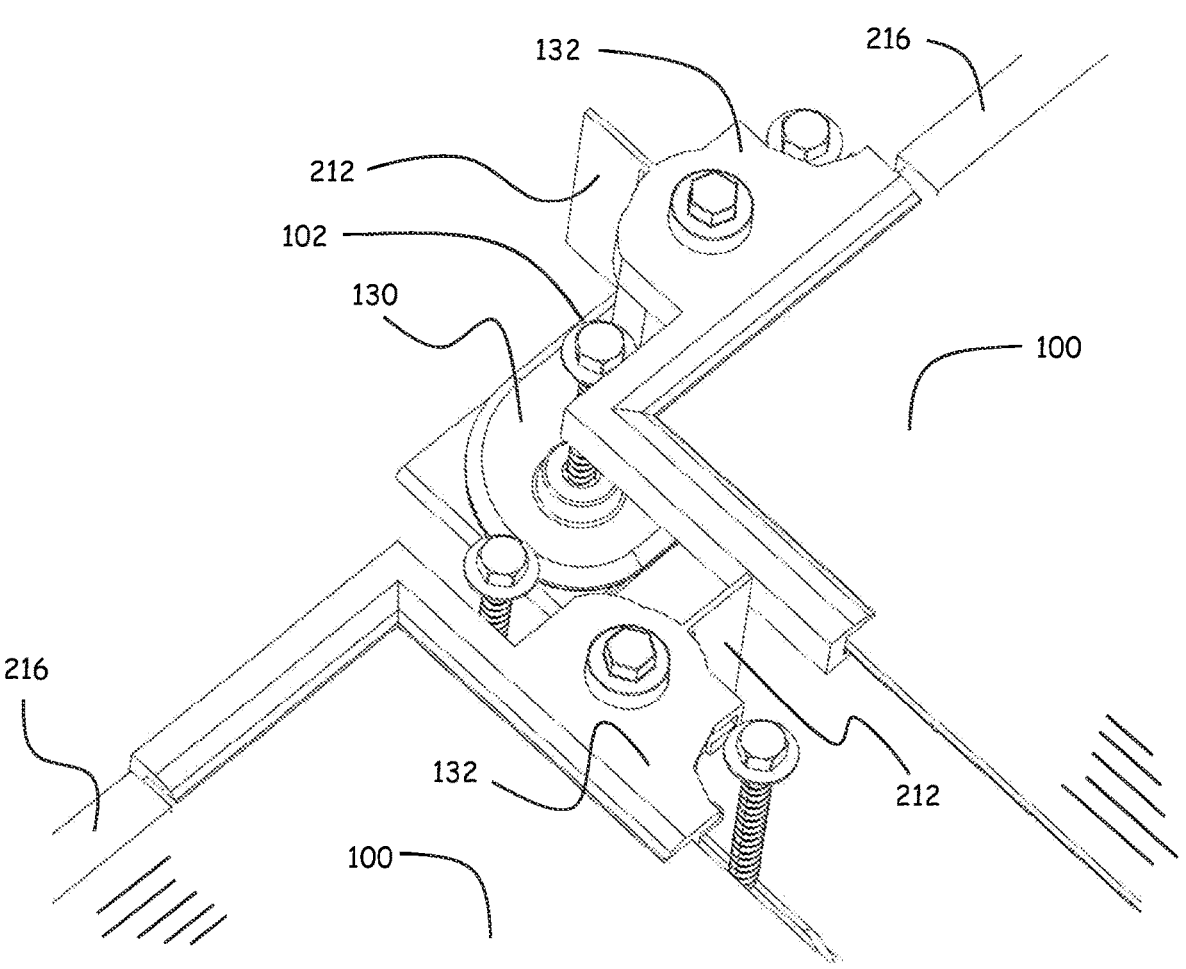
FIG. 5A is a perspective view of a portion of a solar array including solar modules, the solar modules each include mounts arranged to secure the solar modules to a surface and spacers arranged to define gaps between the solar modules.
Figure 5B:
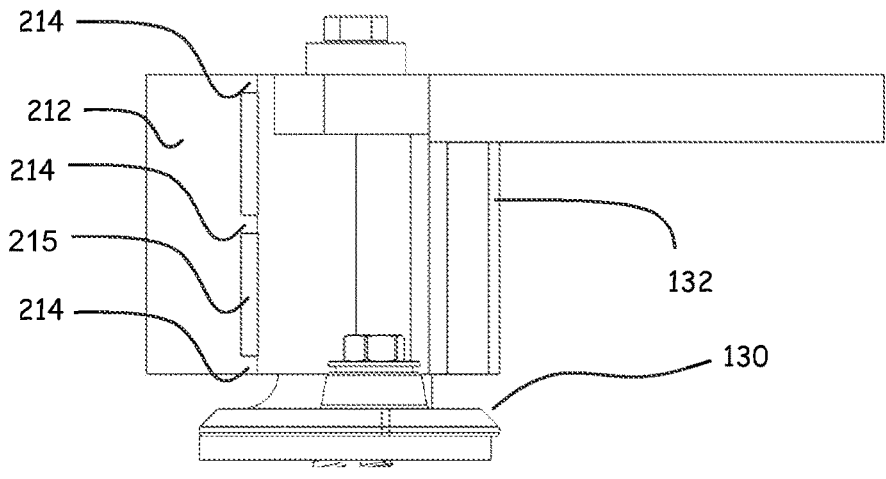
FIG. 5B is a side view of a corner mount of a solar module of the solar array shown in FIG. 5A.
Figures 6A, 6B:
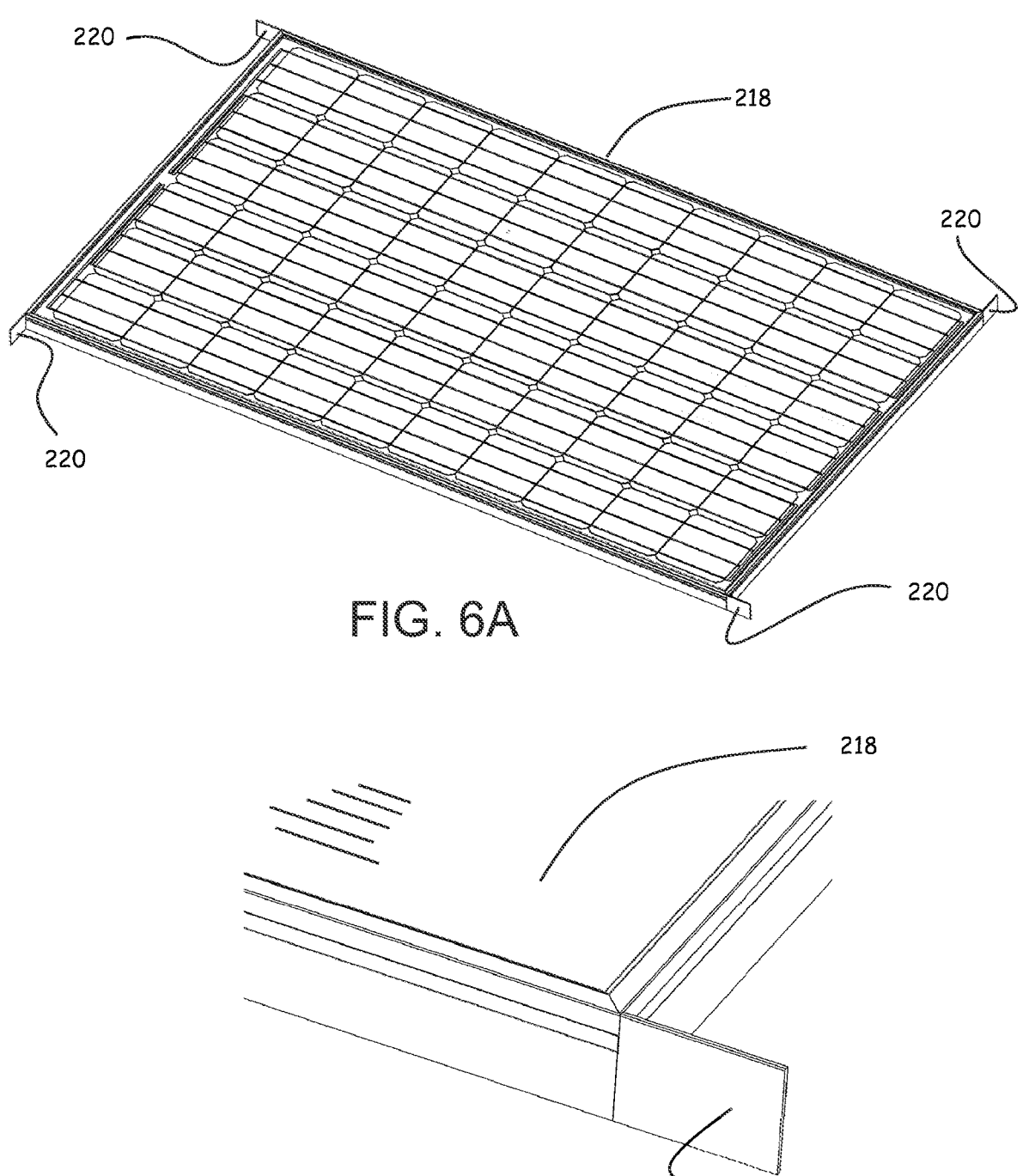
FIG. 6A is a perspective view of a solar module including a frame and spacers extending from the frame.
FIG. 6B is an enlarged perspective view of a portion of the solar module of FIG. 6A illustrating a spacer on the frame.
Figures 6C, 6D:
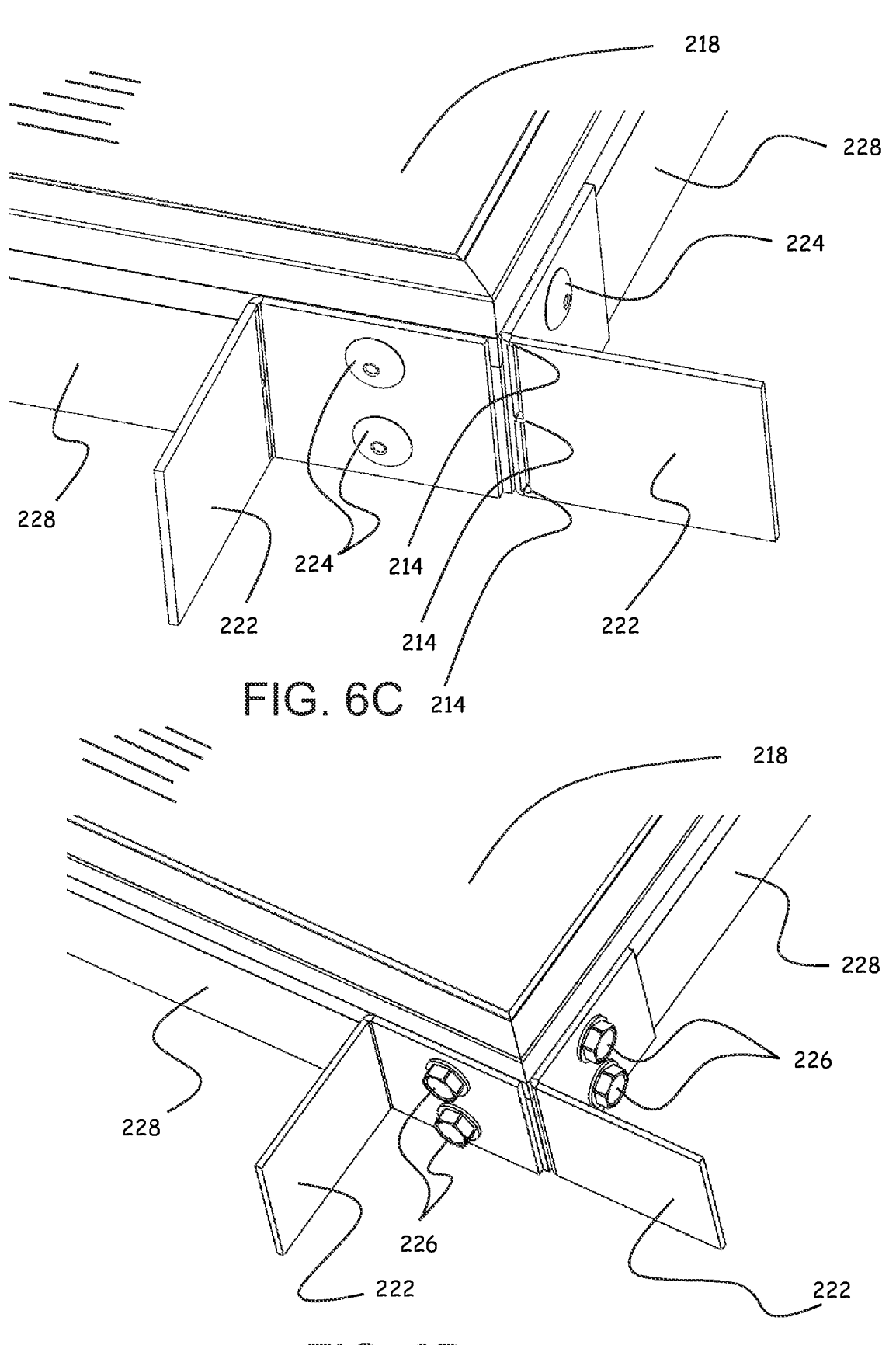
FIG. 6C is an enlarged perspective view of another example of spacers for use with a solar module of FIG. 6A.
FIG. 6D is an enlarged perspective view of yet another example of spacers for use with a solar module of FIG. 6A.

FIG. 5A shows two modules 100 adjacent to each other spaced apart by a gap spacer 212. In particular, the modules 100 each include the gap spacer 212. The gap spacers 212 contact or engage adjacent modules 100 and are sized and shaped to provide a predefined gap between the modules. For example, the gap spacer 212 extends outward from the mount, frame, or other component of the solar module in a horizontal direction to define the furthest extent of the solar module 100 in one direction. In the example, the spacer 212 extends outward from an outer surface of a support bracket 132 of the corner mounts 102 of the module 100. The spacer 212 is a flat or planar wing that extends vertically along the support bracket 132 from the base 130 to an upper surface of the corner mount 102 and horizontally outward from the top. In another embodiment, the gap spacer 212 is attached to the support bracket 140 of the side mounts 104. In another embodiment, a frame integrated gap spacer 220 as shown in FIGS. 6A & 6B, is part of a PV module's frame wall. In another embodiment, a frame attached gap spacer 222 as shown in FIGS. 6C and 6D, is attached to a PV module's frame wall 228 by either permanent fasteners 224 or removable fasteners 226, or by an adhesive. In another embodiment, the gap spacer 212, 222 is field adjustable to change the gap distance between modules. For example, the gap spacer 212, 222 may include a hinge, a flexible portion, a retractable portion, or other adjustment mechanism. As shown in FIGS. 5B and 6C, break away tabs 214 can be utilized to make the gap spacers 212, 222 field removable. The breakaway tabs 214 include relatively narrow connecting sections that are separated by gaps 215 and define weak points for the spacers 212, 222 to be removed. In another embodiment, the gap spacers 212, 222 are removable and can be replaced with gap spacers of various lengths. In some embodiments, the gap spacers 212, 222 are devices incorporated into the module (framed or unframed).

For example, the gap spacers 212, 222 provide a ratio of a gap distance (between modules) to height (between modules and the mounting surface) in a range of at least 0.15 to 2.5. The gap spacers 212, 222 can be factory installed and/or field installed. Installing the gap spacers 212, 222 at the factory can reduce costs to assemble the solar modules and simplify installation of the solar modules in the field. Also, in some examples, the gap spacer 212, 222 is adjustable in the field to produce varying gaps between modules. The gap distance between modules may be required according to the arrangement of the solar array. For example, the gap distance may facilitate accessing the solar modules, and provide space for components such as mounts 102, 104 and electrical components. In addition, the gap distance facilitates the discontinuous lines of sight, as described previously, between solar modules to hide uneven lines. As a result, the gap distance simplifies installation of the solar arrays. Moreover, the gap spacers 212, 222 provided on the modules further simplify installation because installers do not have to measure or otherwise determine the gap distance during installation.

Figure 7:
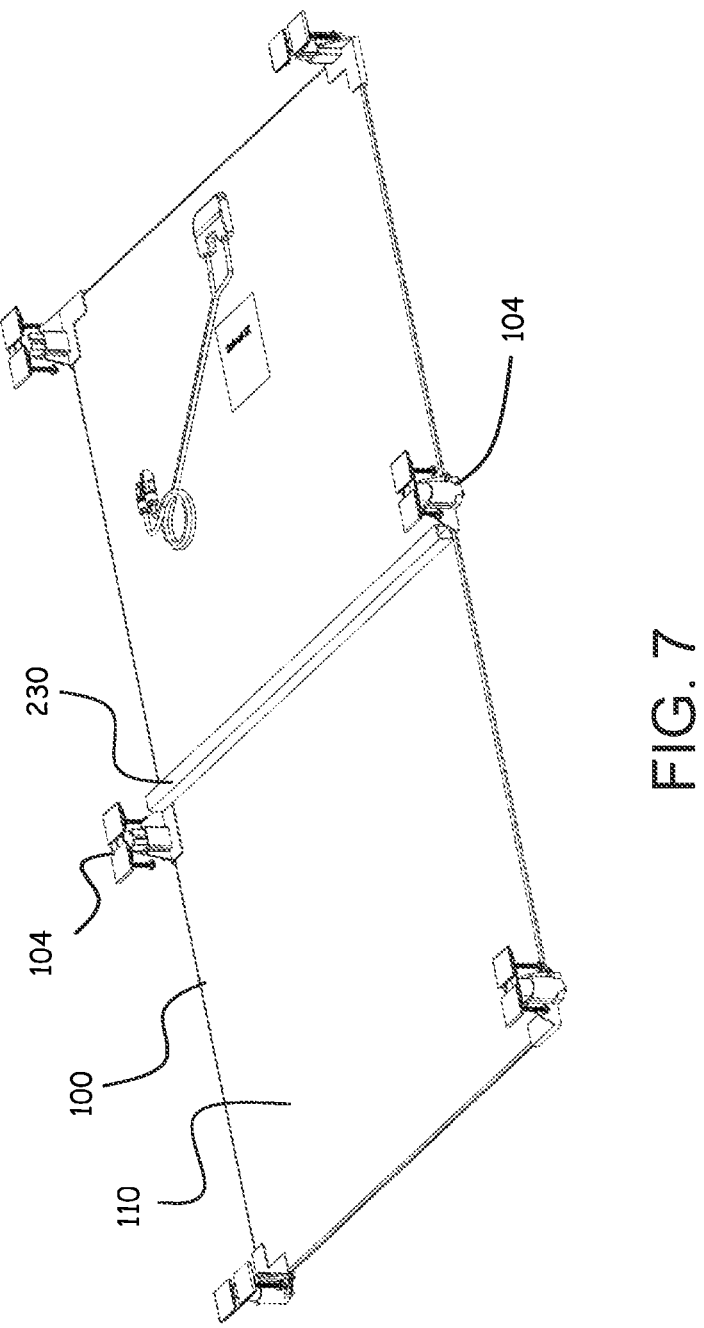
FIG. 7 is a perspective view of an underside of a solar module including integrated supports.

Referring to FIGS. 7-9B, a support 230 can be added to the solar module 100 to increase wind and snow load resistance. FIG. 7 shows a support 230 spanning across the back of the photovoltaic module from side mount 104 to side mount 104. The support 230 may extend in different directions and/or be attached to different components. For example, the support 230 may extend between the corner mounts 102 of the module 100. The support 230 may be linear, angled or bent, and/or curved.

The module 100 includes integrated racking and mounts 102, 104 that are adapted to engage or receive the support 230. For example, the support 230 extends across a width of the module 100 and engages mounts 104 on opposite sides of the module. The support 230 can be metallic, a composite, or a polymer or any other material. In the example, the support 230 is adhered to the back side of the laminate 110 and to the side mounts 104. In another embodiment, the support is adhered to the laminate 110 and mechanically attached to the side mounts 104. In another embodiment, the support 230 is adhered and mechanically attached to the side mounts 104. In another embodiment, the support is attached to any mount 102, 104 on the module 100 and/or directly to the laminate 110.

To increase the structural connection between the side mount 104 and the support 230, a support acceptance feature 232, 234 can be added to the side mount 104 or the corner mount 102. The acceptance features 232, 234 include a structural body that extends from or along the mount 102, 104 and receives and engages the support 230. The acceptance features 232, 234 can provide a surface to attach the support 230 to the mount 102, 104. The acceptance feature 232, 234 can include adhesives or fasteners to increase the structural integrity between the side mount 104 and the support 230. In addition, the support acceptance feature 232 can include an electrically insulative material arranged to provide electrical safety by providing a touch safe zone to prevent the risk of electric shock.

Figures 8A, 8B:
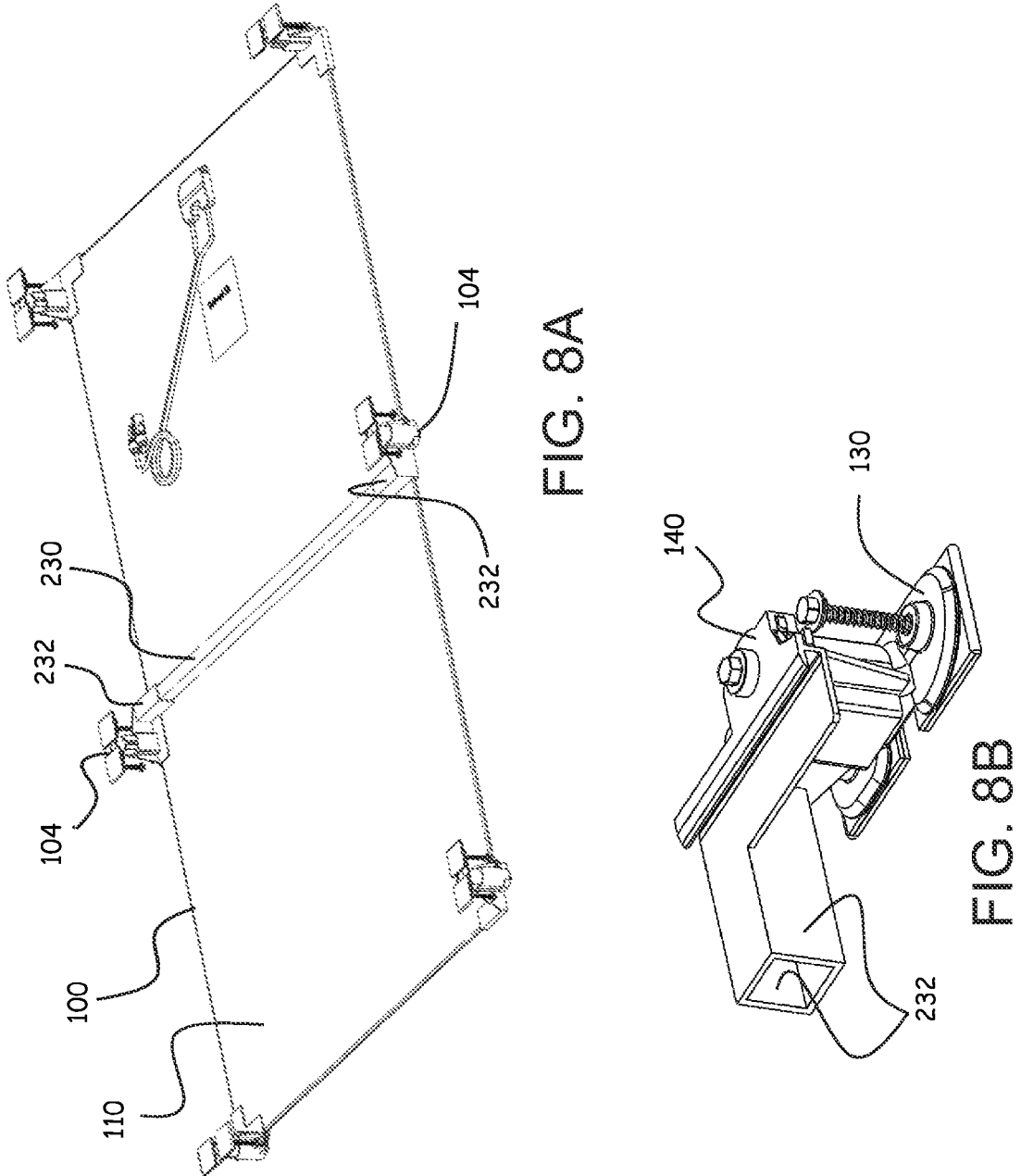
FIG. 8A is a perspective view of an underside of a solar module with supports and support acceptance features.
FIG. 8B is an enlarged perspective view of a mount and the support acceptance features of the solar module of FIG. 8A.
Figure 9A:
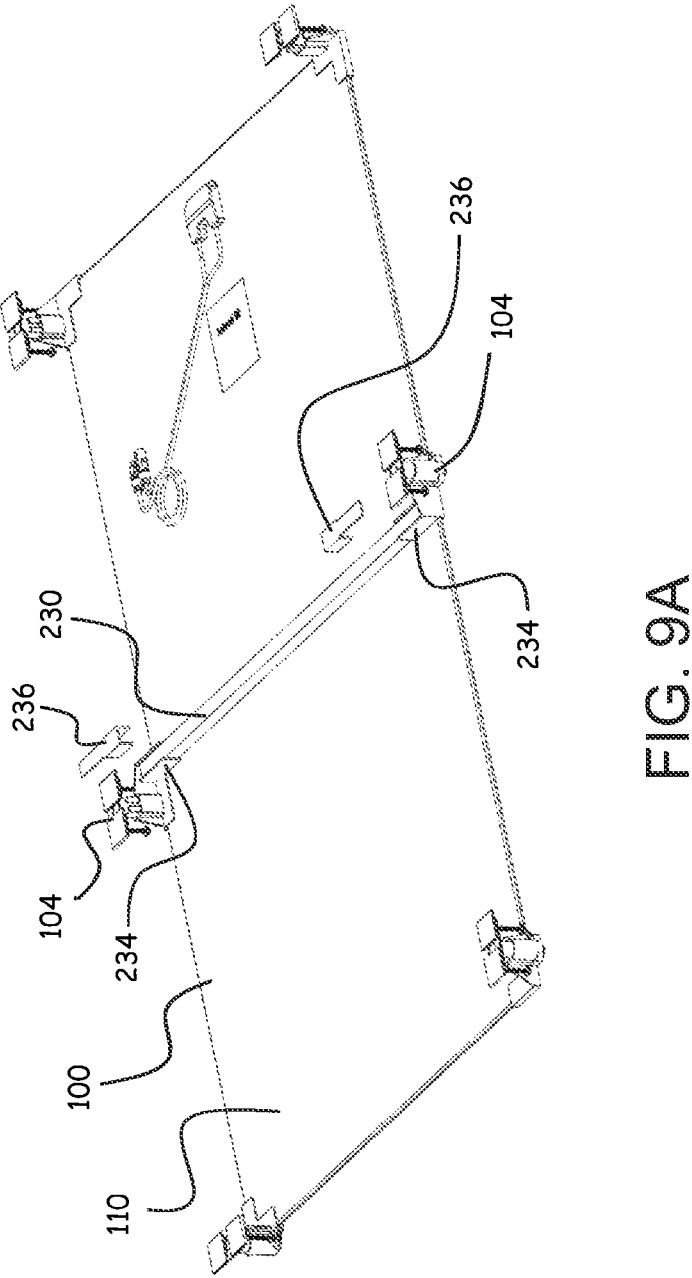
FIG. 9A is a partially exploded perspective view of an underside of a solar module with integrated supports.
Figures 9B, 9C, 9D:
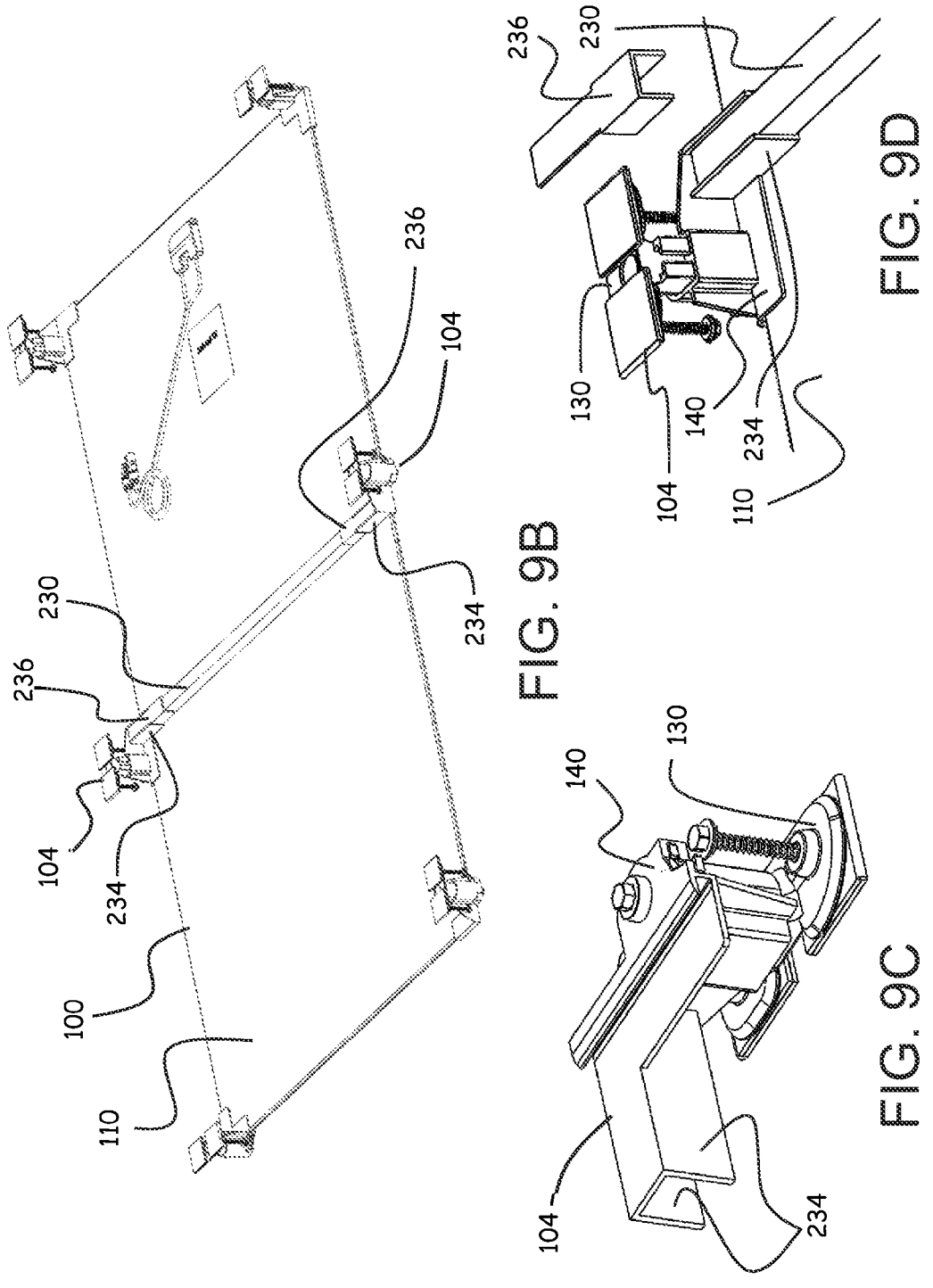
FIG. 9B is a perspective view of the underside of the solar module of FIG. 9A with the support structure attached to the solar module.
FIG. 9C is an enlarged perspective view of a mount of the solar module of FIGS. 9A and 9B, the mount including a support receiver.
FIG. 9D is an enlarged perspective view of a portion of the solar module of FIGS. 9A-9C illustrating assembly of the support and the mount.

FIGS. 8A and 8B show the side mount 104 with a side support bracket 140 that includes a support acceptance feature 232 that fully encloses a support 230 at a distance from the edge of the module 100. For example, the support acceptance feature 232 is arranged to provide structural support and/or electrical safety. In another embodiment, the support acceptance feature 232 is included on the universal base 130 or any other component of the side mount 104. To facilitate manufacturing, an open support acceptance feature 234 (shown in FIG. 9C) can be used to increase structural integrity and provide a mechanism for fastener connections or additional adhesion surface.

FIGS. 9A-D show the side mount 104 with the open support acceptance feature 234. The open support acceptance feature 234 includes at least two sides that define a channel to receive the support 230. If touch safety of the support 230 is required, then a support cover 236 can be used. The support cover 236 extends across the channel defined by the sides of the open support acceptance feature 234 and covers the support 230 positioned within the channel. The support cover 236 can be attached to any component of the mount 104 such as the side support bracket 140, the open support acceptance feature 234, the base, and/or the support 230 through locking mechanisms, fasteners, adhesive, or any other means, creating a touch safe zone if the support 230 is made of a conductive material. For example, the support cover 236 can be constructed of an electrically insulative (i.e., non-conductive) material such as rubber, plastic, ceramic, dielectric material, and/or glass.

Figure 10:
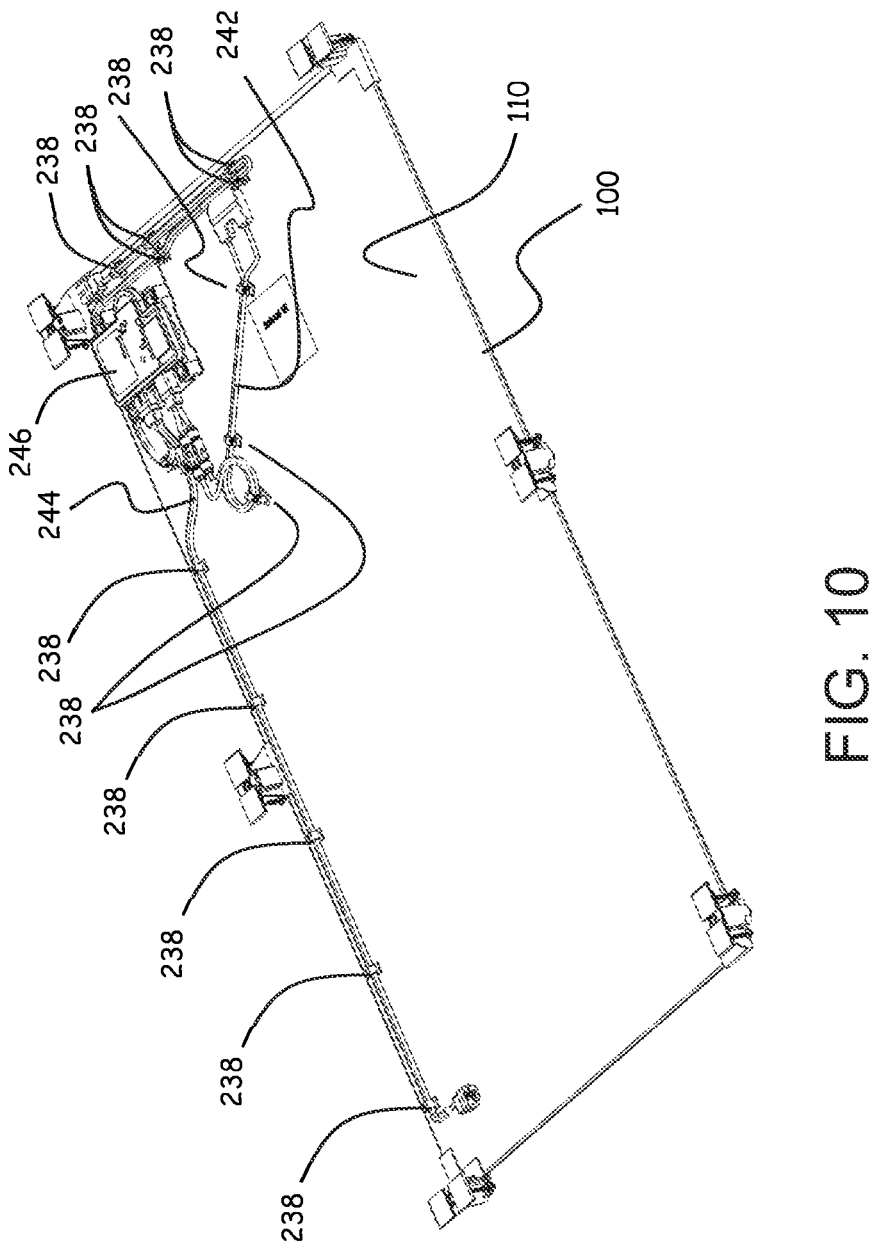
FIG. 10 is a perspective view of an underside of a solar module including an integrated wire management and support system.
Figure 11:
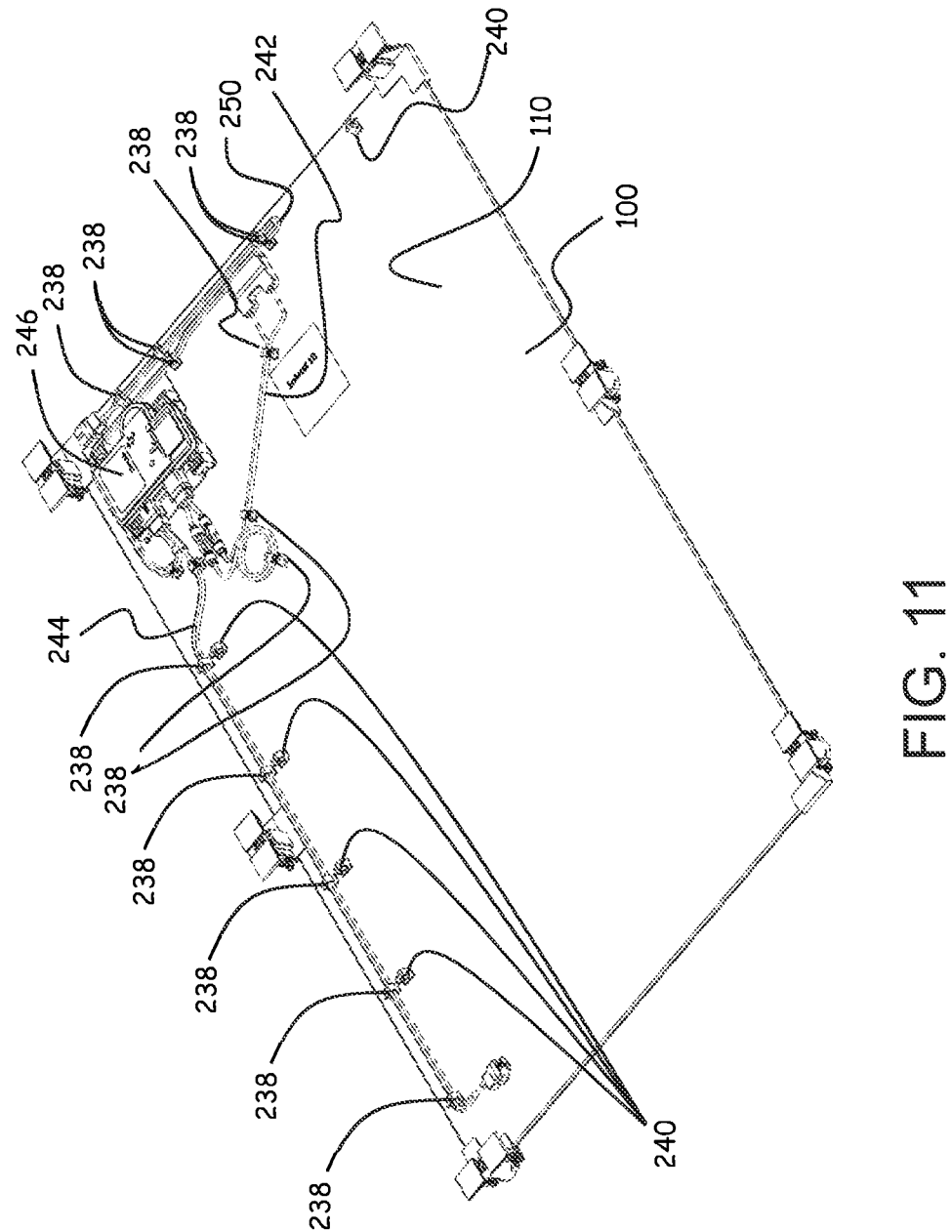
FIG. 11 is a perspective view of an underside of another solar module including an integrated wire management and support system.

Referring to FIGS. 10 and 11, to make installation quicker, module level power electronics 246 such as micro-inverters or DC optimizers can be preinstalled on to a frameless PV module 100 with preinstalled mounts, as shown in FIG. 10. In addition, the DC wires 242 from a solar module junction box and/or DC wires 242 or AC wires 244 from a module level power electronics can be installed into wire management devices 238 attached to the backside of the laminate 110. The preinstalled electronics and wire management system facilitates the solar module 100 being shipped prewired for standard array layouts. Accordingly, the module 100 facilitates simpler and quicker installation. In some embodiments, extra wire management devices 240 can be preinstalled, as shown in FIG. 11, to accommodate field rewiring and allow for installations in circumstances where the solar modules 100 are installed in nonstandard array shapes.

Example wire management systems reduce slack in the wires 242, 244 and prevent the wires 242, 244 contacting an installation surface such as the roof deck. The wire management systems include wire management devices 238, 240 that receive and secure wires or cables. For example, the wire management devices 238, 240 include channels, hooks, slots, or other engagement features that receive the wires 242. To remove slack from the wires 242, 244, multiple wire management devices 238, 240 can be used to produce slack removal loops 250 as shown in FIG. 11. In some embodiments, the wire management devices 238, 240 are position-able between an open position in which the devices receive the wires and a closed position in which the wires are secured in position.

The wire management devices 238, 240 are arranged to secure the wires in field adjustable loops which allow installers to adjust the wires and reduce slack. For example, the wire management devices 238 are positioned on the module 100 at locations that are arranged to allow the wires to be looped. In addition, the module 100 may include extra wire management devices 240 to allow installers to selectively loop the wires and reduce slack. The wire management devices 238, 240 are sized to receive multiple wraps of the wire. The wire management devices 238, 240 may be adjustable. The wire management devices 238, 240 may include a base that is attached to the module and at least one arm or engagement feature that defines a wire cavity sized to receive the wires. In some embodiments, the solar modules include multiple devices or a single device to reduce slack in the wires. In addition, in some embodiments, the wire management devices 238, 240 can be tightened on the wires 242, 244 to provide resistance to motion in all directions and the devices can be opened with or without the use of a tool to remove or insert wires into the devices at any time.

Figure 12:
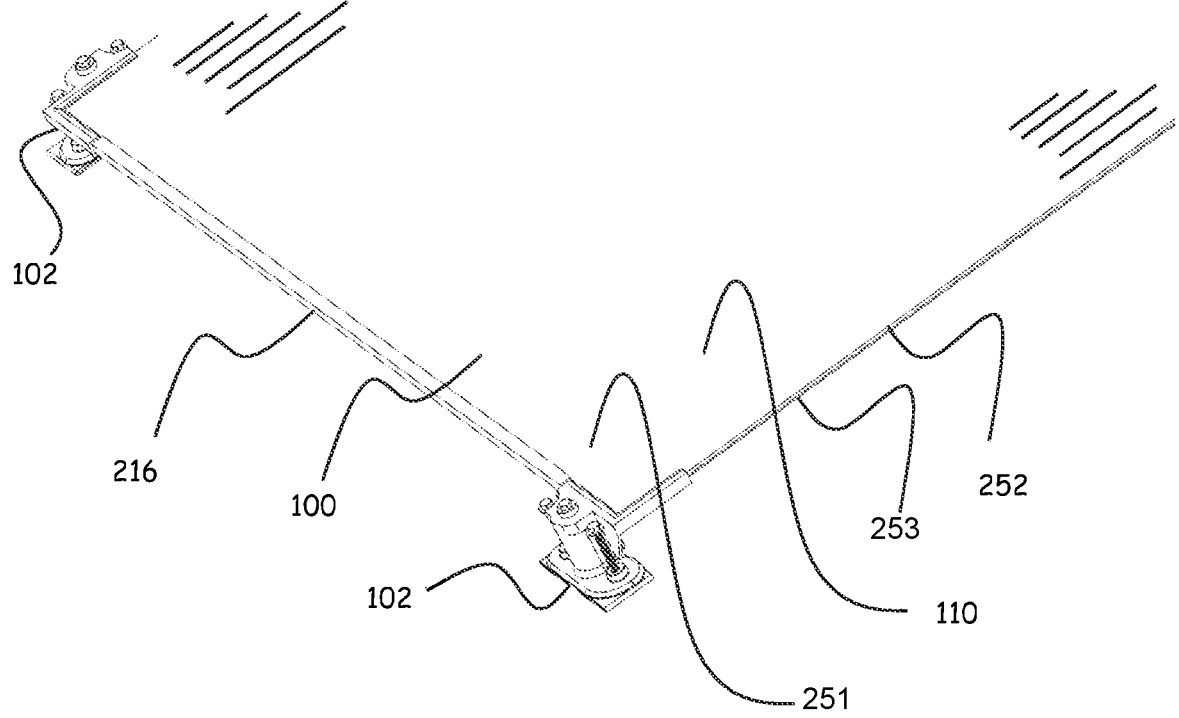
FIG. 12 is a perspective view of a portion of a solar module including an edge protector.
Figure 13:
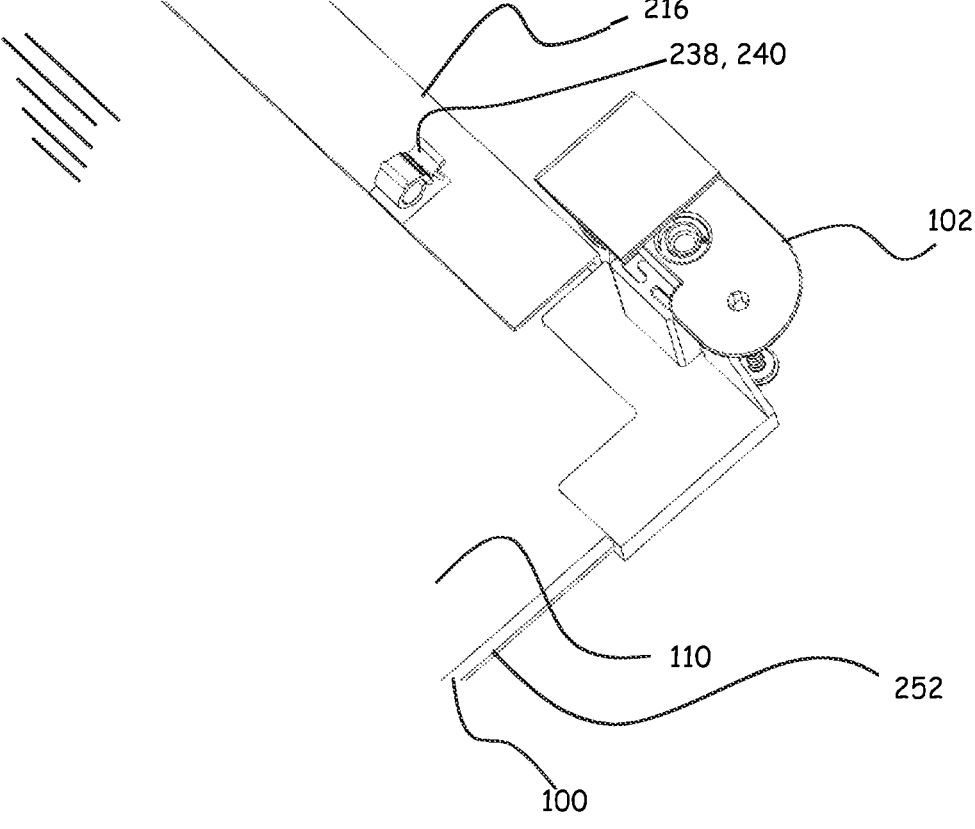
FIG. 13 is an enlarged perspective view of a portion of the solar module of FIG. 12 illustrating a wire receiver on the edge protector.

Referring to FIGS. 12 and 13, the laminate 110 includes an upper surface 251 arranged to interact with solar energy, a lower surface 253 opposite the upper surface, and an edge 252 extending between the upper surface and the lower surface. The edge 252 of the laminate 110 of a frameless module 100 if unprotected may be susceptible to damage that can result in catastrophic failure of the tempered glass typically used in PV laminate construction. Edge protection 216 can be used to reduce the risk of this damage as shown in FIG. 12. The edge protection 216 can extend along and cover all edges 252 or specific edges 252 and can extend the full distance between mounts 102, 104 or a portion(s) of the distance between mounts 102, 104. The edge protection 216 can be plastic insulative or dielectric material. In some embodiments, the edge protection 216 is a fire resistant material. The edge protection 216 can be incorporated into the mounts 102, 104 or can be separate pieces from the mounts.

The edge protection 216 can include wire management devices 238, 240 as shown in FIG. 13. The wire management devices 238, 240 can be attached to the edge protection 216 by fasteners and/or adhesive. In other embodiments, the wire management devices 238, 240 are integrally formed with the edge protection 216 such that the wire management device and the edge protection are a single piece and cannot be separated without destroying the components. Incorporating wire management devices 238, 240 into the edge protection 216 reduces the cost of materials of the modules and simplifies and saves time for assembling the modules.

Figure 14A:
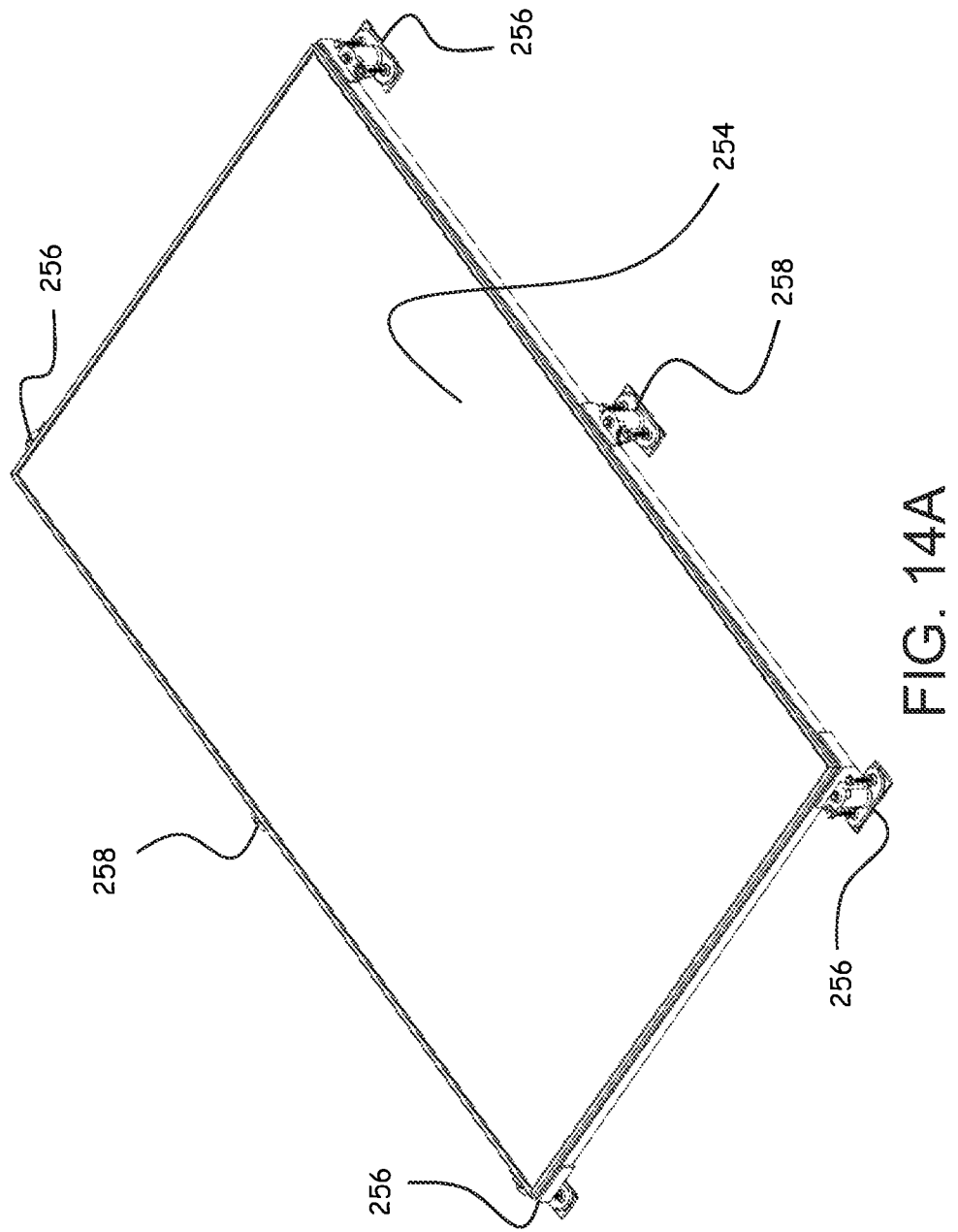
FIG. 14A is a perspective view of a solar module having an integrated frame and racking system.
Figures 14B, 14C, 14D:
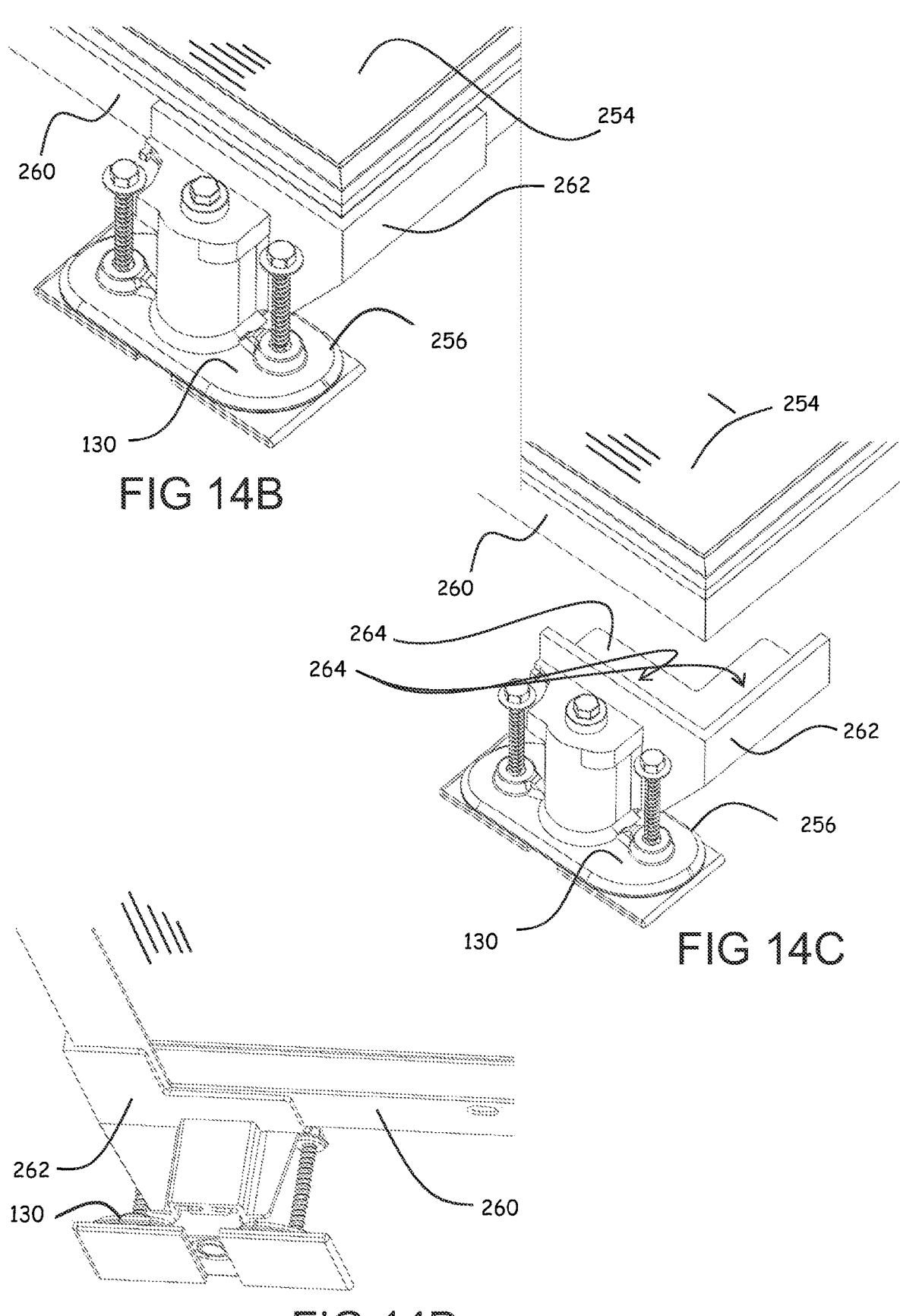
FIG. 14B is an enlarged perspective view of a portion of the solar module illustrating a corner mount attached to the frame and racking system of the solar module of FIG. 14A.
FIG. 14C is a perspective view of the solar module of FIGS. 14A and 14B with a corner mount detached from the solar module.
FIG. 14D is a perspective view of an underside of a portion of the solar module of FIGS. 14A-14C.

FIG. 14A shows an embodiment of a photovoltaic module 254 with integrated racking. The module 254 includes a frame extending around the edges of the module, frame-adhered corner mounts 256, and frame-adhered side mounts 258. FIG. 14B is a close up view of the frame adhered corner mount 256 as installed on the framed module 254. The framed adhered corner mount 256 utilizes a specialized module adhered corner top 262 which provides two perpendicular vertical walls and a horizontal shelf to align the mount to the corner of the module. The corner top 262 includes frame adhesion pads 264 that come into contact with the module frame 260. The frame adhesion pads 264 provide an adhesive to bond the module adhered corner top 262 to the module frame 260 of the framed module 254 thus forming the solar module with integrated racking. FIG. 14C shows the module adhered corner mount 256 prior to adhesion to the module frame 260. FIG. 14D shows an alternative view from the bottom side of the module 100 with the module adhered corner mount 256.

Figure 15A:
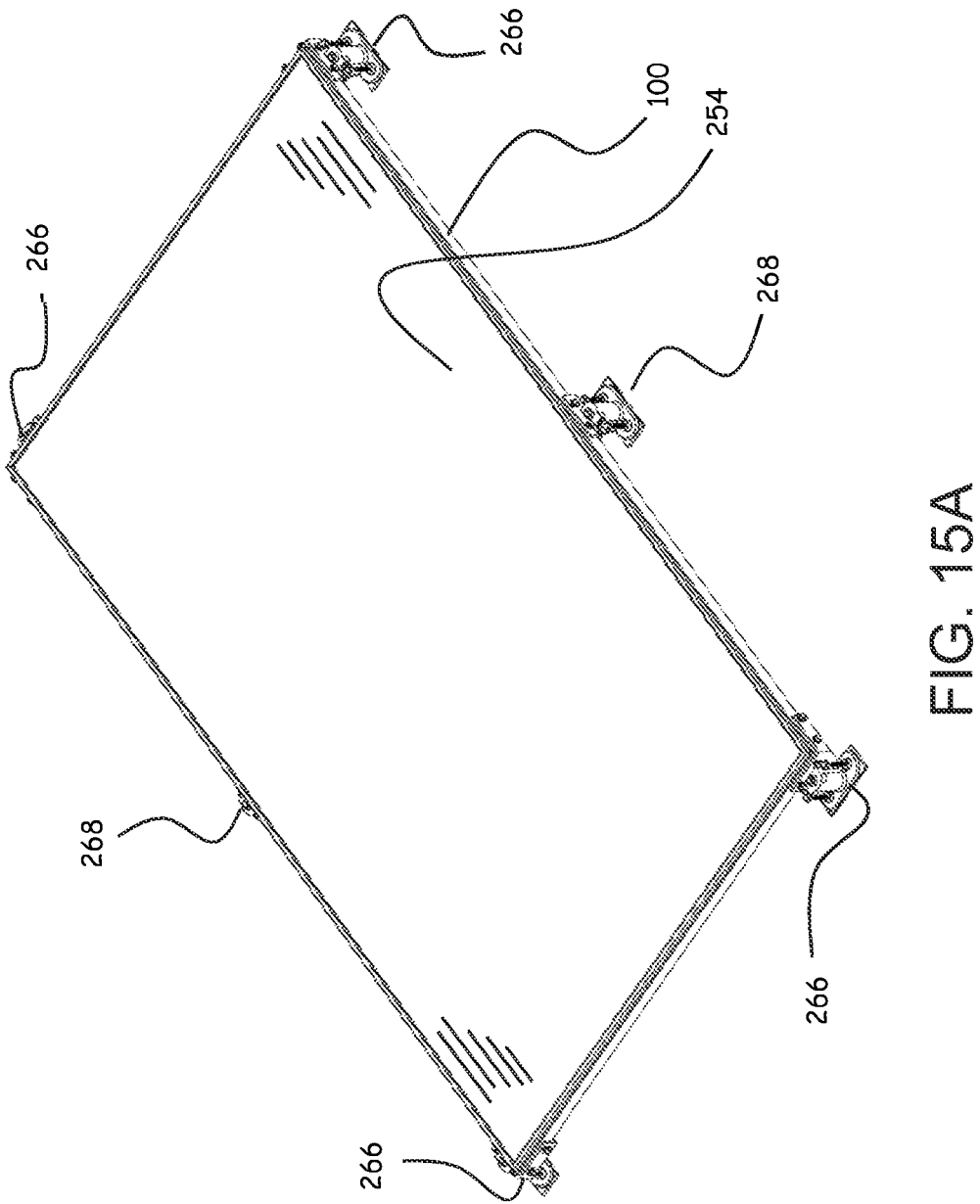
FIG. 15A is a perspective view of a solar module having an integrated frame and racking system and corner mounts including clamps.
Figure 15B:
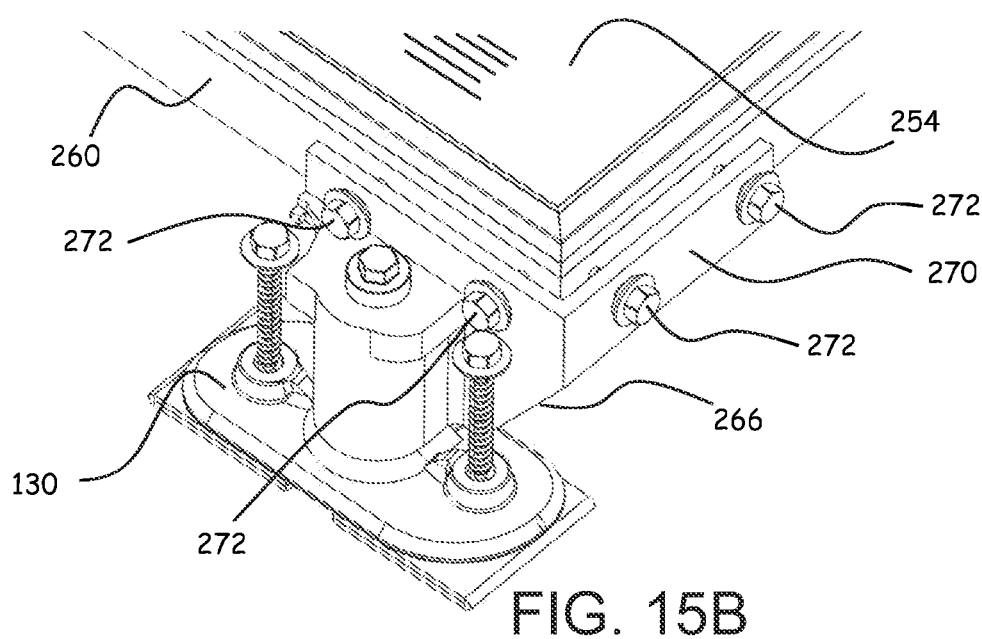
FIG. 15B is an enlarged perspective view of the corner mounts of the solar module of FIG. 15A.
Figure 15C:
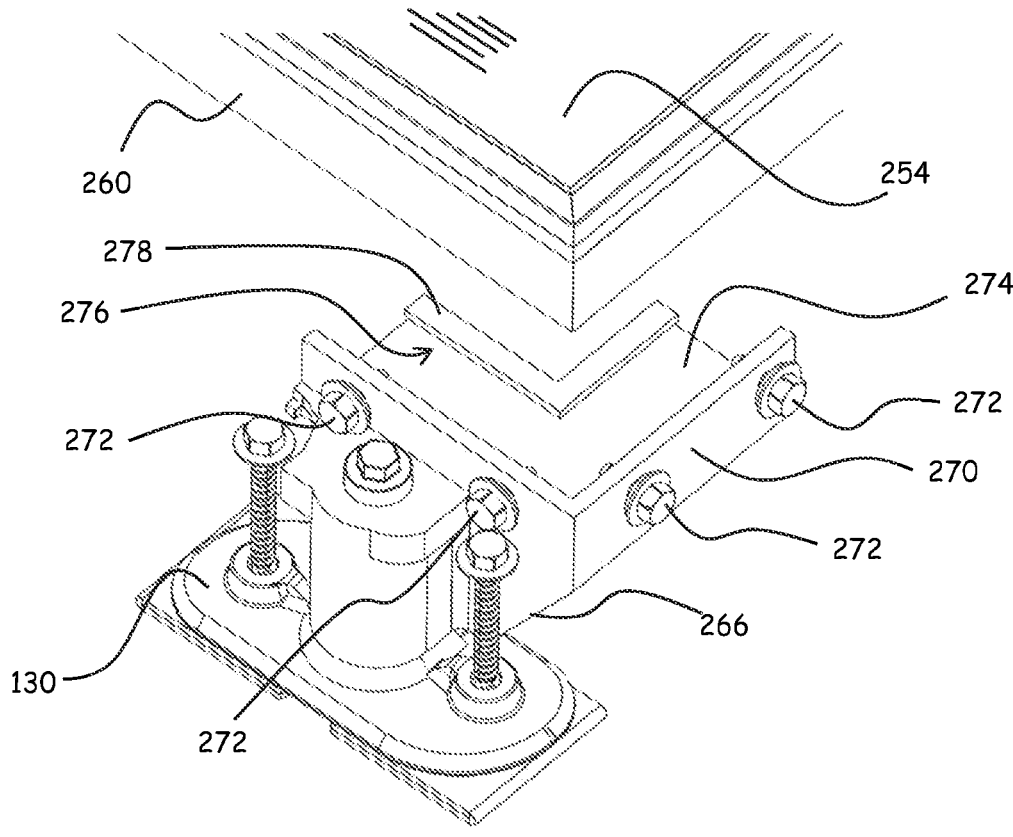
FIG. 15C is an exploded perspective view of the corner mounts and the solar module of FIG. 15A.
Figure 15D:
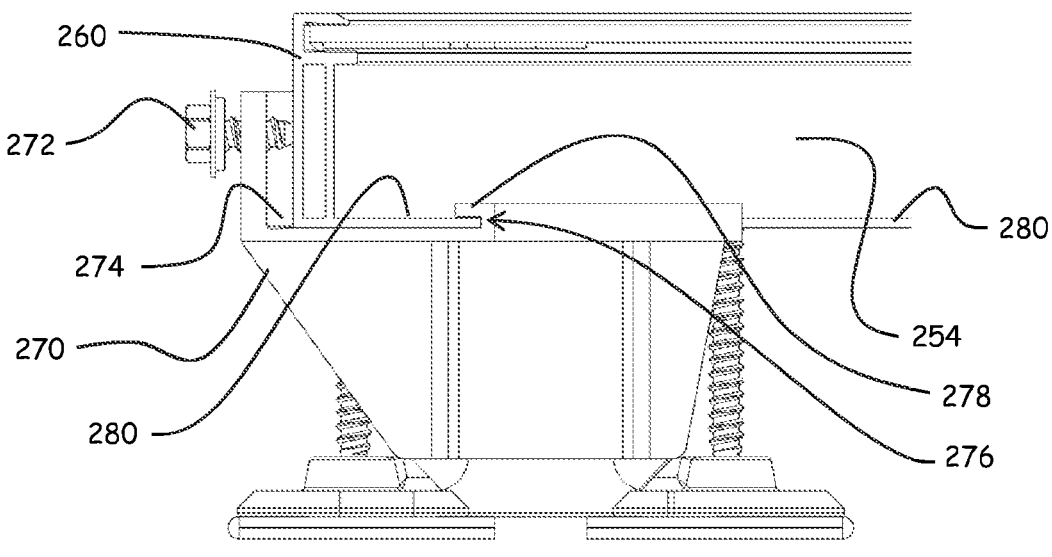
FIG. 15D is a sectional view of the corner mounts and the solar module of FIG. 15A.
Figure 15E:
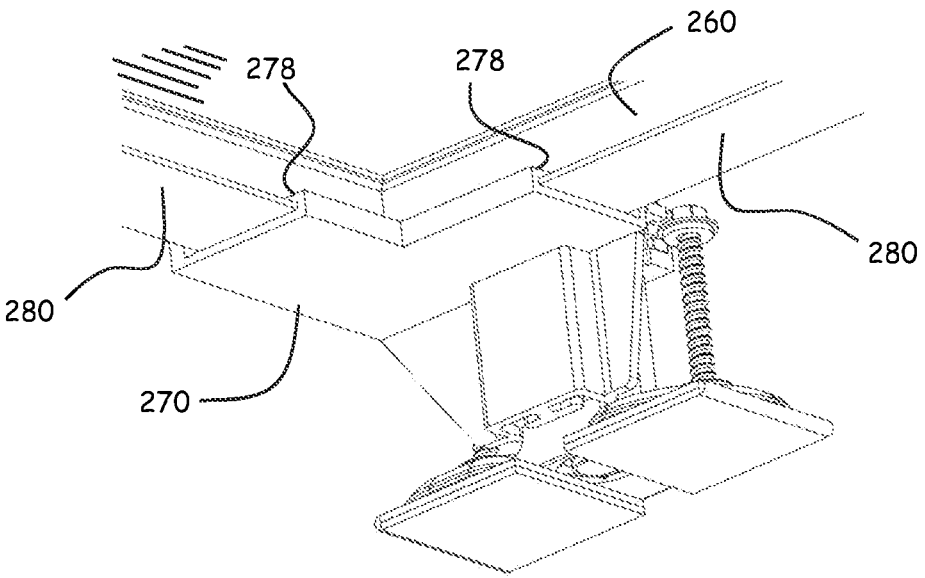
FIG. 15E is a perspective view of an underside of a portion of the solar module of FIG. 15A, including the corner mount.

FIG. 15A shows an embodiment of a photovoltaic module 254 including a frame, clamp-attached corner mounts 266, and clamp-attached side mounts 268. FIG. 15B is a close up view of a clamp-attached corner mount 266 as installed and FIG. 15C shows the clamp-attached corner mount 266 prior to installation. As shown in FIG. 15C, the clamp-attached mounts 266, 268 utilize a frame landing pad 274, a frame capture slot 276, and a frame capture flange 278 to index the clamp-attached corner top 270 of the clamp attached corner mount 266 to the framed module 254. The clamp fasteners 272 are then used to force the module mounting flange 280 into the frame capture slot 276 securing the clamp-attached corner mount 266 to the framed module 254. A cross-sectional view of this connection is shown in FIG. 15D, and an underside view is shown in FIG. 15E.

Figure 16A:
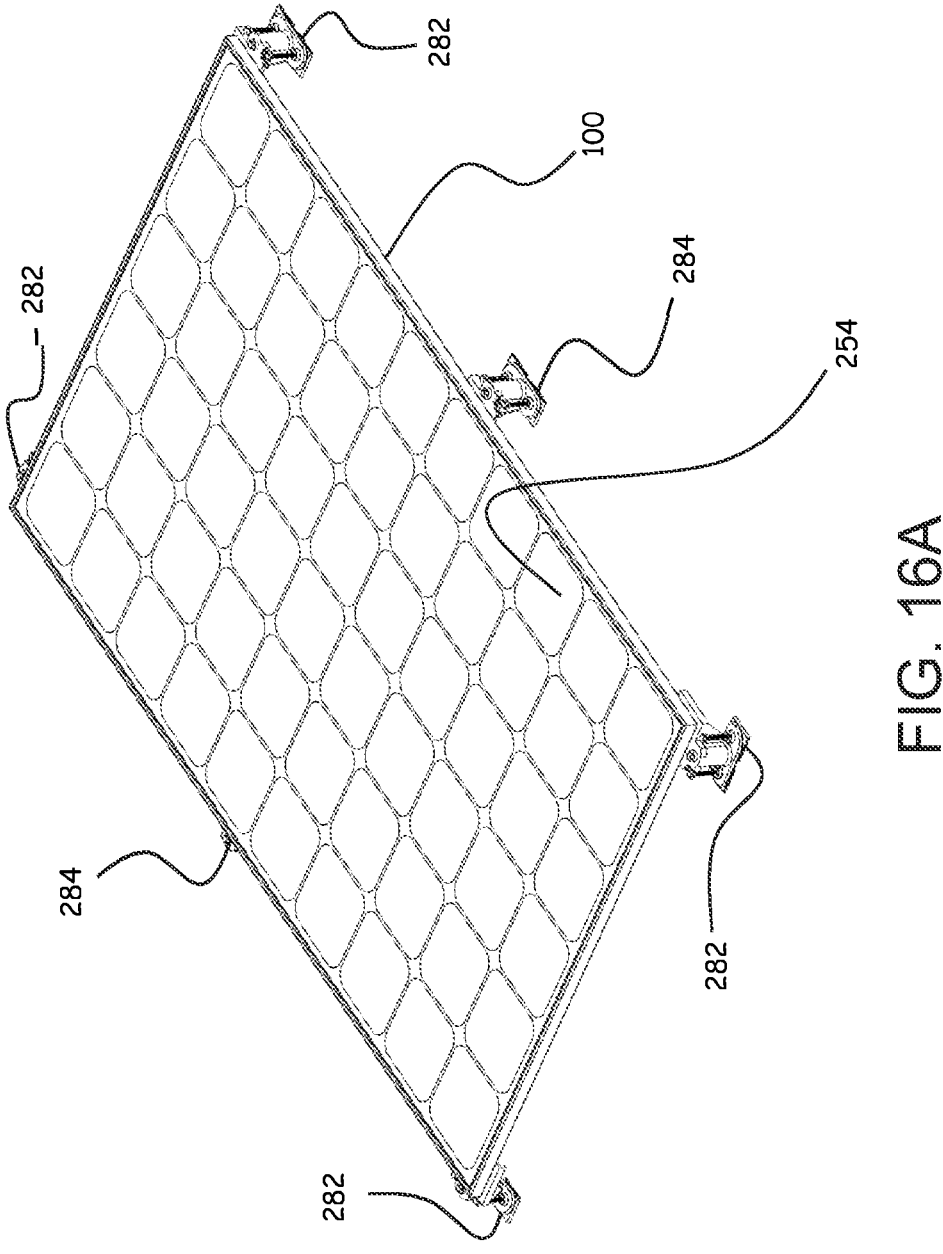
FIG. 16A is a perspective view of a solar module including an integrated racking system and mounts, the mounts including adhesive attachments to the laminate.
Figure 16B:
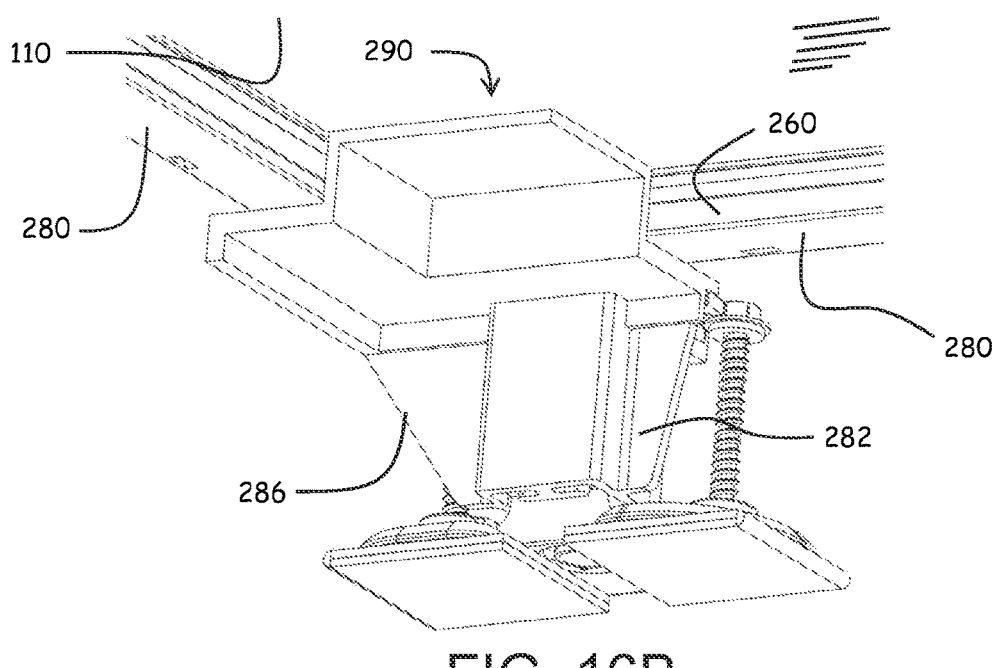
FIG. 16B is a perspective view of a portion of the underside of the solar module of FIG. 16A and illustrating a corner mount that includes an adhesive attachment to the laminate.
Figures 16C, 16D:
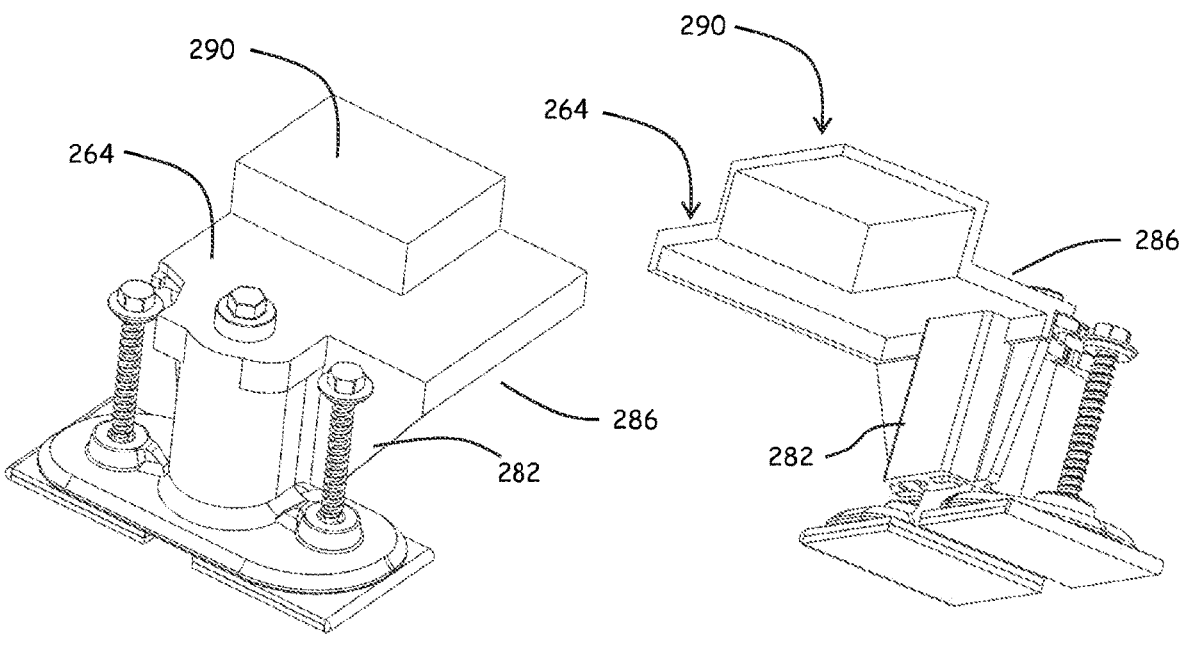
FIG. 16C is a perspective view of the corner mount of the solar module of FIGS. 16A and 16B.
FIG. 16D is a perspective view of an underside of the corner mount of the solar module of FIGS. 16A and 16B.

FIG. 16A shows an embodiment of a photovoltaic module 254 including a frame, laminate-adhered corner mounts 282, and laminate-adhered side mounts 284. FIG. 16B is a close-up bottom view of the laminate-adhered corner mount 282 adhered to the backside of the laminate 110 of the framed module 254. FIGS. 16C & 16D show the laminate-adhered corner mount 282 from various views. The laminate-adhered corner mount 282 utilizes a laminate adhesive pad 290 for adhesive attachment to the laminate. In addition, an optional frame adhesion pad 264 can be used to adhere to the module mounting flange 280. The corner mount 282 includes planar surfaces 286 at different elevations and vertical walls extending between the planar surfaces. The laminate adhesive pad 290 may be located on the upper planar surface. The vertical walls are sized to raise the laminate adhesive pad 290 index to the mounting flanges 280 of the framed module 254. The surfaces and walls of the corner mount 282 are arranged to fit within and secure the mount in the corner of the module 254.

Figure 16H:
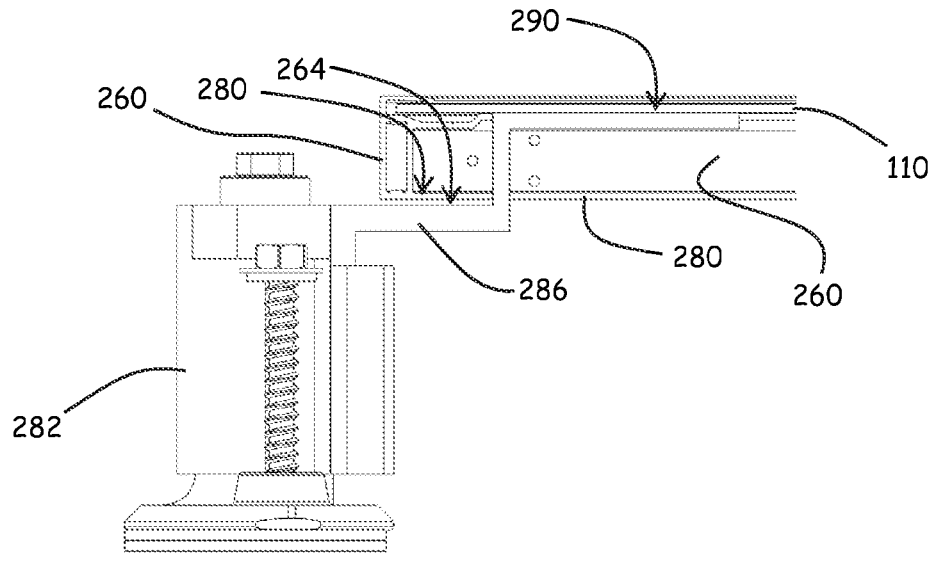
FIG. 16H is a sectional view of the side mount of the solar module of FIGS. 16A and 16E.

FIG. 16E shows a close-up bottom view of the laminate-adhered side mount 284 attached to the bottom side of the laminate 110 of a framed module 254. FIGS. 16F and 16G show alternative views of the laminate-adhered side mount 284 along with the laminate adhesive pad 292 and the optional frame adhesion pad 264 of the laminate adhered side top 288. FIG. 16H shows a cross-sectional view of the installed laminate-adhered side mount 284.

Figure 16I:
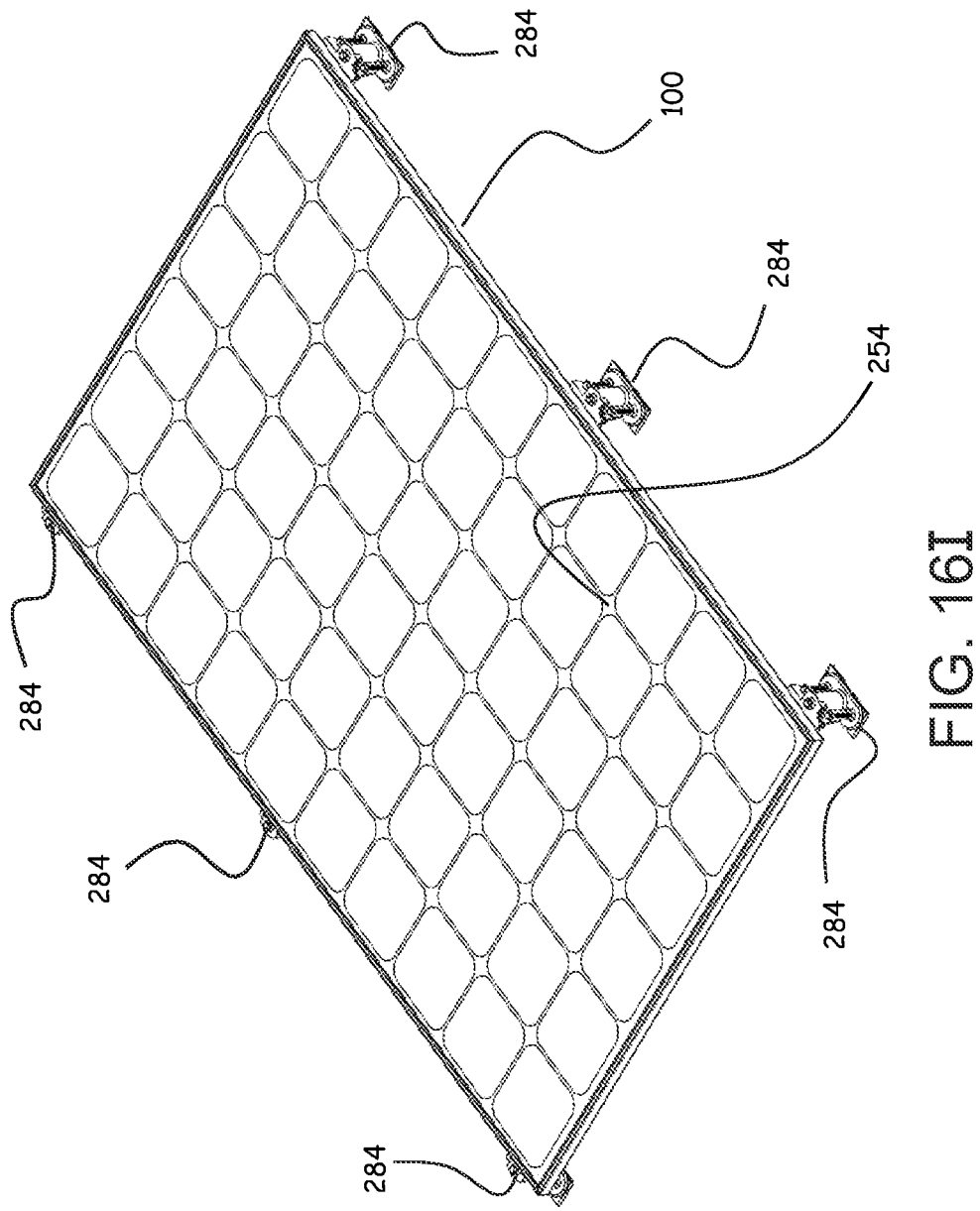
FIG. 16I is a perspective view of a solar module including side mounts having adhesive attachments to a laminate of the solar module.
Figure 16J:
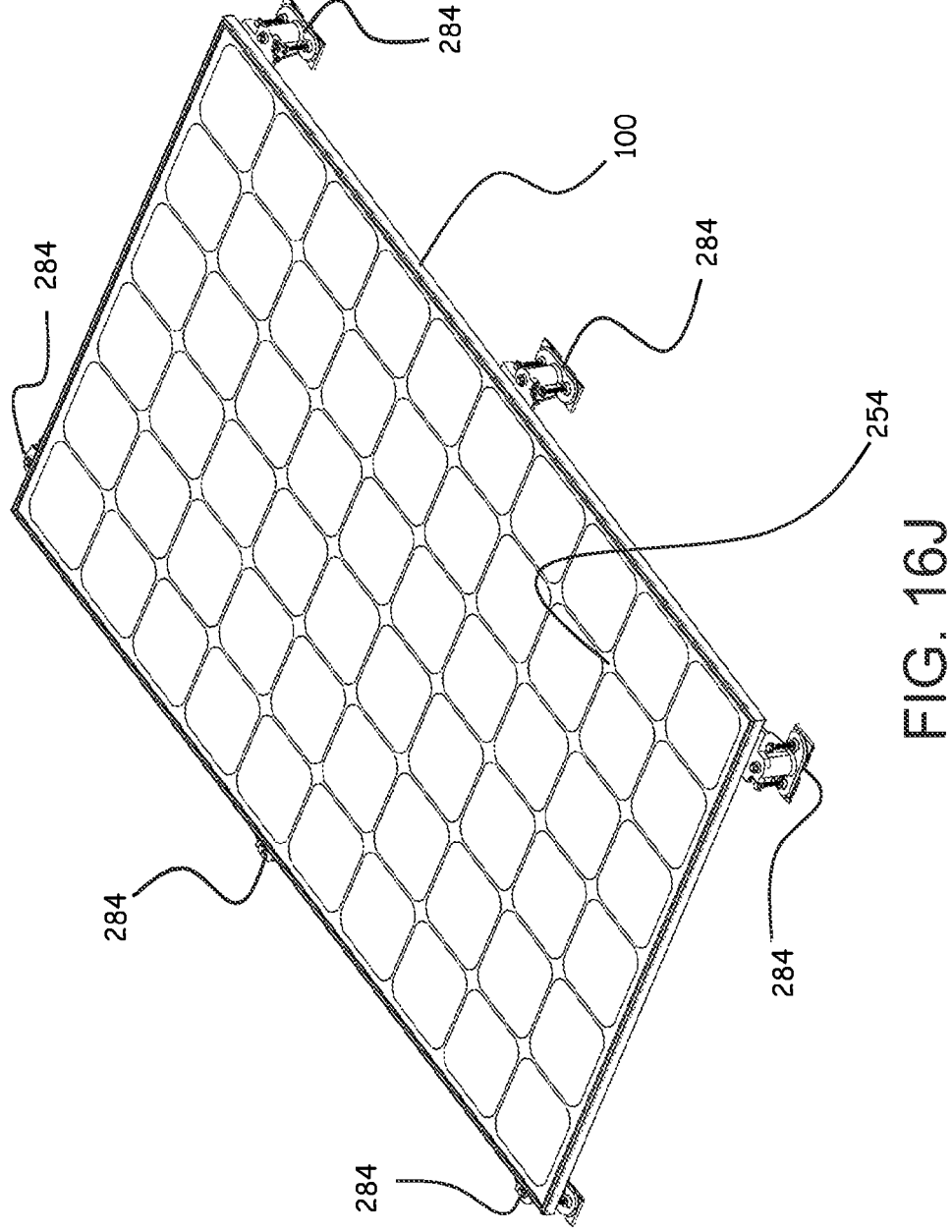
FIG. 16J is a perspective view of another example solar module including side mounts having adhesive attachments to a laminate of the solar module.

FIG. 16I shows an embodiment of a photovoltaic module 254 including a frame and laminate-adhered side mounts 284. In the example shown in FIG. 16I, corner mounts are omitted. In the example, the side mounts 284 are located only along the long sides 360 of the module 254. For example, the side mounts 284 are located on the long sides at the corners of the module 254 and at approximately the midpoints of the sides. The mounts 284 can be staggered such that they do not interfere with other modules when they are installed close to each other. FIG. 16J shows an embodiment of a photovoltaic module 254 including a frame and laminate adhered side mounts 284. The side mounts 284 are located on either the long or short sides of the module 254 at corner locations similar to if laminate adhered corner mounts 282 were used. In the example shown in FIG. 16J, corner mounts are omitted.

FIG. 17A shows an embodiment of a solar module 254 including a frame, bolted side mounts 294, and frame integrated gap spacers 220. FIG. 17B and FIG. 17C show the assembled and exploded views of the bolted side mount 294. The bolted top 296 is attached to the bolted base 298 by way of a threaded stud 302 on the bolted top 296 and a nut 304. In another embodiment, any combination of fasteners and washers can be used to connect the top and base. In addition, a star washer or other means can be used to provide grounding between all the components if the components are made of metal. As shown in FIG. 17B, the bolted base 298 has two alignment flanges 306 to provide vertical stability and keep the bolted base 298 and the bolted top 296 in line with each other. FIG. 17D shows an installed bolted side mount 294. The bolted top 296 attaches to the module frame 260 by the threaded stud 302 at the top of the bolted top 296 at a hole along the module's mounting flange 280. The hole may be a predrilled hole which is included in the mounting flange when manufactured. A nut 304 is used to complete the connection. The bolted side mount 294 includes flashing 134 and holes 300. The holes 300 are sized to receive fasteners.

When the module 100 has been placed in its final location, installers use fasteners in the holes 300 to attach the bolted side mount 294 to the roof. In another embodiment, the holes 300 include threads so the fasteners can be preloaded into the bolted side mount 294.

FIGS. 17E and 17F (exploded view) show the bolted side mount 294 with the additions of fastener holder inserts 310 and preinstalled fasteners 118. The fastener holder inserts 310 are secured into the fastener through holes 300 and provide height to hold the threads of the fastener 118 for preinstallation. In the example, the fastener holder inserts 310 include fastener guides 127 that can strip during installation and provide improved clamping force between the mount 294 and the roof.

As seen in FIGS. 17A-17H, the bolted side mounts 294 include a leveling device. For example, the bolted side mounts 294 include two separate pieces (e.g., the top 296 and the base 298) that are connected together by a leveling fastener (e.g., the threaded stud 302 and the nut 304). The top 296 is L-shaped and includes an upper portion that mounts to the laminate or frame of the module 100, and a lower planar portion. The base 298 includes a vertical planar tab that is configured to engage the lower planar portion of the support bracket 132. The base 298 defines a height adjustment slot 308. The height adjustment slot 308 is elongate and is sized to receive the leveling fastener for leveling the module 100. The height adjustment slot 308 is linear and extends vertically, i.e., perpendicular to the mounting surface, on the vertical tab of the base. Accordingly, the threaded stud 302 may slide vertically within the slot to adjust the position of the solar module 100 relative to the surface. The nut 304 is tightened on the threaded stud 302 to secure the leveling device at a desired position. FIG. 17G shows the bolted side mount 294 with the threaded stud 302 in a lowered position of the leveling device. For example, the threaded stud 302 is at the lowest portion of the height adjustment slot 308. FIG. 17H shows the bolted side mount 294 with the threaded stud 302 at an elevated position. In the example, the threaded stud 302 is at the highest portion of the height adjustment slot 308. The mounts 294 may be leveled before or after attaching the mounts to the laminate 110.

For example, a method of assembling a solar module (e.g., solar module 254) for installation on a structure includes positioning fasteners (e.g., fasteners 118) in openings in a base (e.g., base 298), and connecting the base to a support bracket (e.g., top 296) to form a mount (e.g., mount 294). The base or the support bracket defines a height adjustment slot (e.g., height adjustment slot 308) sized to receive a leveling device (e.g., the threaded stud 302 and the nut 304). The method also includes adjusting a height of the support bracket relative to the base by positioning the leveling device within the height adjustment slot, and securing the support bracket at a level position. In some embodiments, a laminate (e.g., laminate 110) is attached to the support bracket when the support bracket is at the level position. In other embodiments, the laminate is attached to the support bracket prior to securing the support bracket at the level position.

FIG. 17I and FIG. 17J show two modules 100 with integrated mounts 294 that utilize the bolted side mounts stacked on top of each other to facilitate shipping. The top and bottom of the alignment flanges 306 become stacking features that carry the weight of the panels from one mount to the one below and provide lateral resistance locking the modules into place. Accordingly, the modules 100 reduce shipping stresses and provide for tighter shipping density.

In reference to FIGS. 171 and 17J, the solar modules 100 are configured to stack together for economical packing and shipping. The side mounts 294 of the solar modules 100 align vertically and engage each other to support the solar laminates 110 in a stacked position. For example, the flanges 306 of the mounts rest on top of each other and align the mounts in the stacked position. In the stacked position, the side mounts 294 protect and space the solar laminates 110 of the solar modules 100 apart. As a result, the amount of packaging components, such as clips and spacers, required to ship the solar modules 100 is reduced. In alternative embodiments, the solar modules 100 may be stacked and/or packaged in any manner that enables the solar modules to function as described.

Figure 17N:
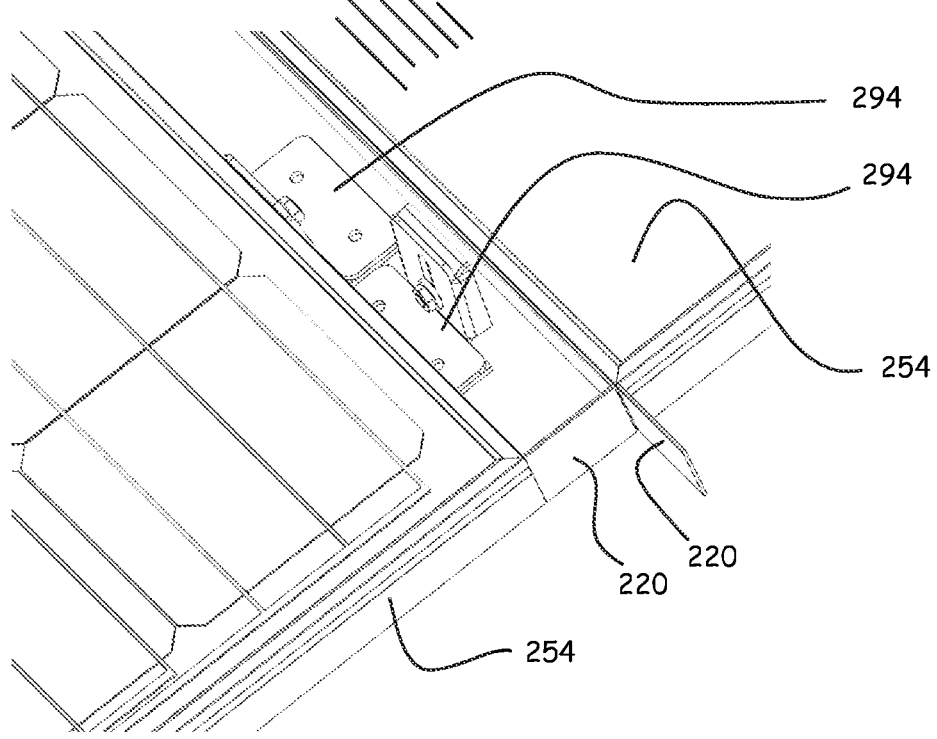

FIG. 17K shows the embodiment of a photovoltaic module 218 including a frame, bolted side mounts 294, and frame integrated gap spacers 220. The mounts 294 on one long side are shifted vertically with respect to the mounts 294 on the other long side. As shown in FIG. 17L the offset of the side mounts 294 facilitate the bolted side mounts 294 not interfering with each other during installation. FIG. 17M shows two integrated modules 100 in an installed closed position. The gap between modules is controlled by the gap spacers 220 instead of interfering side mounts 294 due to the offset of the mount 294. FIG. 17N shows a closeup of the offset of the side mounts 294 and the engaged gap spacers 220.

FIG. 18A shows an embodiment of a photovoltaic module 218, with the laminate 110 removed from the view. The photovoltaic module 218 includes a frame 260, the gap spacers 220 which are integrated into the frame 260 in the example, and a preinstalled module-to-module ground wire 314. The ground wire 314 is attached to the framed module 254 at the mounting flange 280 of the module frame 260 by a preinstalled ground wire connection 312 assembly as shown in FIG. 18B. This embodiment shows the connection being made using a threaded stud insert to the mounting flange 280 and a standard star washer, ring terminal crimped to the ground wire 314 and a nut. For example, the ground wire 314 is connected to the module through wire clips 318 or some other device. The flexible ground wire 314 allows the ready-to-install ground wire connection 316 to be tucked away during shipping. In addition, in the example, the ground wire 314 can be provided with extra length to allow for connections between modules when installed into non-standard shapes. FIG. 18C shows the ready to install ground wire connection 312 installed on an adjacent module 100 to make the module-to-module electrical connection. The gap spacer 220, 222 includes a gap spacer wire passthrough 320 to facilitate ground wire 314 management.

FIGS. 19A and 19B show the leveling device 120 with a stopping device. Referring to FIGS. 2, 19A, and 19B, the leveling device 120 is threaded into the universal base 130 as part of the corner and side mounts 102, 104. However, when in operation, the leveling device 120 is free to be rotated up and down to accommodate the slope of the surface. Without a stopping mechanism, the installer can accidentally evacuate the entire leveling device 120 from the universal base 130. To prevent this, a stopping device can be deployed to prevent the leveling device 120 from evacuating from the universal base 130. FIG. 19A shows the leveling device 120 with a stop pin 322 that is inserted into a pin hole 326 after the leveling device 120 is inserted into holes in the universal base 130. The universal base is not shown in FIGS. 19A and 19B. FIG. 19B is a close up of the stop pin 322 assembly. When the leveling device 120 is raised inside the universal base 130 the stop pin 322 will hit the internal threads of the universal base 130 and stop the rotation. In another embodiment, at least the last thread 324 of the leveling device 120, can be purposely formed either through melting or otherwise deformation to act as a stop similar to the stop pin 322. In other embodiments, any type of obstruction can be utilized to prevent the leveling device 120 from evacuating from the universal base 130.

To prevent accidental rotation and thus laminate 110 height changes relative to the surface, the leveling device 120 may be equipped with self-locking threads 324. The self-locking threads resist rotation from cyclical loading and require a torsional load to allow for rotation. In addition, resistance to rotation can be built into threads by changing their shape such that there is resistance between the external threads of the leveling device 120 and the internal threads of the universal base 130 of 1 in-lb. or more providing resistance to rotation due to cyclical loading. In another embodiment, extra material such as material from mold parting lines or intentional bulbus regions is provided on either or both the external threads of the leveling device 120 or the internal threads of the universal base 130. The excess material creates interference resulting in resistant to rotation.

FIGS. 20A-20D show an example locking assembly 364 that facilitates and simplifies removal and/or replacement of the laminate 110. The laminate 110 is removable from the installed mount using the locking assembly 364 such that the mount and the waterproofing are not disturbed when the laminate is removed and/or replaced. In addition, the laminate 110 can be removed without tools using the locking assembly 364. Moreover, the locking assembly 364 is reliable and stays in place during the module swap and provides a secure connection of the laminate 110 and the mount.

FIG. 20A shows the locking assembly 364 including at least three parts. The locking assembly 364 includes an open slider 330, a close slider 332, and a rotating lever 334 which translates the direction of one slider 330, 332 into an opposite direction of the other slider 330, 332. The rotating lever 334 engages the sliders through their lever capture feature 338. The lever 334 rotates around the lever rotation pin 336 which is installed into oversized cylindrical interfaces of the corner support bracket 132 and the side support bracket 140. The lock assembly 364 includes several features to prevent inadvertent opening. One is the lock flange 342 of the open slider 330 that fits in a capture feature in the corner support bracket 132 or the side support bracket 140. In some embodiments, the locking assembly is included at least partly in the leveling fastener 121 and/or the base 130.

FIG. 20D shows the corner top with a portion removed to reveal the lock assembly 364 in the closed position. The lock flange 342 of the open slider 330 is seated on the back wall of the corner support bracket 132 when the lock assembly is in the closed position. To overcome the lock and open the lock assembly, the flexible material of the open slider 330 is pushed away from the back wall of the corner support bracket 132 by engaging the push flange 344 to flex the open slider away from the corner support bracket 132 and then push the open slider 330 and move the flange 344 toward the lever. As shown in FIG. 20C, this motion forces the open slider 330 to move away from the leveling device capture area, rotating the lever 334 thus moving the close slider 332 away from the leveling device 120, releasing the locking assembly 364 from the leveling device lock groove 144, and releasing the corner or side support bracket 132, 140 from the leveling device 120. The locking assembly 364 is closed by pushing the push flange 344 of the close slider 332. An optional and additional resistance mechanism can be built into the lever 334 in the form of an interference feature 340.

The interference feature 340 is slightly larger than the locking assembly capture area 328 built into the corner and side support brackets 132, 140. When in the locked position the interference feature 340 sits outside the locking assembly capture area 328. When pushing the open slider 330 to release the leveling device 120, the interference feature 340 produces resistance to the motion to open the lock assembly 364 and prevent inadvertent opening. In addition, since the lock assembly 364 is inside the locking assembly capture area 328, the lock assembly 364 is not exposed to UV degradation preserving its integrity for the long term.

To facilitate ease of electrical wiring of a module (e.g., frameless module, frameless module with integrated mounts, standard framed module, framed module with integrated mounts) and to reduce the amount of power wire 346 rerouting required in the field to complete a solar array 112, a connector adaptor 350 can be used to change the mating features of a power wire connector 348. FIG. 21A shows a power wire connector adaptor 350 installed into a power wire connector 348. FIG. 21B shows the power wire connector adaptor 350 uninstalled from a power wire connector 348. To reduce the number of parts required to build an array and to reduce the number of parts required to order for installation, the power wire connector adaptor can be preinstalled to one of the power wire connectors 348 or secured at another ready-to-use location on the module 100. The power connector adaptor 350 includes a body 351 having a first end 353 and a second end 355. The first end 353 connects to the power wire connector 348 and the second end 355 connects to a wire. The power connector adaptor 350 facilitates wires connecting to modules which otherwise would not be compatible with the wires. The power connector adaptor 350 may transform electrical power such as change a voltage and/or the adaptor may provide a different electrical connection than is provided on the module. For example, the second end 355 provides an electrical connection that is different from the electrical connection on the power wire connectors 348. The power connector adaptor may be preinstalled on the module or packaged with the module to simplify installation of the module. In some embodiments, a designated number of power adaptors are packaged with the modules to provide for at least the number of connections that will be required in the field.

As shown in FIG. 22, a handle 352 is installed to a photovoltaic module 100 with integrated racking to facilitate carrying of the module. In particular, the handle 352 is attached to an underside surface of the photovoltaic panels of the solar module 100. The handle 352 includes a grip for a person to grasp when lifting and carrying the module. A typical grip reach for an adult is around 22 inches. The width of the examples modules, e.g., the short side 362, is 40 inches. Thus, to facilitate carrying a module a handle should be at least 20 inches from the long side 360 of a module. Thus, in the example, the handle 352 is located at the middle of a module 100 and provides equal handling distance from ether long side 360 which are the sides from which modules are typically carried. In another embodiment, the handle 352 is installed on a framed module 254 or a framed module with integrated racking. In other embodiments, the handle may be located at any location on the module.

Bases or mounts of this disclosure contour to the shape of a roof covering to provide better waterproofing by closing the gaps formed from various layers of roof coverings. For example, FIG. 23A shows a universal base 130 attached to a roofing system by two fasteners 118. The roofing system consists of an upper course 356 of shingles and a lower course 358 of shingles. As shown in the FIG. 23A, the universal base 130 spans across two layers of shingles producing a gap 354 between the flashing 134 and the lower course 358. If the universal base is rigid, as if made from metal, then the gap will not close resulting in water penetration and roof leaks unless additional flashing 134 or materials are added between the base 130 and the surface. As shown in FIG. 23B, a base 130 that is flexible, like those made from polymers, will deflect under the fastener force closing the gap and engaging the flashing 134 to produce a waterproof seal.

A framed or frameless module (e.g., module 100) includes for example mounts (e.g., feet 102, 104) that are preinstalled and may include a preinstalled flashing tape, fasteners, a mechanism for leveling and changing the height of the module relative to the mount surface, and/or a mechanism for separating the mount from the module. Suitable mounts may be attached to the solar module in any suitable manner. For example, the mounts may be adhered to the frame, adhered to the back side of the laminate, screwed into the frame, bolted onto the frame, and/or clamped onto the frame. The mounts may be polymeric and/or metallic. In embodiments where the mounts are metallic, there may be a preinstalled module-to-module bonding mechanism.

In some embodiments, the mounts include a fastener holder (e.g., fastener holder 129). The fastener holder may be made of plastic. In some embodiments, the fastener holder is a separate part from the base that is captured within the base.

An example module includes a gap spacer (e.g., gap spacer 212, 222) that is adhered or otherwise attached to the frame or module and sticks out from the module to force a gap between modules. The spacer is advantageously made to be removable in the field if the spacer needs to be changed or removed for a custom layout of the solar array and facilitate installation. In embodiments, the component has break away tabs to facilitate removal of the components that stick out from the module. In embodiments, the module has a cutout for the preinstalled module-to-module bonding device to pass through. In other embodiments, the gap spacer is integrally formed with or permanently attached to the frame or module such that the gap spacer is not removable.

Embodiments of the methods and systems disclosed achieve superior results compared to prior methods and systems of solar arrays. For example, the systems and methods simplify the installation of solar modules on structures. More specifically, the embodiments include preassembled solar modules for direct mounting to a structure. In addition, some embodiments reduce the labor, tools, and materials required for layout of the solar assembly. Also, the solar modules may be installed with greater positional flexibility on the structure surface. In addition, the solar modules facilitate installation of solar arrays in difficult to access locations without increasing the difficulty in comparison to installation in simpler locations.

The solar modules also may include leveling devices (e.g., leveling device 120) to facilitate leveling the solar modules on the structure. Also, some embodiments may include a release mechanism (e.g., locking assembly 364) that provides for quick release of a portion of the solar modules from the structure.

When introducing elements of the present invention or the embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A solar array comprising:
a solar module including a laminate and a mount for mounting the solar module on a surface of a structure; and
a lock assembly securing the laminate to the mount, wherein the lock assembly transitions between a closed position and an open position, the lock assembly comprising:
a first slider;
a second slider, wherein the first slider and the second slider each comprise a lever capture feature, and wherein the first slider and the second slider translate in opposite directions; and
a rotating lever to engage the first slider and the second slider, wherein the rotating lever engages the lever capture feature on each of the first slider and the second slider in the closed position to secure the laminate to the mount and is rotatable to translate the lever capture feature on each of the first slider and the second slider to the open position to release the laminate from the mount.

2. The solar array of claim 1, wherein the mount is a corner mount positioned at a corner of the solar module.

3. The solar array of claim 1, wherein the mount includes a base.

4. The solar array of claim 1, wherein the mount is a side mount positioned along an edge of the respective solar module.

5. The solar array of claim 4, wherein the mount is offset from the midline of the solar module.

6. A solar array comprising:
a solar module including:
a laminate;
a mount for mounting the solar module on a surface of a structure; and
a lock assembly securing the laminate to the mount, wherein the lock assembly transitions between a closed position and an open position, the lock assembly comprising:
a first slider;
a second slider, wherein the first slider and the second slider each comprise a lever capture feature, and wherein the first slider and the second slider translate in opposite directions; and
a rotating lever to engage at least one of the sliders, wherein the rotating lever engages the lever capture feature of at least one of the first slider and the second slider in the closed position to secure the laminate to the mount and the open position to release the laminate from the mount.

7. The solar array of claim 6, wherein the mount includes a base.

8. The solar array of claim 6, wherein the mount is a side mount positioned along an edge of the solar module.

9. The solar array of claim 8, wherein the mount offset from midline of the solar module.

10. The solar array of claim 1, wherein the lever includes a slider capture feature to engage at least the first and second sliders, such that lever rotation moves each slider to the open or closed position.

* * * * *